Sept. 23, 1958 F. P. GOHOREL 2,853,556

AUTOMATIC TELEPHONE SYSTEMS

Filed Oct. 20, 1953 25 Sheets-Sheet 1

Inventor
F. P. GOHOREL
By Robert Harding Jr.
Attorney

Inventor
F. P. GOHOREL
By [signature]
Attorney

Sept. 23, 1958 F. P. GOHOREL 2,853,556

AUTOMATIC TELEPHONE SYSTEMS

Filed Oct. 20, 1953 25 Sheets-Sheet 3

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 4

*Inventor*
F. P. GOHOREL
By Robert Harding Jr.
*Attorney*

Sept. 23, 1958 F. P. GOHOREL 2,853,556

AUTOMATIC TELEPHONE SYSTEMS

Filed Oct. 20, 1953 25 Sheets-Sheet 5

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 6

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 7

Inventor
F. P. GOHOREL
By Robert Harding Jr.
Attorney

*Inventor*

F. P. GOHOREL

By Robert Harding Jr.

*Attorney*

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 10

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 11

Inventor
F. P. GOHOREL
By Robert Harding Jr.
Attorney

AUTOMATIC TELEPHONE SYSTEMS

Filed Oct. 20, 1953 25 Sheets-Sheet 12

Inventor
F. P. GOHOREL
By Robert Harding Jr.
Attorney

*Inventor*
F. P. GOHOREL
By Robert Harding Jr.
*Attorney*

Sept. 23, 1958 F. P. GOHOREL 2,853,556

AUTOMATIC TELEPHONE SYSTEMS

Filed Oct. 20, 1953 25 Sheets-Sheet 14

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 15

Inventor

F. P. GOHOREL

By Robert Harding Jr.

Attorney

Sept. 23, 1958 F. P. GOHOREL 2,853,556

AUTOMATIC TELEPHONE SYSTEMS

Filed Oct. 20, 1953 25 Sheets-Sheet 16

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 17

Inventor
F. P. GOHOREL
By Robert Harding Jr.
Attorney

*Inventor*
F. P. GOHOREL
By Robert Harding Jr.
*Attorney*

Inventor
F. P. GOHOREL
By Robert Harding Jr.
Attorney

Inventor
F. P. GOHOREL
By
Attorney

Inventor
F. P. GOHOREL
By Robert Harding Jr
Attorney

Sept. 23, 1958 F. P. GOHOREL 2,853,556

AUTOMATIC TELEPHONE SYSTEMS

Filed Oct. 20, 1953 25 Sheets-Sheet 22

Inventor
F. P. GOHOREL
By Robert Harding Jr.
Attorney

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 24

Inventor
F. P. GOHOREL
By Robert Harding Jr.
Attorney

Sept. 23, 1958 F. P. GOHOREL 2,853,556

AUTOMATIC TELEPHONE SYSTEMS

Filed Oct. 20, 1953 25 Sheets-Sheet 25

*Inventor*
F. P. GOHOREL
By Robert Harding Jr.
*Attorney*

United States Patent Office 2,853,556

Patented Sept. 23, 1958

2,853,556

AUTOMATIC TELEPHONE SYSTEMS

Fernand Pierre Gohorel, Antony, France, assignor to International Standard Electric Corporation, New York, N. Y., a corporation of Delaware Application October 20, 1953, Serial No. 387,112

Claims priority, application France November 10, 1952

19 Claims. (Cl. 179—22)

Figure 1:
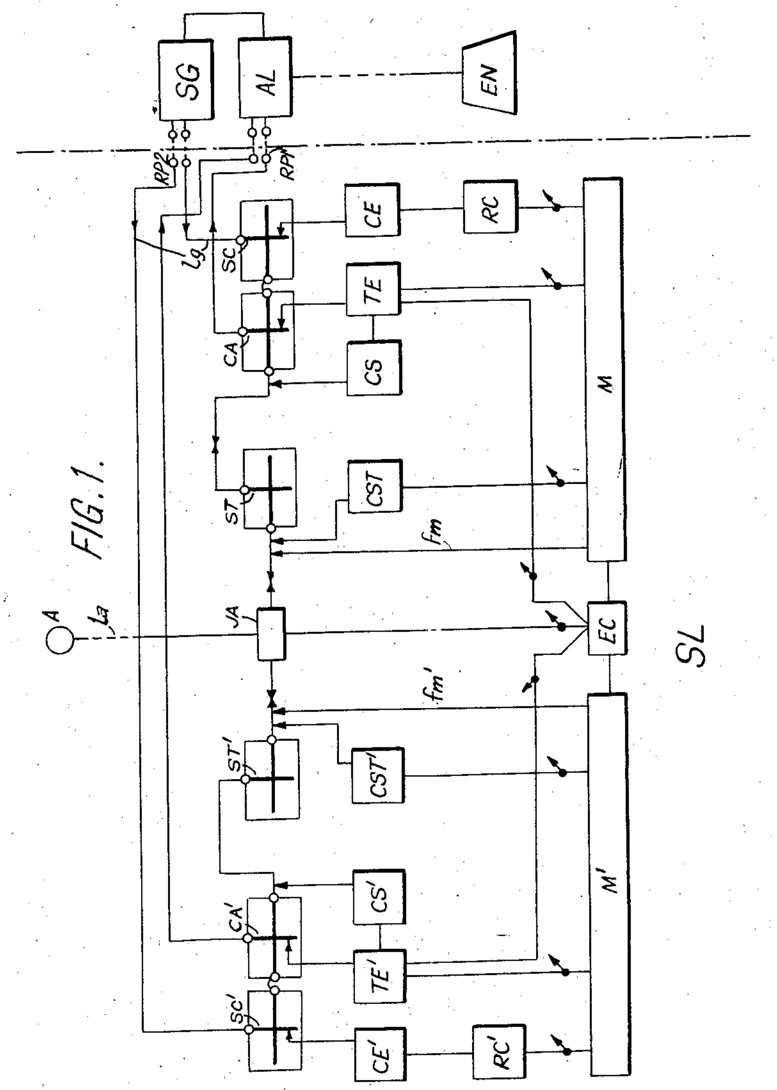

In certain automatic telephone systems the subscribers of an exchange are divided up into a plurality of groups; a first device or "group-selecting means" is provided to effect, within an exchange, the selection of the group corresponding to the call number dialed, a second device or "line-selecting means," individual to each group, being capable of performing two different functions: it chooses the called subscriber within the group or it provides a connection between a calling subscriber and the selectors.

In the case of low-capacity exchanges it is not necessary to provide the group-selecting means, the line-selecting means by itself selecting the called subscriber in the exchange.

All these arrangements are particularly applicable to the case of certain automatic switchboards using crossbar multi-connectors. In these automatic switchboards the line-selecting means consists of a combination of several finder and selector stages each comprising several individual switches of multi-selectors controlled by common control devices. The subscribers in the group served by the line-selecting means are divided up into sub-groups; a "call finder" stage selects the sub-group comprising the calling subscriber; a "sub-group selector" stage performs the same functions for a called subscriber; finally, a "terminal selector" stage selects the subscriber within the sub-group, be he a called or a calling subscriber. Among the common control devices is provided a "marker," which, in the case of a calling subscriber, as well as in the case of a called subscriber, registers various indications relative to the identity of the subscriber and plays an active role in the various hunting or selecting operations.

One of the objects of the invention lies in a line-selecting means using simplified markers, the hunting and selecting operations being assigned to other common control devices, without this involving an added complication for them.

One of the features of the invention lies in a device using, for connecting a calling subscriber to the selectors, a combination of the following members:

(*a*) A "call finder" and a "terminal selector," which ensure the continuity of the line wires between the calling subscriber and the selectors;

(*b*) A "tester" common to the call finders of the same section, that is, to those giving access to the same lines, and determining which one of the latter is to route the call;

(*c*) An "outgoing connector" common to the call finders of the same section, to control the hunting for a line to a terminal selector capable of routing the call;

(*d*) A "terminal-selector connector" common to a plurality of terminal selectors, to control the hunting for the calling subscriber's line and to connect it to a marker;

(*e*) A "marker" common to all the call-finder and terminal-selector sections of the connecting device between the calling subscriber and the selector and temporarily associated with the above control members, the role of the marker, in the hunting for the calling subscriber, being limited to marking said line on the banks of the terminal selectors, the various hunting operations being performed by the selection magnets of the multi-selectors, which are comprised in the connectors.

Another feature of the invention lies in a line-selecting means consisting of a combination of a plurality of member chains each consisting of a connecting device in accordance with the one of the preceding feature, each of these devices having access to all the subscribers in the group and all of these devices being brought into operation when a call is made, making it possible to speed up the routing of the calls and to lessen the risk of lost calls if all or part of the members of the various chains are busy.

Another feature of the invention lies in the fact that when a subscriber removes his receiver his call is received by all the testers capable of routing the call, only one tester remaining in service in each chain and the others being eliminated, the tester remaining in service choosing a finder capable of routing the call and thereupon causing the seizure of the marker, which marks the calling subscriber's line on the banks of all the available terminal selectors controlled by it, said selectors being in turn marked "calling" on the banks of the call finders.

Another feature of the invention lies in the fact that, when the tester has chosen a free call finder, it sends a signal to the feeder associated with said finder, so as to control the various operations involved in the connection of said feeder to a free register.

Another feature of the invention lies in the fact that the marker, after having been seized by the tester, in turn causes the seizure of the outgoing connector serving the call-finder section corresponding to said tester, said connector proceeding to hunt for a terminal selector in calling position, the connector assigned to the terminal selector selected thereupon proceeding to hunt for the calling subscriber's line.

Another feature of the invention lies in arrangements for preventing the seizure of a tester in case the call finders capable of being reached by said tester have access only to busy terminal selectors in the sub-group comprising the calling subscriber, the call being then handled by another tester of the chain and being lost only if all the line-selecting means' terminal selectors assigned to the sub-group involved are busy.

To prevent a tester from always selecting the same call finder, which might be out of order, a distributor can be used that, after the routing of each call, will receive a pulse and change the order of priority given to the various finders. This distributer will consist, for example, of groups of known counting relays, said pulses being received by the first group of counting relays, said group acting upon the next, and so on, the operating cycle of each group being twice as long as that of the preceding one. By using $n$ groups of counting relays, an operating cycle is obtained of $2^n$ times. Contacts associated with these counting relays are arranged in a pyramid and cause the application of a given polarity to the various outputs of the distributer in succession, each of said outputs corresponding to a given order of priority in the selection of the various call finders.

Another feature of the invention lies in a distributer consisting of a combination of several counting-relay groups, the switching in of said distributer being effected by means of removable connections each connected to a relay contact of a given group so that, if one of these connections and one alone is made, the contact associated with that connection is opened after the reception of a number of pulses corresponding to an exact power of 2, thus causing the homing of the distributer, the length of the operating cycle depending upon the connection made, making it possible, by simply displacing removable connections, to design a distributer adapted to the number of call finders required by the traffic if this number is an exact power of 2.

Another feature of the invention lies in making two or more of the removable connections of the preceding feature, the distributer homing only when all the contacts associated with said connections are opened, the length of the distributor's operating cycle being equal to the sum of those obtained by making each connection alone, making it possible, by simply displacing removable connections, always to design a distributer adapted to the number of call finders required by the traffic.

The line-selecting means also ensures the routing of a call intended for a subscriber in the group. For this purpose use is made of a sub-group selector, a terminal selector and various common control members.

Another feature of the invention lies in the fact that, when a call is received by a sub-group selector, said selector is connected, by means of an incoming connector, to a receiver common to all the selectors of the same section, the call number used for making the selection within the group being received by the receiver and then sent to a marker common to several receivers, said marker placing the line or lines, corresponding to the call number dialed, in operating position on the banks of the terminal selectors all the free terminal selectors assigned to the called sub-group being in turn marked "calling" on the banks of the sub-group selectors.

Another feature of the invention lies in the fact that the marker, after having been seized by the receiver, switches in the outgoing connector assigned to the section of sub-group selectors corresponding to said receiver, said outgoing connector proceeding to hunt for a terminal selector in calling position, the connector associated with the terminal selector selected proceeding finally to hunt for the subscriber line or lines in calling position, these arrangements making it possible to use a simplified marker whose role, as regards the selection, is limited to receiving a call number and to marking the corresponding line or lines on the banks of the terminal selectors.

Another feature of the invention lies in marking busy for an incoming call, that is, for a call intended for a subscriber in the group, a marker that has already been seized by an outgoing call, that is, by a call from a subscriber in the group; but, if all the markers of the line-selecting means have already been seized by an outgoing call, one of them is automatically released to handle the incoming call, making it possible to handle the incoming call and the outgoing call simultaneously, neither call being lost.

Another feature of the invention lies in the fact that a free called subscriber line can be marked "calling" only on the banks of the terminal selectors, so that, if the called subscriber is busy, no sub-group selector section can receive the call, a device under the control of all these sections sending the receiver seized a signal that is thereupon retransmitted to the register, which then releases the connection already established.

The sub-group selectors of the line-selecting means being divided up into a plurality of sections, it may happen that the section comprising the calling sub-group selector has no direct access to a free terminal selector assigned to the called subscriber's sub-group. To make the connection between the calling sub-group selector and one of said terminal selectors, use is then made of a "cooperating selector," whose outputs are multiplied to the sub-group selectors of a section having direct access to one of said terminal selectors.

Another feature of the invention lies in the fact that a called subscriber line is placed in calling position on the banks of all the terminal selectors assigned to the sub-group comprising that subscriber, such of said terminal selectors as are free being marked "calling" on the banks of all the sub-group selector sections of the line-selecting means, the outgoing connector assigned to the calling sub-group proceeding by priority, if there is no direct access to a free terminal selector in the called sub-group, to hunt for a cooperating selector of a section controlled by the marker seized, a signal being thereupon sent from the calling section to the cooperating section in order to cause said cooperating section to hunt for a terminal selector capable of routing the call, these arrangements preventing the switching in of a second receiver and in most cases the switching in of a second marker, making it possible to speed up the routing of the call.

Another feature of the invention lies in the fact that, when a marker is seized by the receiver of the calling section and there is direct access to the terminal selectors in other sections controlled by the same marker, the outgoing connectors assigned to said sections immediately proceed to hunt for a terminal selector without waiting for the hunting for a cooperating selector by the calling section, these arrangements making it possible to speed up the routing of the call.

Another feature of the invention lies in the fact that, when the hunting for a final selector by the cooperating section is over, said cooperating section sends the calling section a signal, said calling section, after having received that signal and found a free cooperating selector, in turn sending a signal to the marker, thus preparing in said marker the various operations involved in establishing the connection through the various selection stages.

Another feature of the invention lies in the fact that, when the calling section has neither direct access to a terminal selector capable of routing the call nor access to a cooperating selector of a section controlled by the marker seized, the outgoing connector of the calling section selects a cooperating selector in a section controlled by another marker, the receiver seized being thereby isolated from the marker, which releases, and is connected to the marker of the cooperating section, the call number received by said receiver being then sent to the second marker which places the called subscriber line or lines in calling position on the banks of the terminal selectors controlled by it, said terminal selectors being in turn marked "calling" on the banks of the cooperating section, a signal being sent from the calling section to the cooperating section in order to cause said cooperating section to hunt for a calling terminal selector.

Another feature of the invention lies in providing in the calling section a plurality of devices each revealing the presence of a calling line and indicating whether there is in a given section at least one terminal selector to handle the call, these devices allowing the hunting for a cooperating selector in a section having access to at least one terminal selector capable of routing the call, these arrangements being designed to give priority first to lines terminating directly at terminal selectors, then to lines terminating at cooperating selectors controlled by the same marker, the changing of marker being made only when necessary in order not to delay the routing of the call.

Another feature of the invention lies in the fact that, when the hunting for a cooperating selector by the calling section has ended, said calling section tests the cooperating selector chosen and, if the test is unfavorable, that is, if the cooperating selector selected is seized by another sub-group selector or is out of order, another cooperating selector is hunted for, this hunting being done in a different order, the priority of the cooperating section served by the same marker over a cooperating section served by another marker being particularly eliminated, these various arrangements making it possible to lessen the risk of losing a call.

Another feature of the invention lies in the fact that, when the hunting for a cooperating selector by the calling section has ended, a connecting circuit is completed between the calling section and the selected cooperating section through the common control members of these two sections, said circuit comprising a relay in the calling section and a relay in the cooperating section, this latter relay operating only to control if need be the hunting in the cooperating section, a resistance being eliminated after said hunting in order to cause the operation of the relay in the calling section, this latter relay then preparing the various operations involved in the connection.

Another feature of the invention lies in providing in each section a relay performing different functions according to whether the section involved is used as a calling section or as a cooperating section, said relay, in the case of a cooperating section, operating when the hunting for a terminal selector has ended and eliminating a resistance in order to allow the operation of the similar relay in the calling section, and said relay, in the case of a calling section, operating when the cooperating section sends out an end-of-hunting signal and preparing in the marker the various operations involved in establishing the connection across the various selectors.

Another feature of the invention lies in the fact that, when the calling section has free access to a terminal selector, the relay of the preceding feature is used to signal the end of the hunting for a terminal selector by the calling section and prepares in the marker the various operations involved in establishing the connection through the sub-group and terminal selectors.

Figure 2:
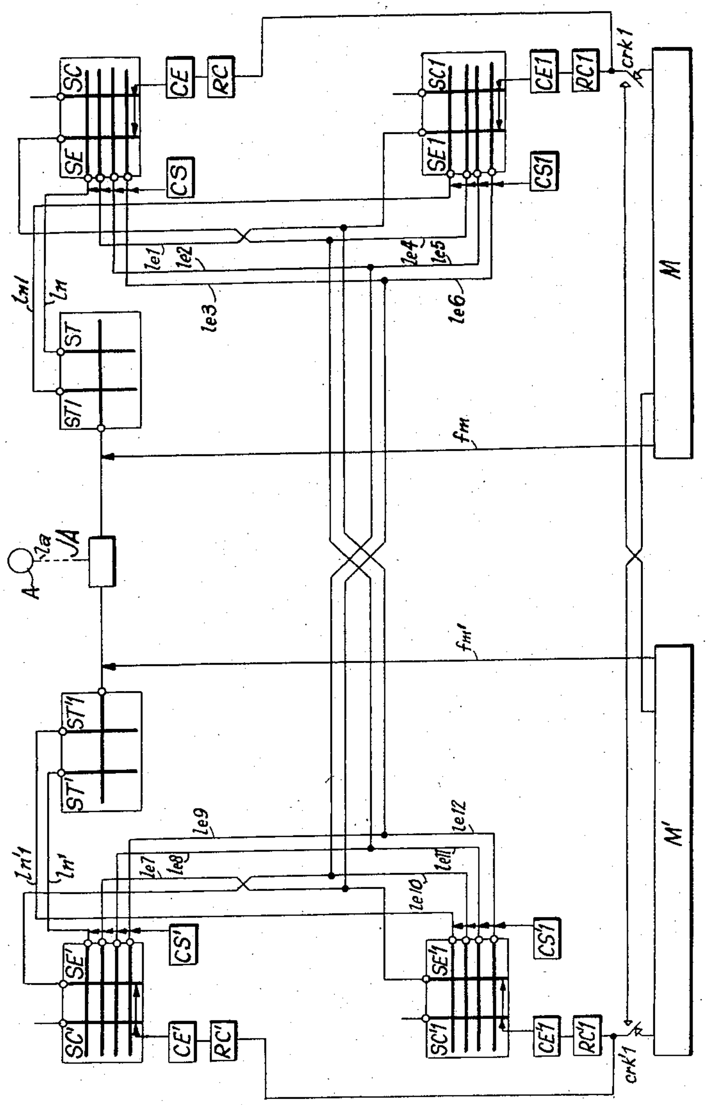
Figure 3:
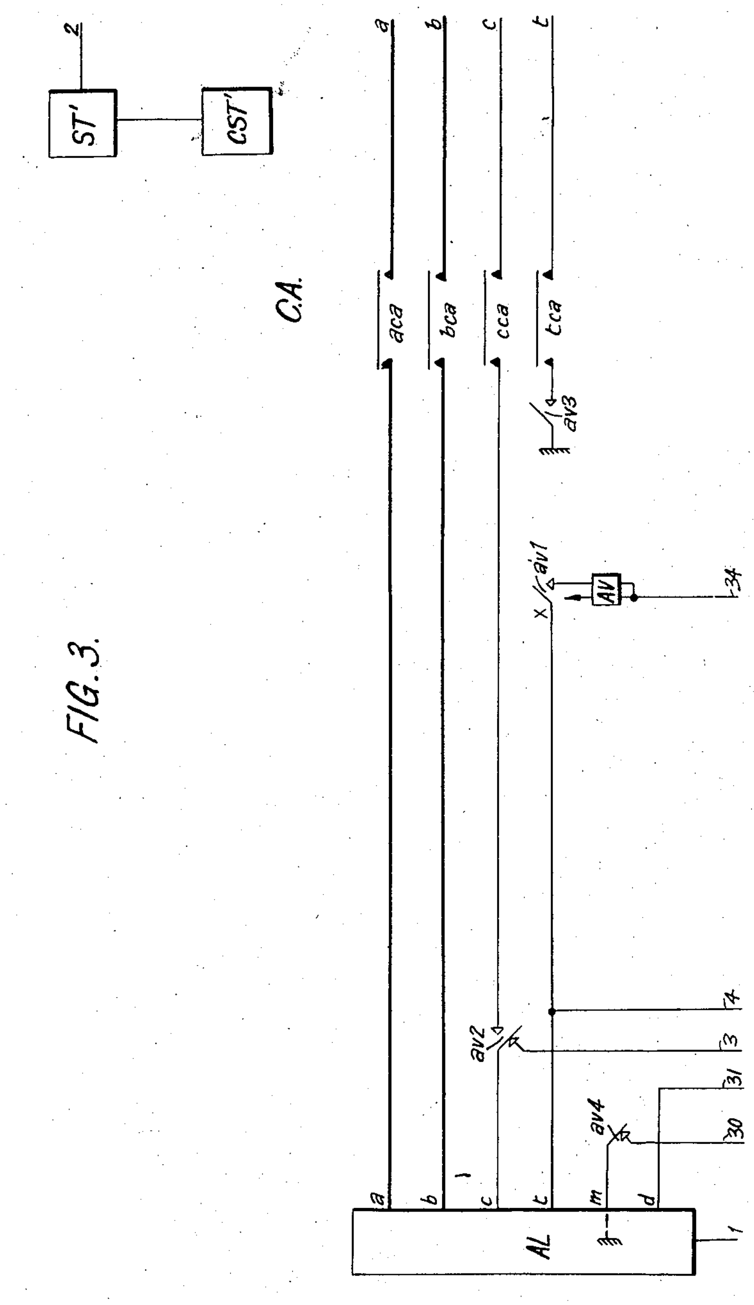
Figure 4:
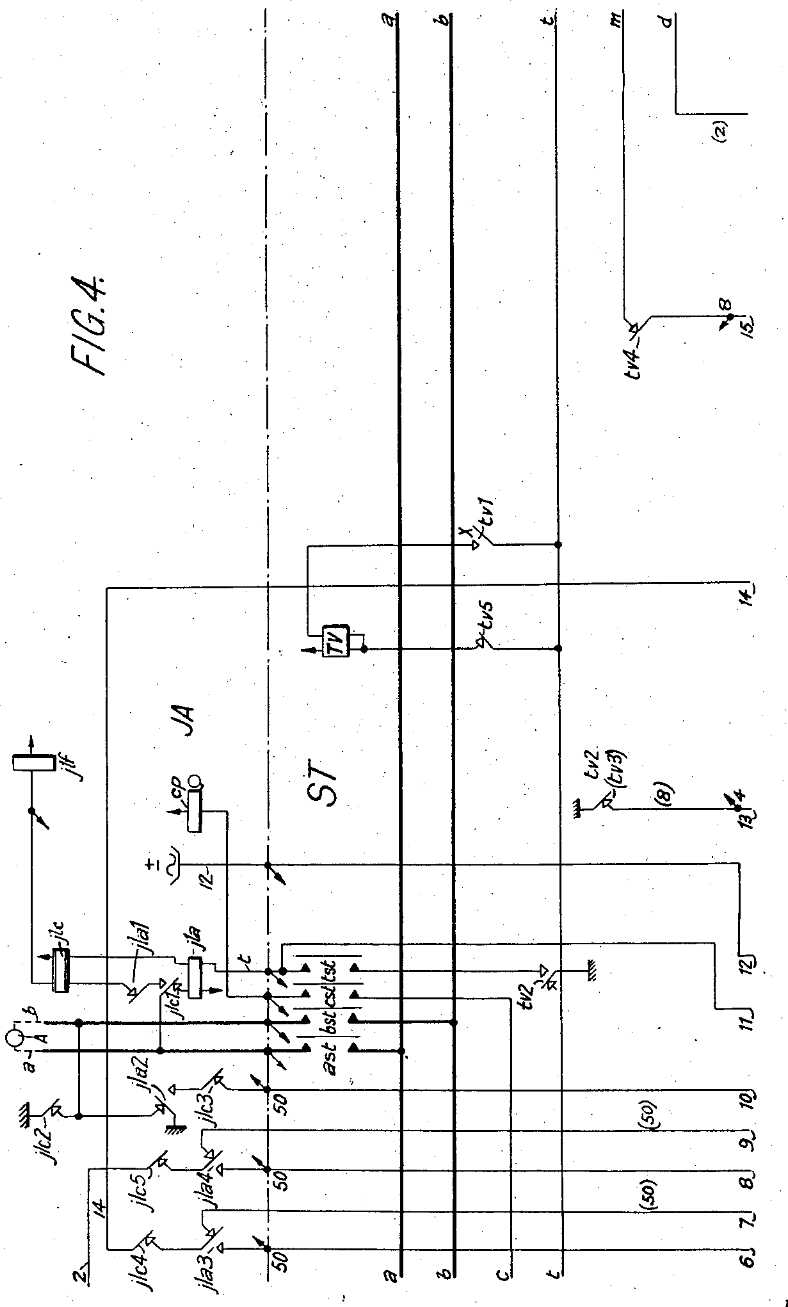
Figure 5:
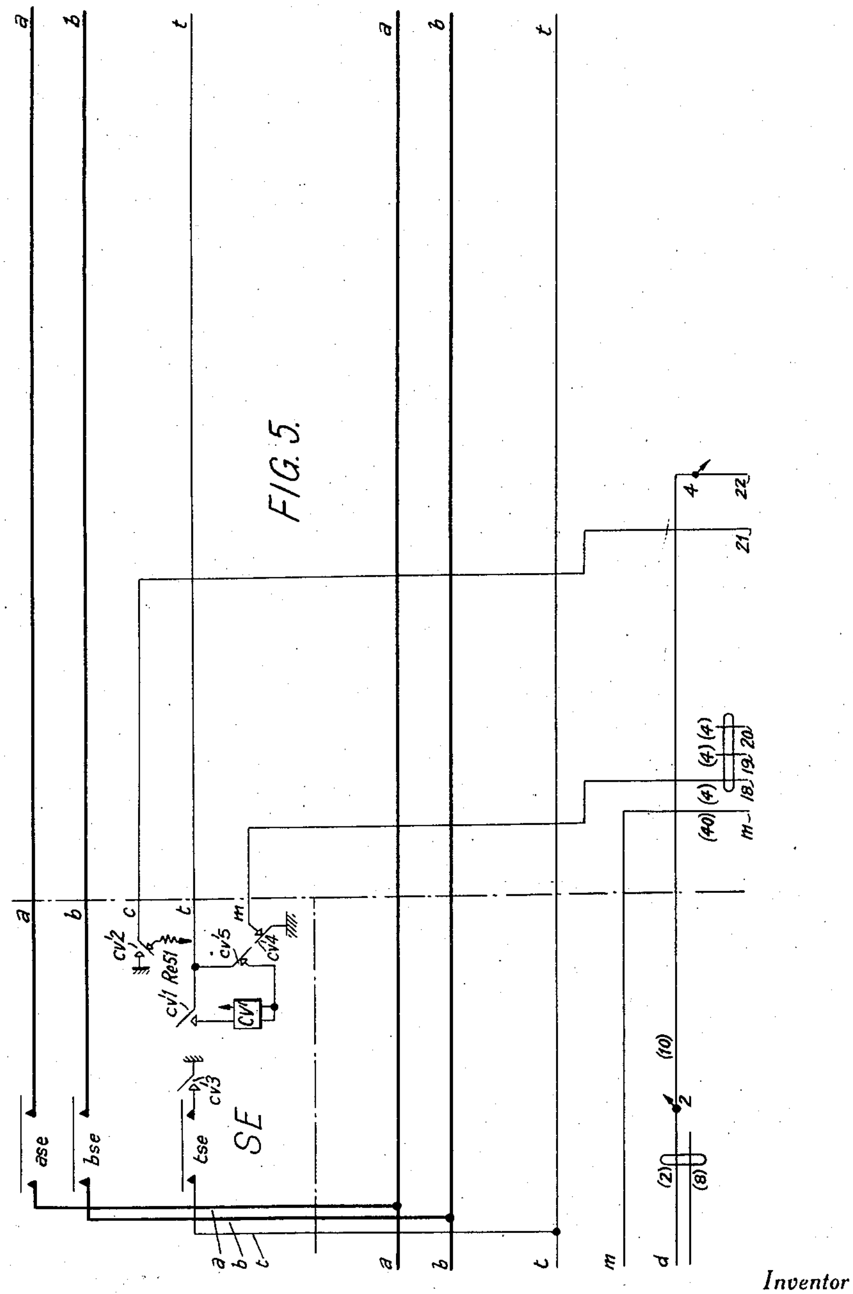
Figure 6:
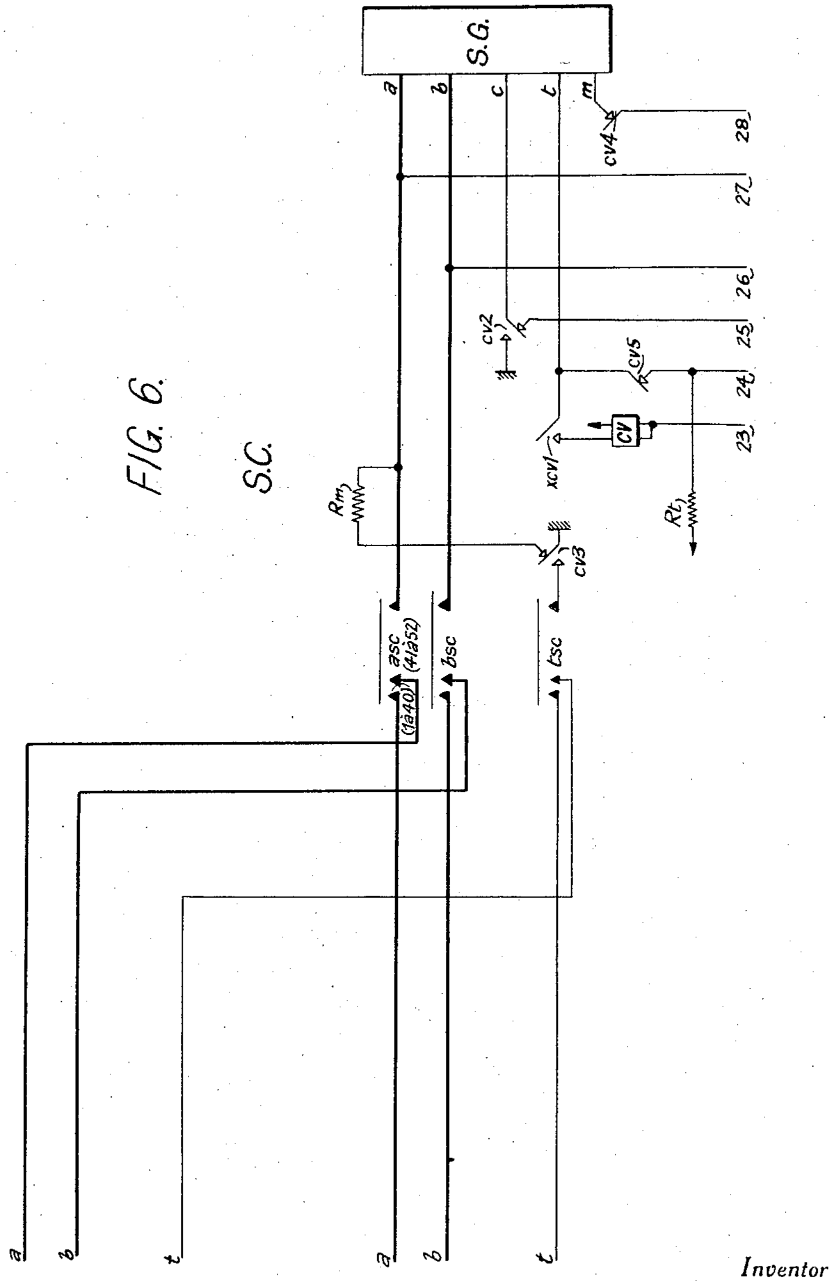
Figure 7:
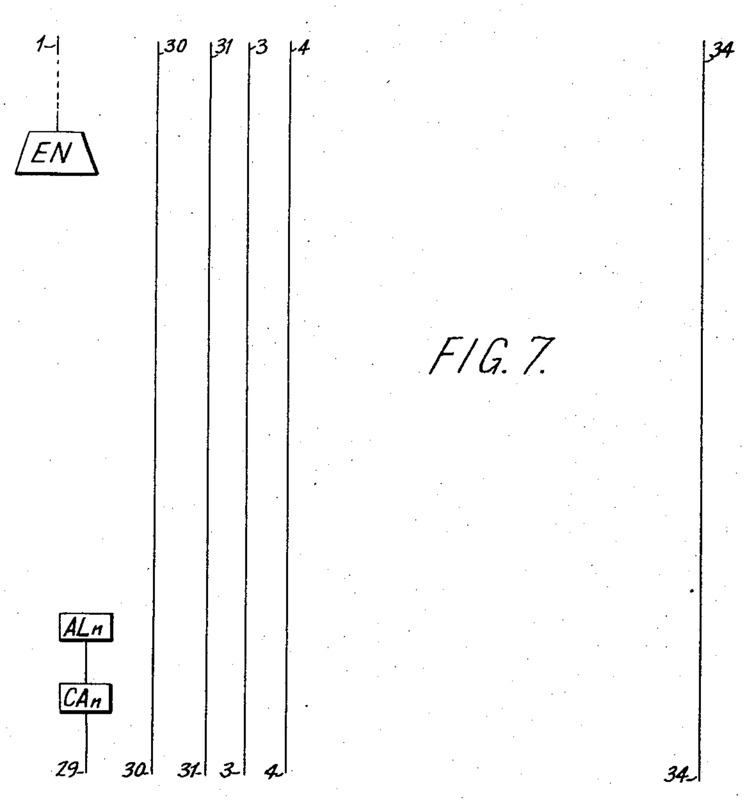
Figure 8:
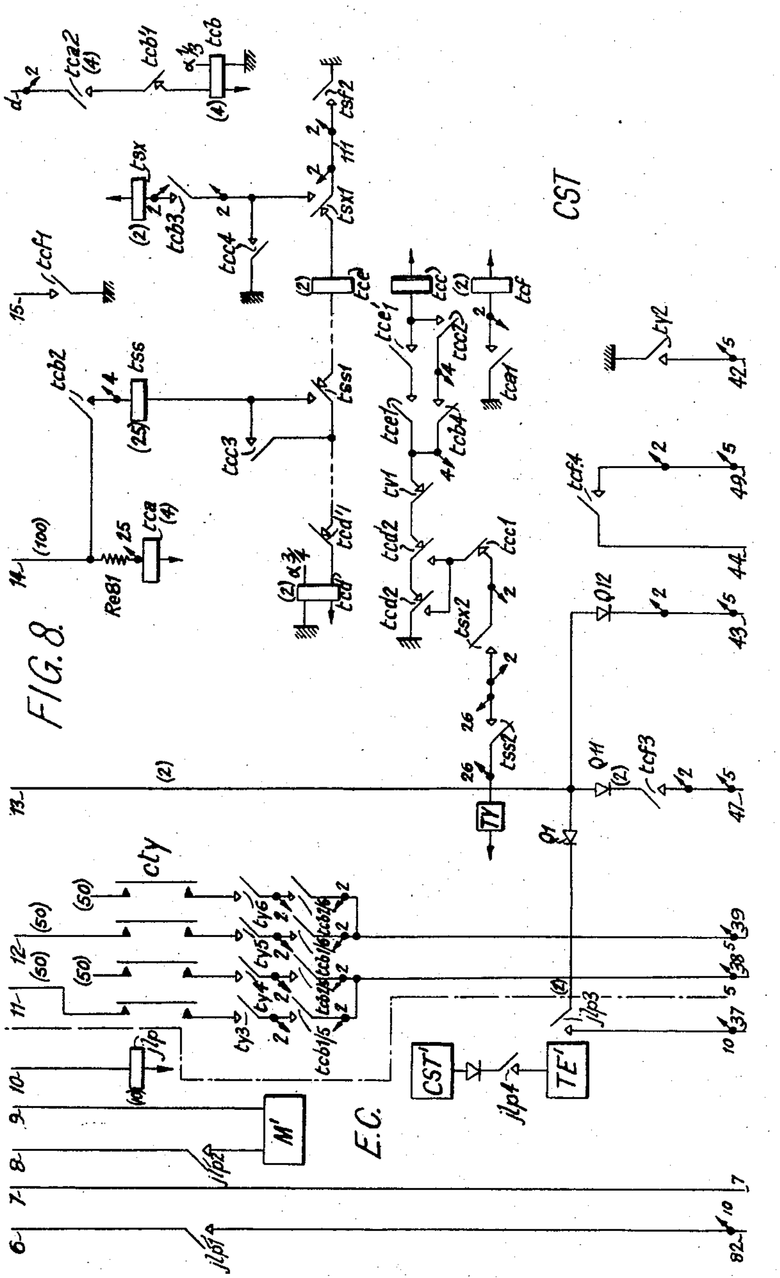
Figure 9:
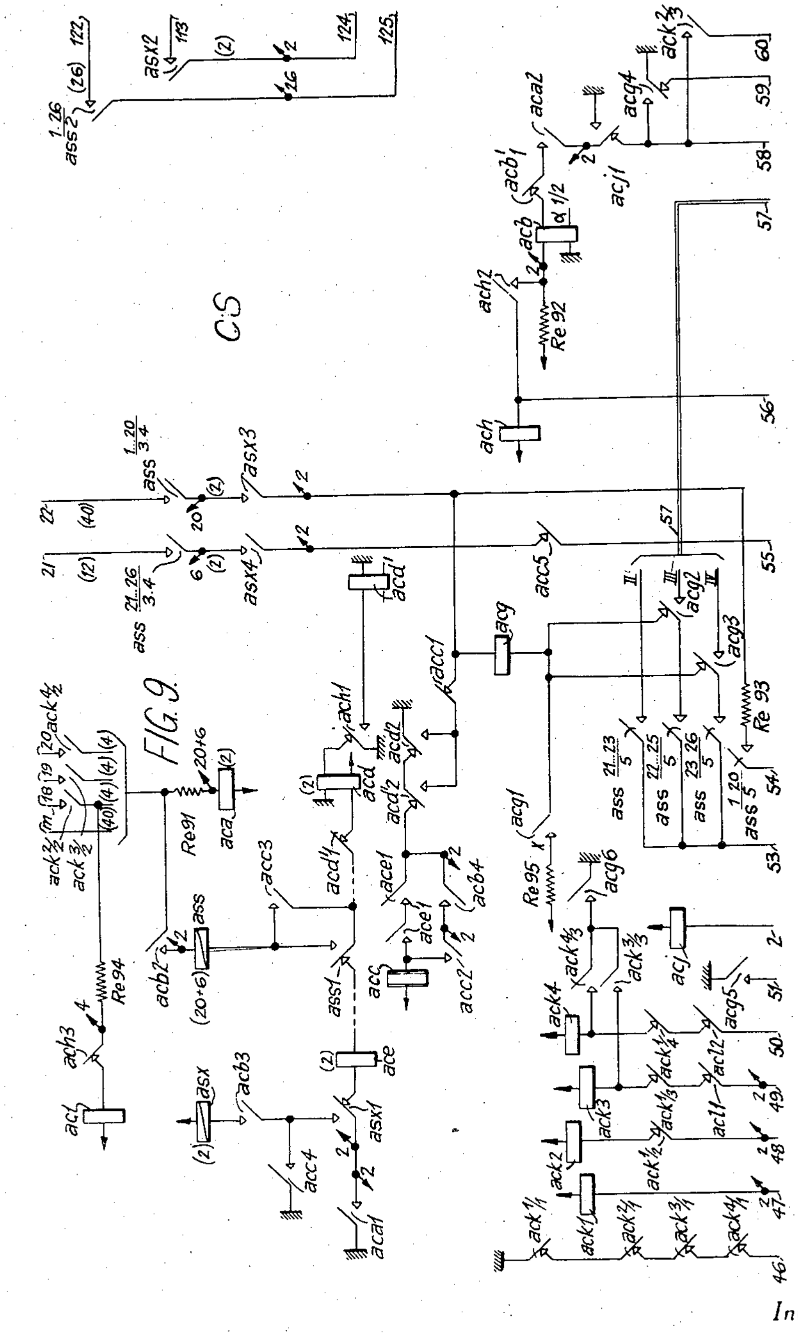
Figure 10:
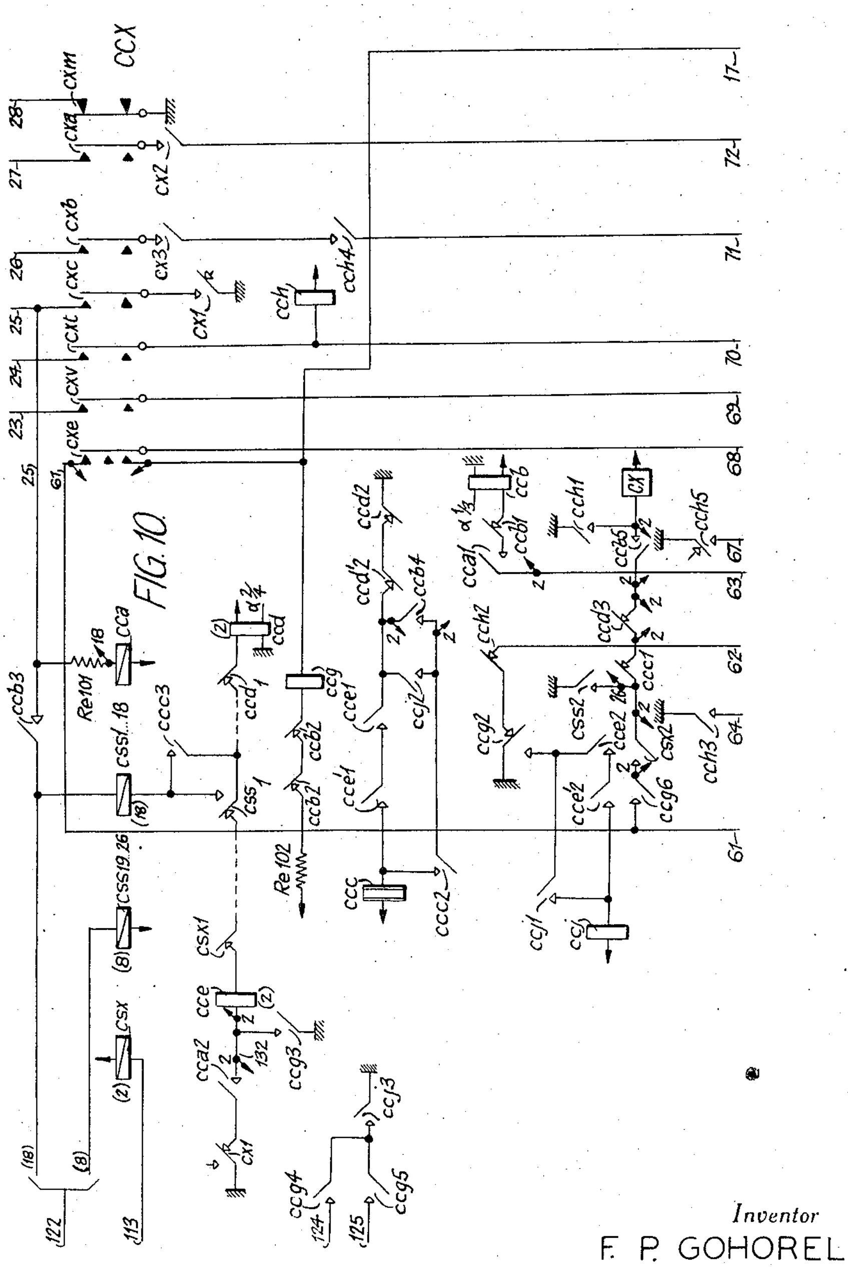
Figure 11:
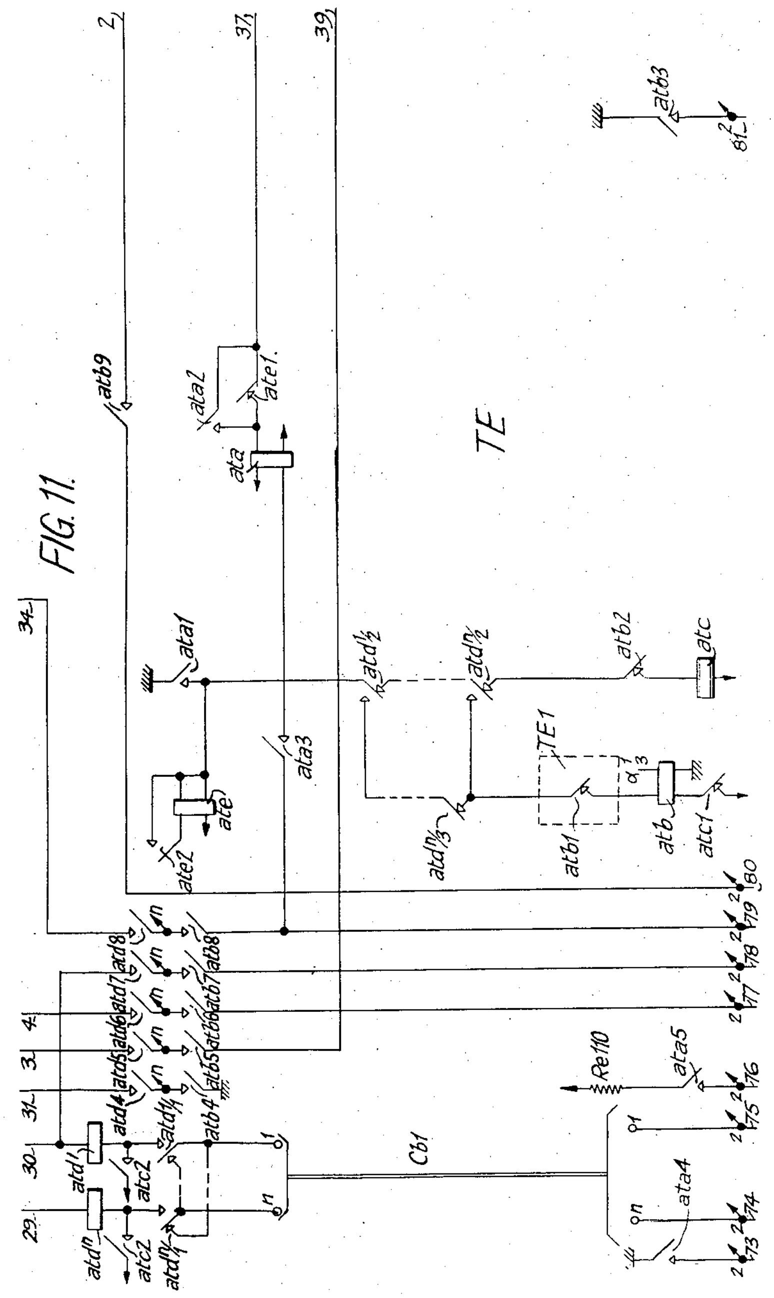
Figure 12:
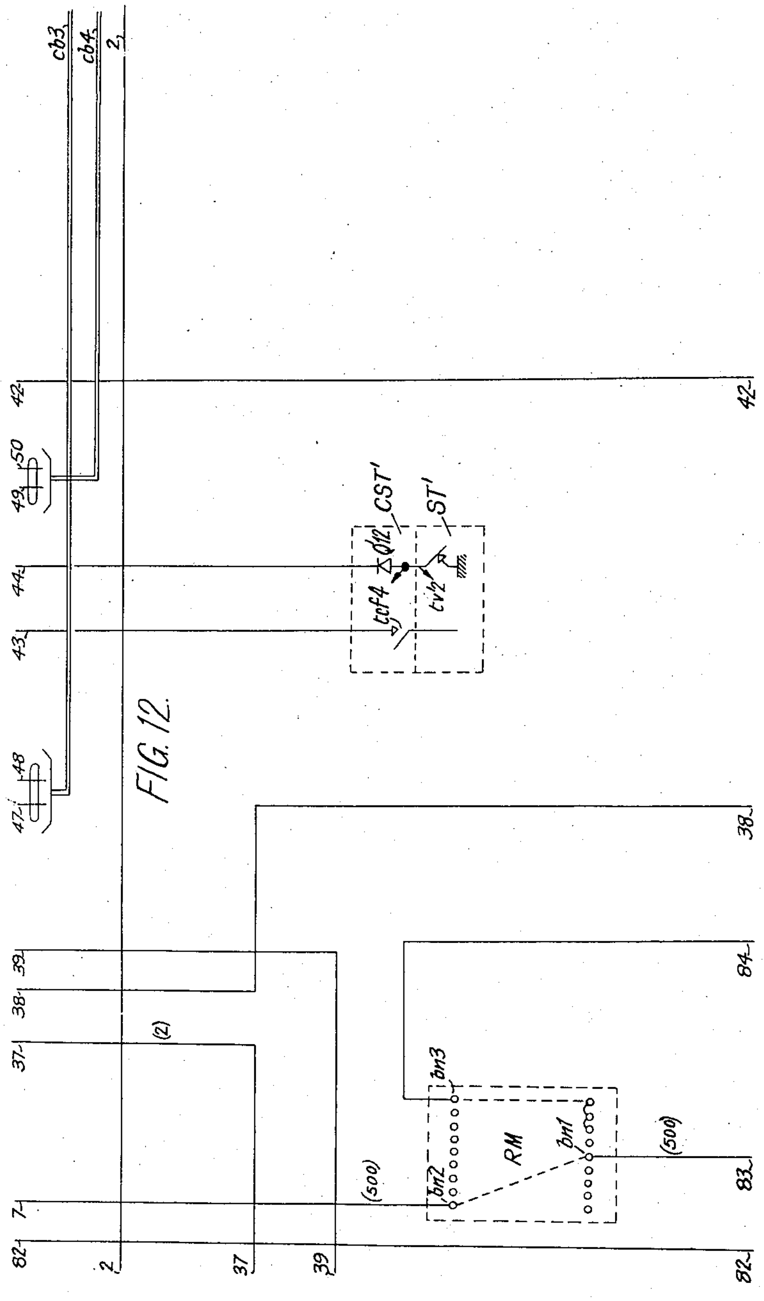
Figure 13:
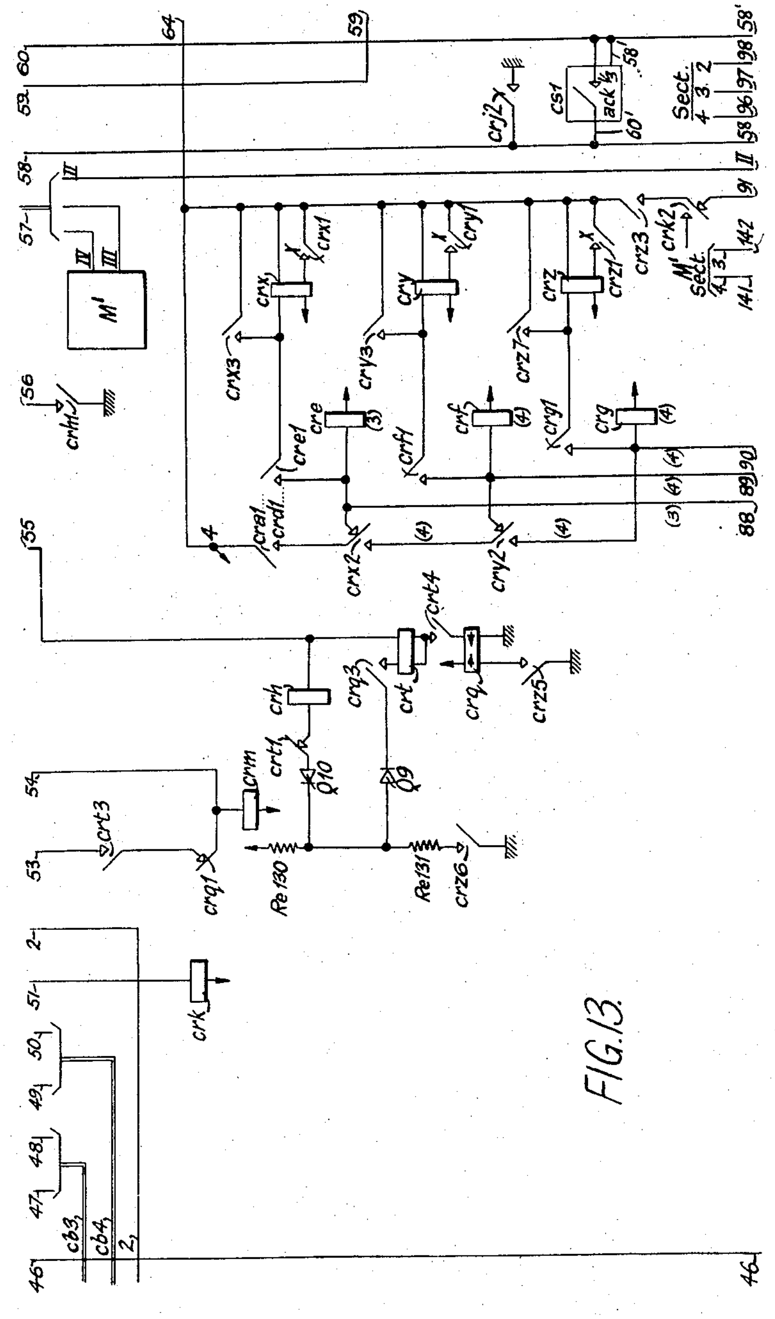
Figure 14:
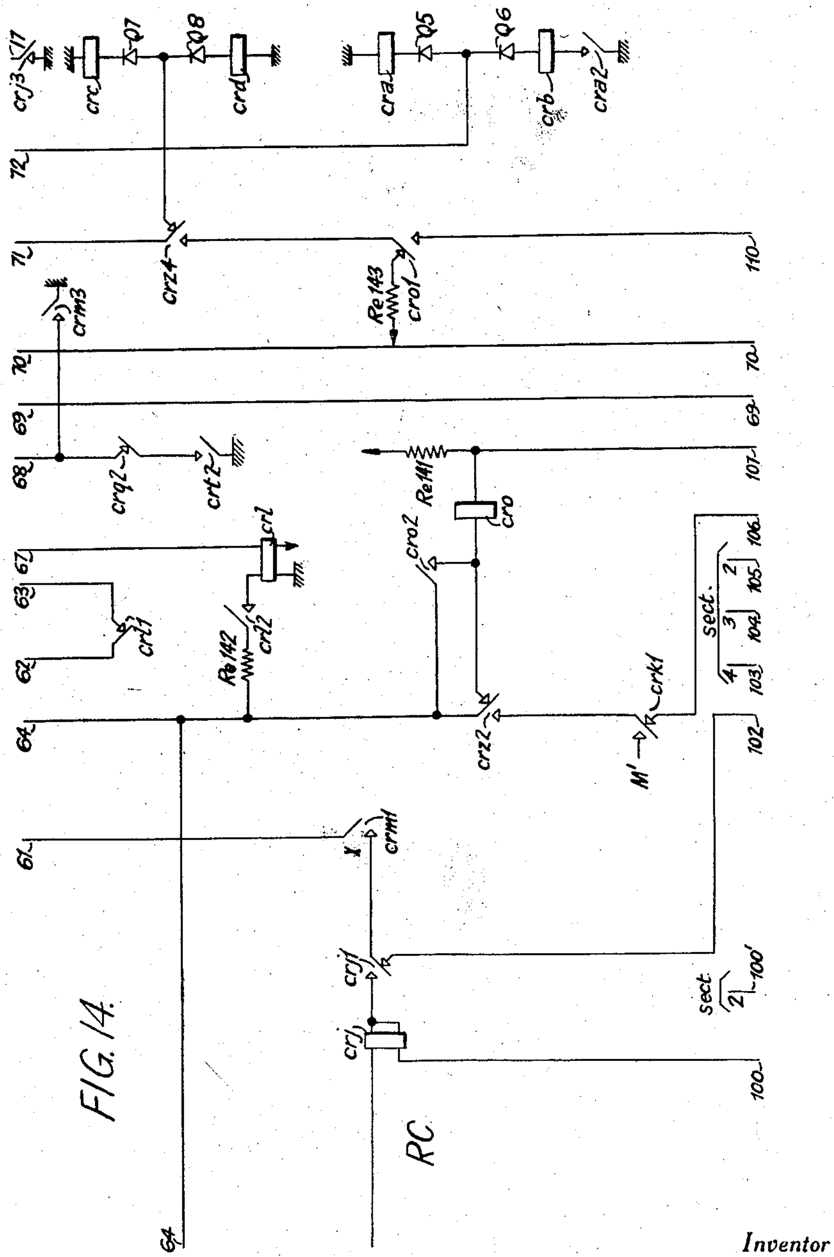
Figure 15:
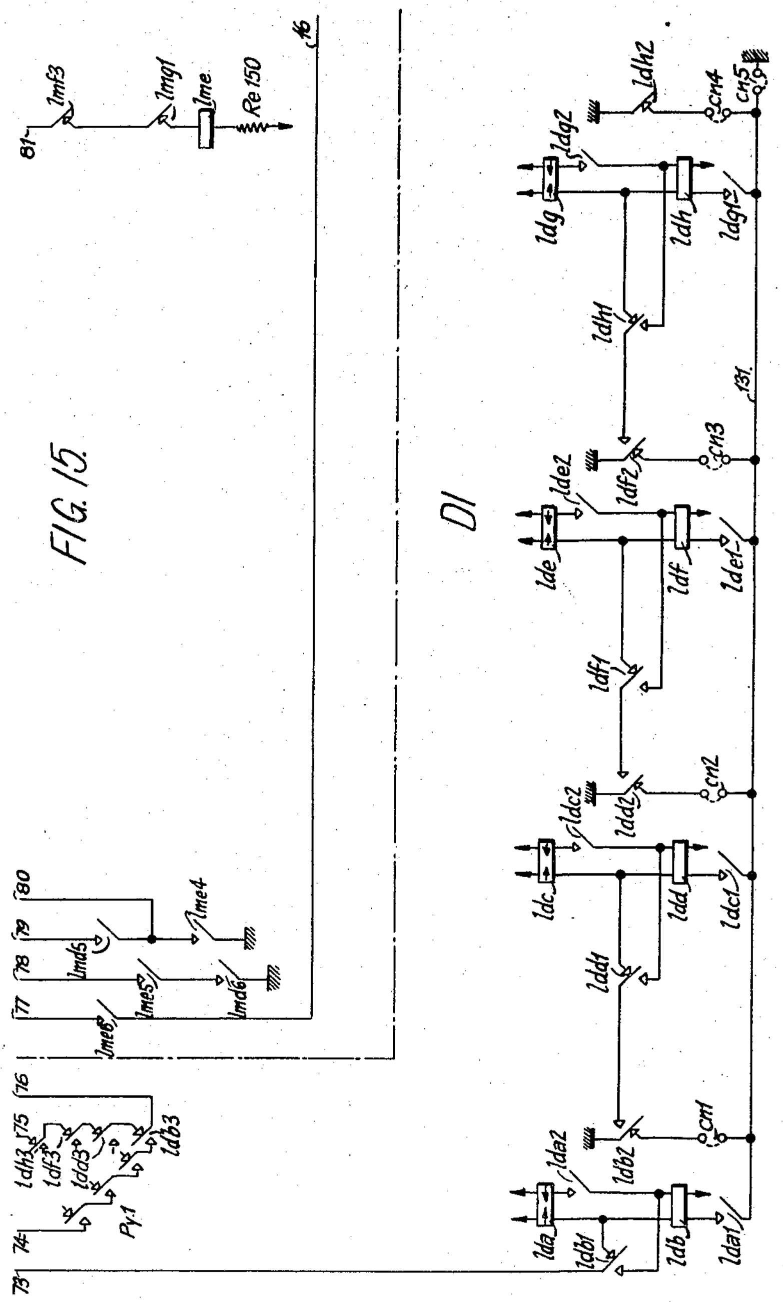
Figure 16:
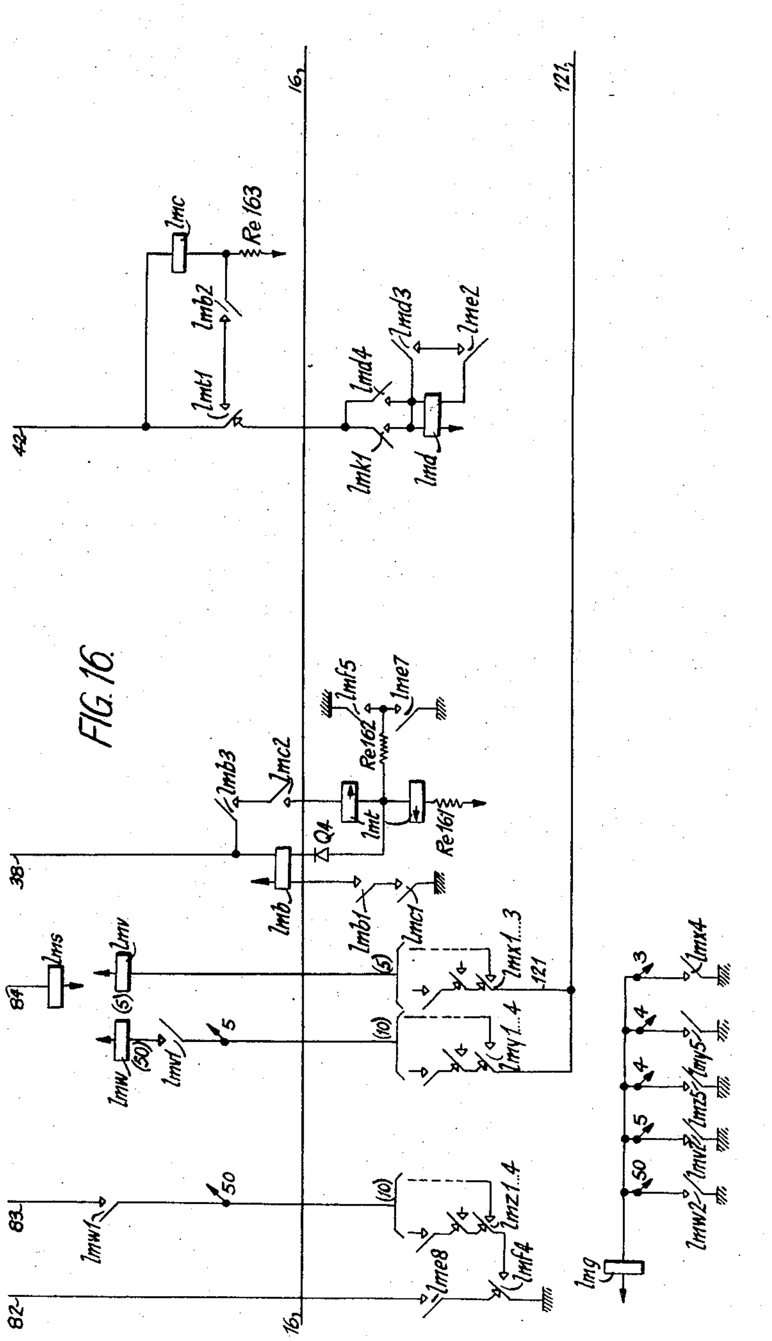
Figure 17:
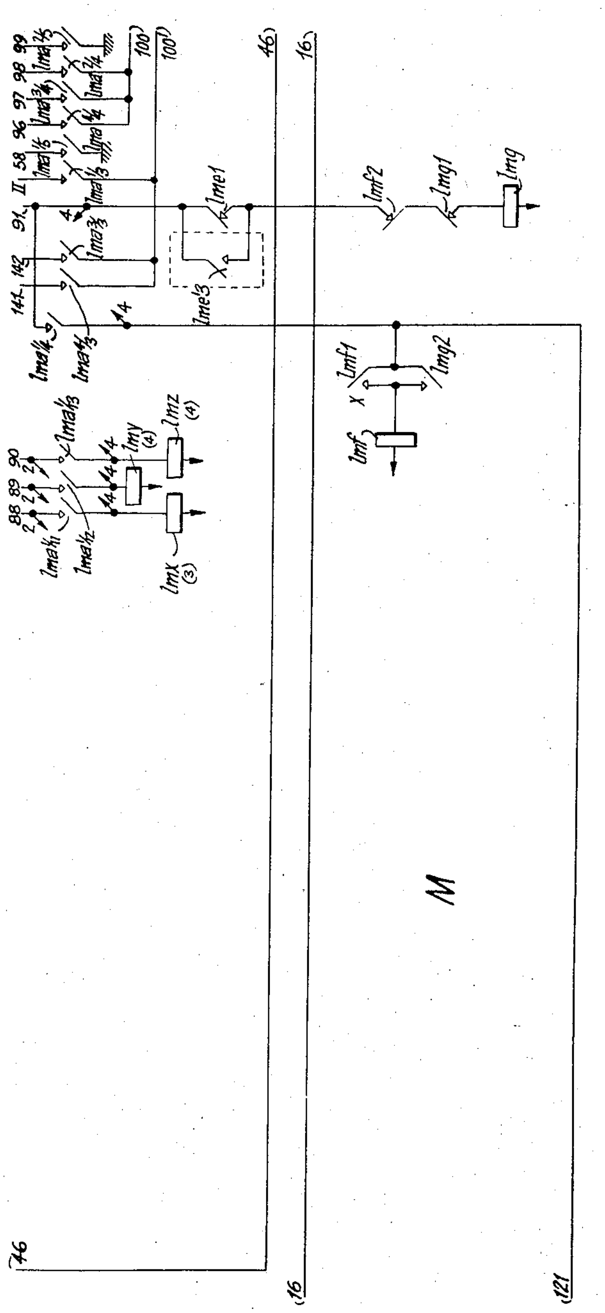
Figure 18:
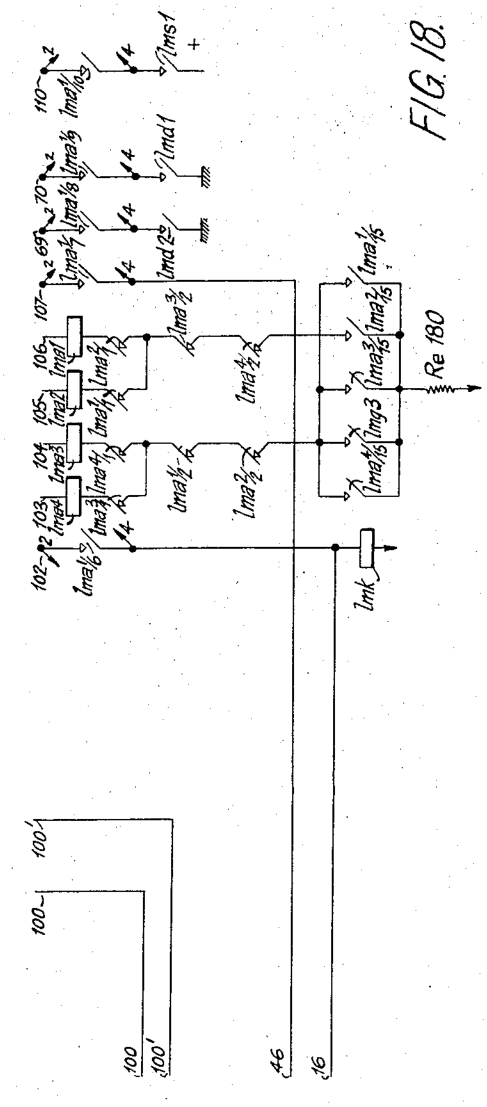
Figure 19:
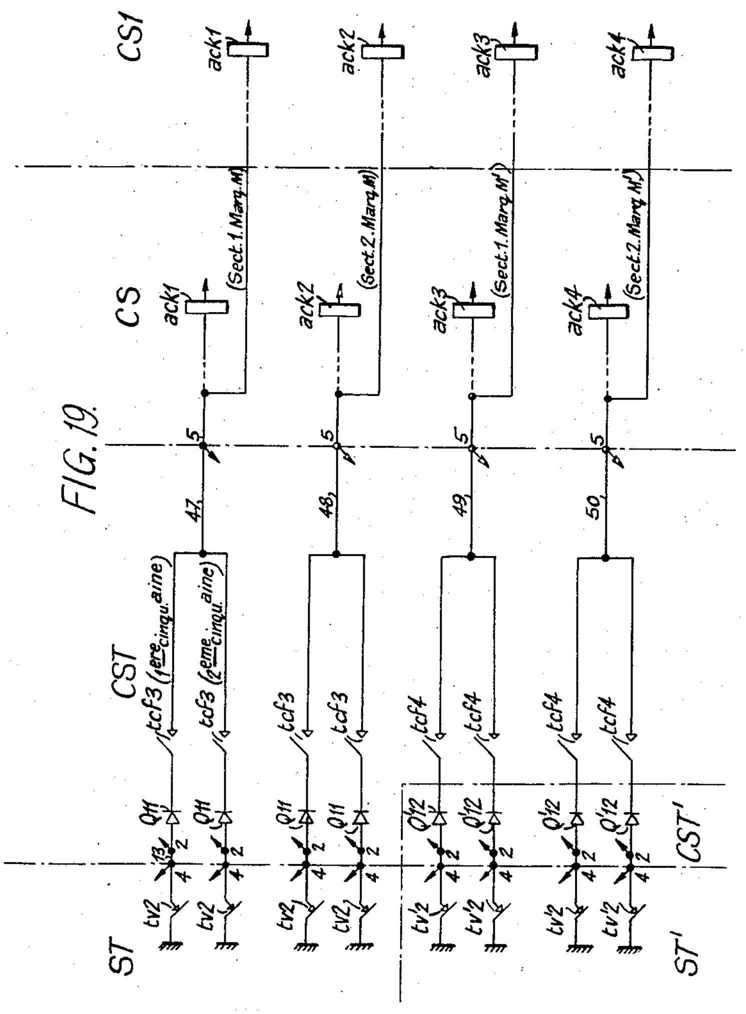
Figure 20:
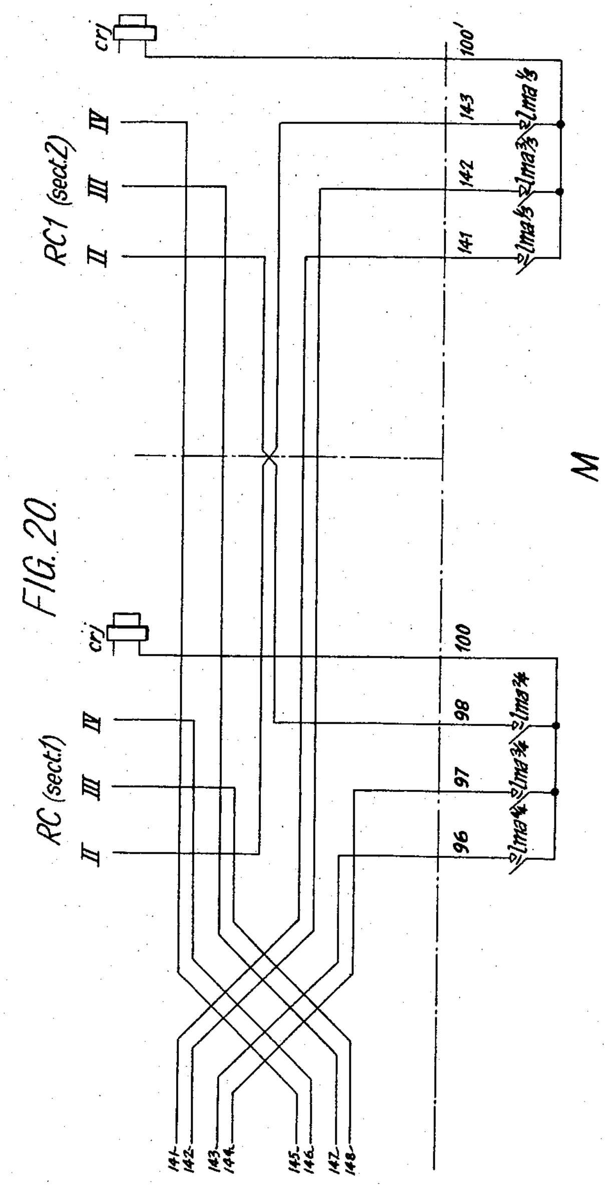
Figure 21:
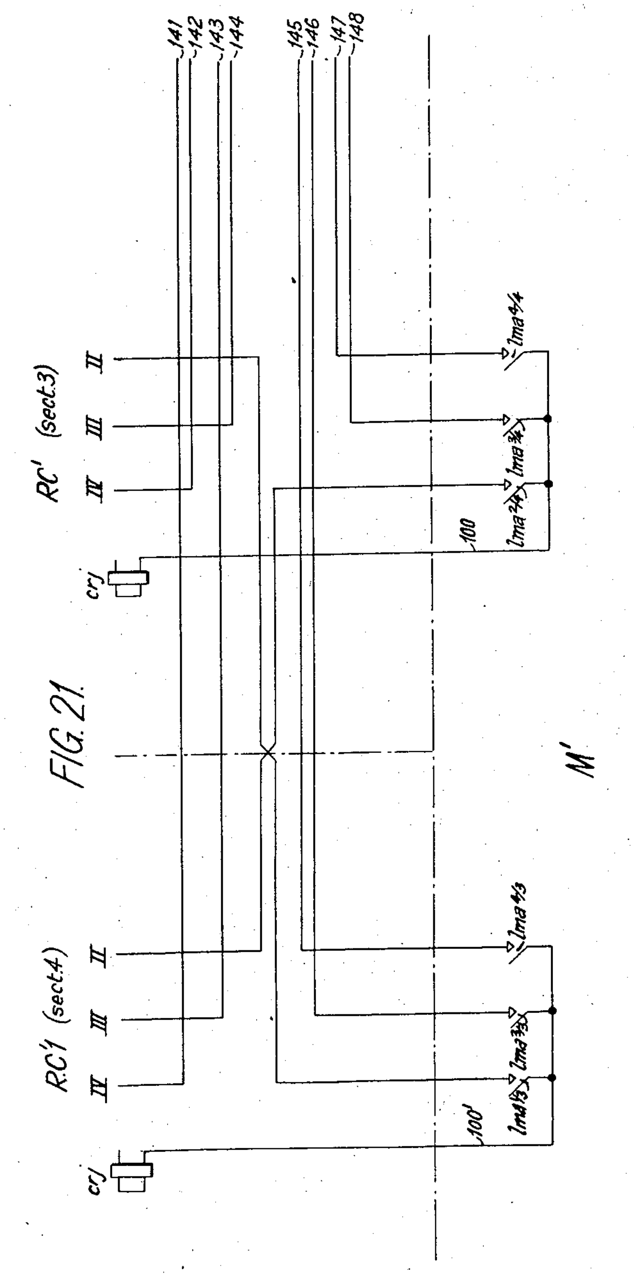
Figure 22:
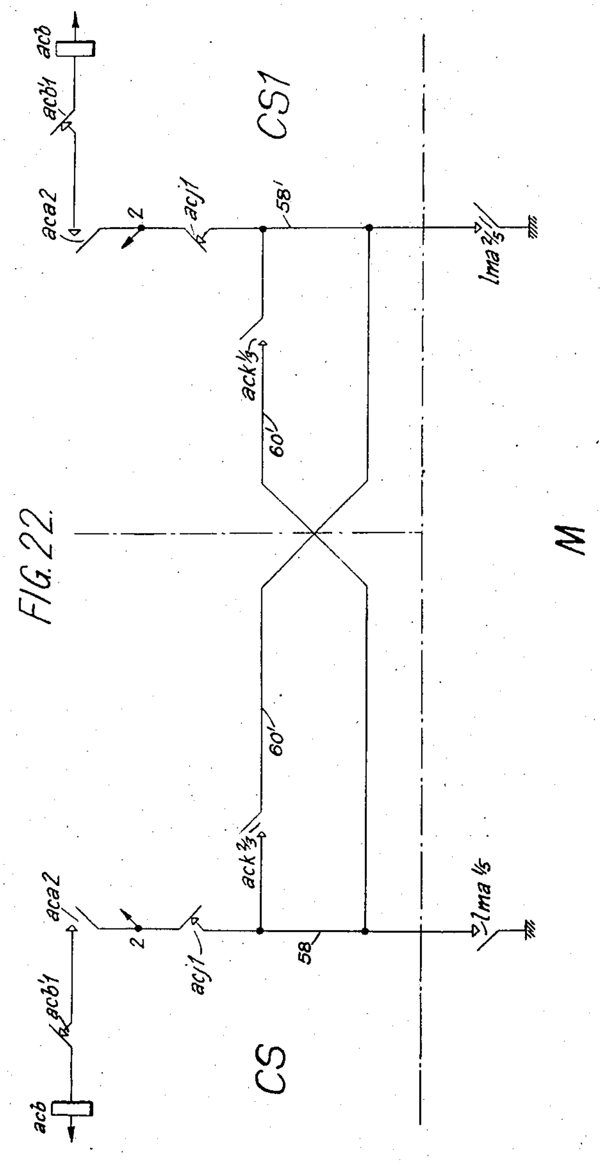
Figure 23:
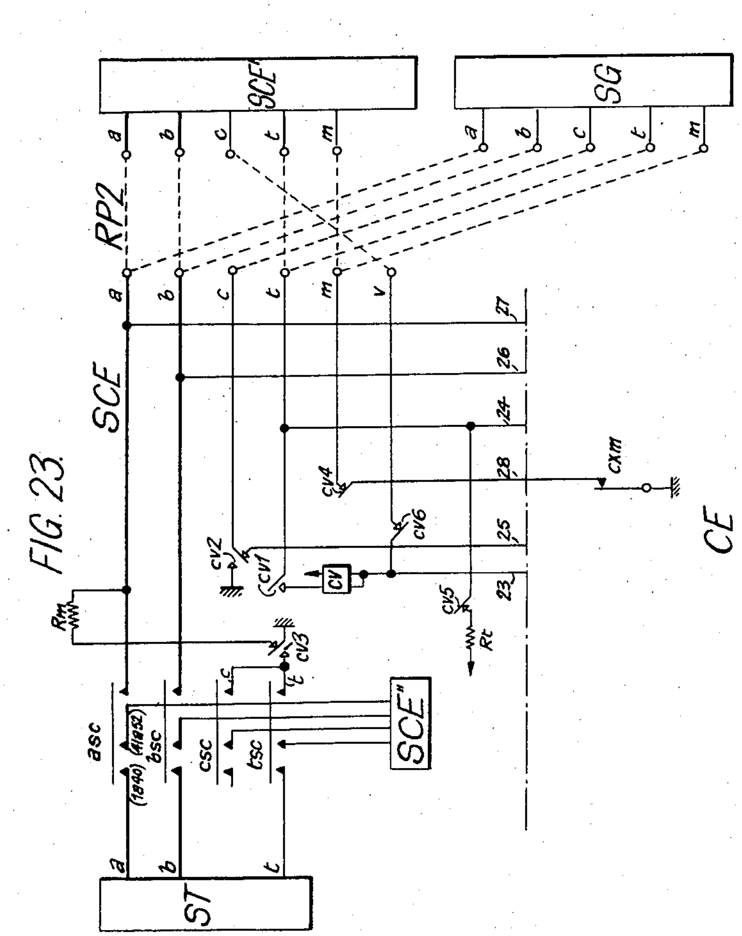
Figure 24:
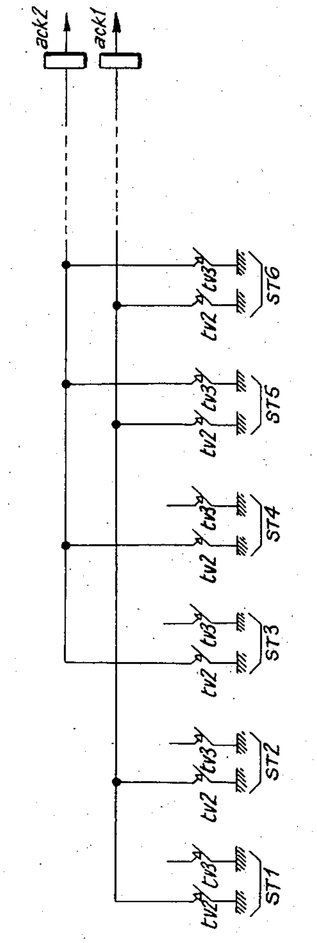
Figure 25:
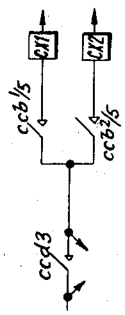
Figure 26:
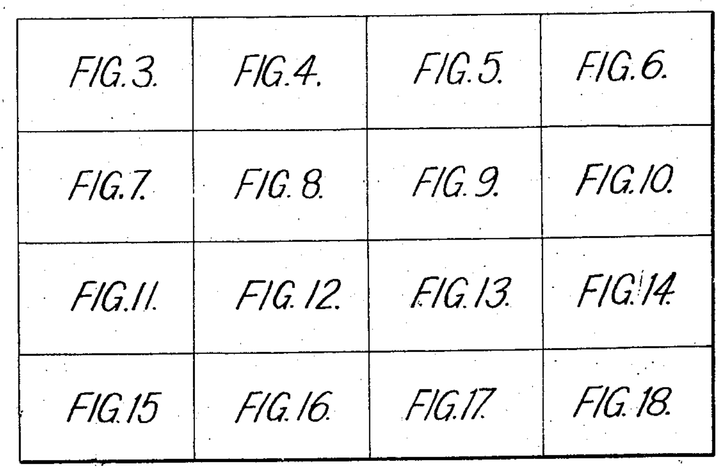
Figure 27:
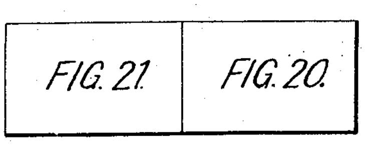

Various other features will appear from the following description, given as a nonlimitative example, with reference to the appended drawing, wherein:

Fig. 1 shows the wiring diagram of a line-selecting means showing only the arrangements relative to the cooperating stage;

Fig. 2, the wiring diagram of the cooperating stage;

Fig. 3, the schematic of a call finder;

Fig. 4, the schematic of a subscriber-line connector and of a terminal-selector connector (the term "connector" will be used throughout what follows to designate the assemblage of members arranged at the end of a circuit or of a line and intended to connect the circuit or the line to the equipment of the exchange);

Fig. 5, the schematic of a cooperating selector, as also the connections between the fifties selector and the terminal selector and between the fifties selector and the cooperating selector;

Fig. 6, the schematic of a fifties selector;

Fig. 7, the connections between the call finder and the associated control member;

Fig. 8, the schematic of a terminal-selector connector and of a common equipment EC registering the calls;

Fig. 9, the schematic of an outgoing connector for fifties selectors and call finders;

Fig. 10, the schematic of an incoming connector for fifties selectors;

Fig. 11, the schematic of a tester;

Fig. 12, a simplified representation of a marking distributor, as also various connections between common members;

Figs. 13 and 14, the schematic of a receiver;

Fig. 15, the schematic of a distributor and of part of the marker;

Figs. 16 to 18, the schematic of the marker, with the exception of the part already shown in Fig. 15;

Fig. 19, a detail schematic of the circuits marking the availability of the terminal selectors on the banks of the fifties selectors or of the call finders;

Figs. 20 and 21, a detail schematic of the various connections between a calling section and a cooperating section;

Fig. 22, a detail schematic of the circuits controlling the hunting by the cooperating selection stage;

Fig. 23, the schematic of a selector capable of being used either as a fifties selector or as a cooperating selector;

Fig. 24, the schematic of the connections made in the terminal selectors in the case where a grading is used between said selectors and the fifties selectors and the call finders;

Fig. 25, a detail schematic showing the changes to be introduced in the incoming connector of the fifties selector in the case of a high number of selectors;

Fig. 26, the plan for associating Figs. 3 to 18;

Fig. 27, the plan for associating Figs. 20 to 21.

The general operation of the system will now be described, with reference to the diagram of Fig. 1.

It will be assumed throughout what follows that the switches used for establishing a connection are cross-bar switches or multi-connectors of a known type comprising a certain number of individual switches. The selection of a given outgoing line is effected by means of members called "selecting bars." Each of these bars is associated with two selection magnets and can take two operating positions depending upon the magnet energized. On taking one of these positions, said bar prepares the connection of an individual switch to two outgoing lines. The selection of one of these lines is effected by causing the operation of one or the other of the two magnets associated with a supplementary selecting bar or "switching magnets," according to a known principle. If $a$ designates the number of selecting bars (without counting the supplementary bar), $2\times a$ selection magnets are obtained and it becomes possible to select two series of lines each comprising $2\times a$ lines. The selection of one series of lines is effected by one of the two magnets associated with the supplementary bar; the selection of the line within the series is effected by one of the $2\times a$ selection magnets mentioned above.

The selection magnets only prepare the connection of an individual switch to a line, said connection being caused by a bar operated by an operating or connecting magnet individual to each individual switch. The connection is held as long as this magnet remains energized, regardless of the position of the selection magnet that has prepared the connection. In the descriptions that follow the various individual switches of a multi-selector are used for putting through the calls, but one or more of them are set aside to effect the connection between one of the other switches and the common control member.

The term "frame" will be used throughout what follows to designate the assemblage of individual switches of the same multi-selector.

It is also possible, according to a known method, not to bring the supplementary selecting bar into play for the selection of a series of lines; in that case, the number of lines among which a selection can be made is reduced to one half, but each of these lines comprises twice as many wires. The supplementary selecting bar can then perform the same functions as the other bars, making it possible to select two more lines.

In Fig. 1 these multi-selectors are represented schematically by heavy perpendicular lines enclosed in fine-line rectangles. Each heavy vertical line represents an individual switch having access to a certain number of outgoing lines, each outgoing line being represented by a heavy horizontal line. The expression "switch section" will be used throughout what follows to designate the assemblage of individual switches giving access in common to the same outgoing lines; depending upon the case, a single section may occupy all or part of a frame or even a plurality of frames.

The line-selecting means SL, shown in Fig. 1, can perform two different functions; that is, it can, on the one hand, connect a calling subscriber to the selection stages and, on the other hand, effect the selection of a given subscriber line. The term "group" will be used throughout what follows to designate the assembly of subscribers served by line-selecting means SL.

The subscribers A of a group each have a line *la* terminating in the exchange at an equipment JA individual to said line, or "subscriber connector." To connect a calling line *la* to register EN, several identical chains of members have been provided; two of these chains are shown in the example described, one in the right-hand portion of Fig. 1 and the other in the left-hand portion of the same figure. The first of these chains comprises terminal selectors ST and call finders CA; the second chain comprises terminal selectors ST′ and call finders CA′. The subscribers in the group that are served by line-selecting means SL are divided up into a plurality of sub-groups, each sub-group being served, in each chain, by selectors ST individual to it.

The first chain comprises call finders CA that, in combination with the associated common control members, select a free terminal selector ST from among those assigned to the calling subscriber's sub-group. Call finders CA are divided up into a plurality of sections, all the finders of the same section having access to the same terminal selectors. The outging lines of the first section of call finders CA are divided up into a plurality of groups, the lines of the same group being connected respectively to terminal selectors ST serving the same sub-group. The outgoing lines of the other call-finder sections are arranged according to the same method but terminate at different terminal selectors. From the preceding explanations it follows that some of the terminal selectors ST serving a given subscriber sub-group are connected to the banks of the first call-finder section, others are connected to the banks of the second call-finder section, and so on. Each subscriber can therefore be reached by any call-finder section.

The call finders CA of the other chains are arranged in identical fashion.

Each call finder CA is connected through a distributor RP1 to a feeder AL and through said feeder to the selectors SG provided for selecting a group of subscribers within an exchange. The term "feeder" will be used throughout what follows to designate the assemblage of members providing the connection between the hunting chain and the selection chain and comprising arrangements for supplying the calling subscriber and the called subscriber with operating power. Each feeder AL can be temporarily associated with a register EN over circuits not shown.

Terminal selectors ST and call finders CA are designed to ensure the connection of a calling subscriber A to a feeder AL; the positioning of these various switches is effected by means of a certain number of common control members, which will now be described. The terminal selectors ST serving one or more subscriber sub-groups are controlled by the same common member CST, called "terminal-selector connector." The call finders CA of the same section are served by two common members, one tester TE and one outgoing connector CS. Tester TE is designed to select a call finder CA; connector CS is designed to select a line connected to the banks of call finders CA and terminating at a terminal selector ST. There is therefore one tester TE and one outgoing connector CS per call-finder section. The tester TE and the connector CS of the same section are connected as shown in the figure.

The terminal-selector connectors CST and the testers TE of the same chain have access to a marker M.

The other chains have common control members arranged in identical fashion. There is one marker per chain.

Connector CST comprises, among other members, a multi-selector individual switch; said switch is placed on the same frame as the terminal selectors ST controlled by connector CST. Likewise, outgoing connector CS comprises an individual switch, placed on the same frame as call finders CA.

Equipment EC is common to all the subscribers in the group. Equipment EC is connected to the testers TE and to the marker M of each chain. The essential function of equipment EC is to receive a call coming from a subscriber in the group and to send said call to testers TE and TE′.

The method of routing a call from a subscriber A up to a feeder AL will now be described. When a subscriber A removes his receiver, his call is registered by the line connector JA individual to him. The call is then sent by equipment EC to the testers TE of all the chains, assuming said testers have access to one or more finders CA capable of routing the call. Therefore, all the testers TE of the first chain receive the call, but arrangements are provided so that only one will be held, all the others being eliminated. The tester held causes the hunting for a free call finder CA associated with a feeder AL having access to at least one free register EN; it thereupon controls the seizure of marker M.

The feeder AL, associated with the finder CA selected, is seized and it is connected acording to a known method to a free register EN.

Marker M, being seized, it sends, through the medium of EC, an appropriate signal to connecter JA, this latter then being marked "calling" on the banks of the terminal selectors ST serving the calling subscriber's sub-group. The connector CST serving said terminal selectors is then switched in and marks all the free terminal selectors serving the calling sub-group "calling" on the banks of call finders CA.

The outgoing connector CS corresponding to the tester TE seized is switched in and proceeds to hunt for a terminal selector ST among those in calling position; once this hunting has ended, the terminal-selector connector CST associated with the selector ST selected hunts for the calling subscriber's line.

When these two operations have been completed, marker M finds itself connected to the calling subscriber's connector JA across connector CST.

As stated, the call has also been sent to the testers TE of the other chains; the various operations have therefore occurred in said chains according to the same method as for the first chain. Two or more markers M can therefore find themselves connected to the calling subscriber's line, either one after another or simultaneously. It will be assumed to begin with that marker M was the first to reach that line. It then proceeds to test that line, which could have been seized in the meantime by another call; if that test is favorable, the marker sends call finder CA a signal through tester TE controlling the connection of said finder to the terminal selector ST, selected for routing the call; once that connection has been made, call finder CA in turn sends terminal selector ST a signal controlling the connection of said selector to the calling subscriber's connector JA. Said subscriber then finds himself connected to feeder AL over the following circuit: subscriber A, line *la,* subscriber connector JA, terminal selector ST, call finder CA, distributer RP1, feeder AL. The various common members used for routing the call, namely, tester TE, connectors CST and CS and marker M, are then released and ready to handle a second call. Of course, if there are other calls waiting in the subscriber group served by line-selecting means SL, pilot equipment EC is held in order to send such calls to the testers TE of the various chains according to the method previously described.

The calling subscriber being connected to register EN across feeder AL, he then receives from said register the dialing tone telling him that he can start dialing the called subscriber's number. The call is then routed according to a method that will not be described, considering it is of no interest to the invention.

When the communication between the calling subscriber A and the called subscriber has ended, feeder AL releases call finder CA, this latter in turn releasing terminal selector ST. Connector JA releases as soon as the calling subscriber P hangs up, or immediately if said subscriber has already hung up.

In case two markers M and M′ find themselves connected simultaneously to the calling subscriber's connector, arrangements are provided to eliminate one of them, which allows the other to test the line alone. It will be assumed that marker M of the first chain is eliminated. The other marker, after the successful testing of said line, then controls the connection of the various members of the corresponding chain to connector JA; as a result, said connector no longer finds itself in calling position, and releases all the members of the chain controlled by marker M, assuming no other calls are waiting.

If the calling line were seized by another call between the removal of the receiver and the test made by the mark, the subscriber connector involved would no longer be in calling position, and that would cause the release of all the members seized, as in the preceding case.

The case will now be discussed where line-selecting means SL is used to select a called subscriber A from among the subscribers in the group. The line-selecting means comprises a certain number of incoming lines *lg* which are connected, through distributer RP2, to the device SG provided to select a given group in the exchange. These lines *lg* are connected respectively to the fifties selectors SC belonging to the various chains. The selectors SC of the first chain are divided up into a plurality of sections, the selectors of the same section having access to the same lines. The lines outgoing from the selectors SC of the first section are multipled to the outgoing lines of the first section of call finders CA and have access to the same terminal selectors ST. Likewise, the lines outgoing from the second section are multipled to the outgoing lines of the second section of call finders CA. The fifties selectors SC' of the other chains are arranged in identical fashion.

The operation of fifties selectors SC is controlled by means of a certain number of common members. The fifties selectors SC of the same section have access to a receiver RC, across an incoming connector CE. The essential function of incoming connector CE is to hunt for a calling fifties selector SC and to connect said selector to receiver RC. Receiver RC receives from the register the portion of the call number used to effect the selection within the subscriber group served by line-selecting means SL. The receivers RC of the same chain have access to the marker M of said chain, the purpose of this marker being to place the subscriber line or lines corresponding to the number dialed in calling position on the banks of terminal selectors ST. The fifties selectors SC of the same section are likewise served by the outgoing connector CS already used for call finders CA, the essential function of said outgoing connector being to hunt for an outgoing line of the fifties-selector section involved and terminating at a terminal selector capable of routing the call. The operation of the fifties selectors of the other chains is controlled in identical fashion.

Incoming connector CE comprises, among other members, a multi-selector individual switch, which is placed either on the same frame as the fifties selectors SC served by connector CE or on the frame containing the call finders CA belonging to the same section.

When a call is received over a line *lg*, the fifties selector SC associated with said line is seized. Incoming connector CE proceeds to hunt for said selector SC and connects it to receiver RC. Receiver RC then sends register EN an "invitation-to-send" signal, said register then sending the receiver the portion of the call number used to effect the selection of the called subscriber within the group. When the reception of this call number has ended, receiver RC connects itself to marker M if the latter is available, the call being held up otherwise until said marker again becomes available. The call number registered at receiver RC is sent to marker M, which, by means of marking wire *fm*, places the line or lines corresponding to the number dialed in calling position on the banks of the terminal selectors. For the sake of clarity it will be assumed there is only one line corresponding to the call number dialed.

The connector CST serving the terminal selectors ST assigned to the called subscriber's sub-group is then switched in; the various free selectors ST having access to the line dialed are placed in calling position on the banks of fifties selectors SC. The outgoing connector CS assigned to the calling fifties selector SC then causes the hunting for a line outgoing from said selector SC and terminating at one of the terminal selectors ST in calling position; the selection of said terminal selector having been effected, the terminal-selector connector CST assigned to the selector chosen proceeds to hunt for the called line.

When these two hunting operations have ended, marker M is connected to the called line across connector CST; it tests that line; if said line is free and if it is not tested simultaneously by another marker, marker M sends fifties selector SC a signal controlling the connection of said selector SC to the terminal selector ST chosen, fifties selector SC in turn sending terminal selector ST a signal controlling the connection of said selector to the connector JA associated with the called subscriber's line. Said subscriber then finds himself connected to group-selecting device SG over the following circuit: subscriber A, line *la*, connector JA, terminal selector ST, fifties selector SC, line *lg* and distributer RP2. The various common members used for routing the call, namely, connector CE, receiver RC, marker M and connector CST, are then released and ready to handle another call.

In case the called subscriber's line is busy or is tested simultaneously by another marker, the various operations follow one another as in the case of a call coming from a subscriber A.

As stated, a fifties selector SC gives access to several different terminal selectors to serve a given subscriber sub-group. If all these selectors are busy, the call cannot be routed according to the method previously described and special arrangements must be provided to prevent the call from being lost. These arrangements will now be described, with reference to Fig. 2.

The first section served by marker M comprises, in addition to the fifties selectors SC already mentioned, cooperating selectors SE giving access to the same lines as selectors SC. The same applies to all the other fifties-selector sections of line-selecting means SL. Two sections controlled by one marker (M) and two sections controlled by another marker (M') are shown in Fig. 2, as an example. Throughout what follows, 1 and 2 will designate the sections controlled by marker M and 3 and 4 the sections controlled by marker M'.

Some of the outgoing lines (*ln*) of fifties-selector section SC terminate at terminal selectors ST and are used for the normal routing of calls, while the others (*le*) terminate at cooperating selectors, comprised in other sections. Lines *le*1 are connected respectively to the cooperating selectors SE1 of section 1; lines *le*2 are multipled to similar lines *le*5 of section 2 and are connected respectively to the cooperating selectors SE' of section 3; finally, lines *le*3 are multipled to similar lines *le*6 of section 2 and are connected respectively to the cooperating selectors SE'1 of section 4. The outgoing lines of each of the other sections are arranged according to the same method. It will be understood therefore that when a fifties selector SC of section 1 has no direct access to a terminal selector ST serving the called sub-group, it can be connected to one of the cooperating selectors SE1, SE', SE'1 having access to a free terminal selector.

Each section comprises the common control members already mentioned; contacts *crk*1, *crk'*1 are provided to make a marker change if the calling selector and the cooperating selector are not controlled by the same marker.

The routing of a call through a cooperating selector is effected as follows. It will be assumed to begin with that the call has been received by a fifties selector SC of section 1. As stated, this selector SC connects itself to a receiver RC through the medium of a connector CE; the selective combination characterizing the called subscriber is registered in receiver RC and then sent to marker M through back contact *crk*1. This marker, through the medium of a marking wire *fm*, places the called line in calling position on the banks of all the free terminal selectors ST and ST1 of the first chain. It will be assumed that all the terminal selectors ST assigned to the called sub-group and connected to the banks of section 1 are busy but that said sub-group contains one or more free selectors ST1 connected to the banks of section 2.

The outgoing connector CS1 of section 2 or cooperating section then hunts for a terminal selector ST1 among those in calling position; at the same time, the outgoing connector CS of the calling section hunts for a free cooperating selector SE1. This latter operation has been made possible only because all the terminal selectors capable of routing the call and accessible to connector CS are busy; connector CS in effect gives priority to the selection of a selector ST and selects a cooperating selector SE only when all the selectors ST are busy. Since cooperating selector SE1 chosen is also accessible to the fifties selectors controlled by marker M′, arrangements (double test) are provided to make sure that cooperating selector SE1 is chosen only by connector CS at the instant involved.

The outgoing connector CS1 of the cooperating section then signals the outgoing connector CS of the calling section that the hunting for a terminal selector has ended. Outgoing connector CS receives that signal and, when it has found a cooperating selector SE1, it signals the marker. These various end-of-selection signals are sent over circuits not shown, in order not to complicate the drawing. Marker M, after having tested the called subscriber, causes the connection of the calling fifties selector SC to the cooperating selector SE1 selected; selector SC thereupon causes the connection of cooperating selector SE1 to the terminal selector ST selected; finally, cooperating selector SE1 causes the connection of terminal selector ST1 to the called subscriber.

The called subscriber A is then connected to fifties selector SC over the following circuit: fifties selector SC, line *le*1, cooperating selector SE1, line *ln*1, terminal selector ST1, connector JA, line *la*, called subscriber A. The various common control members used for routing the call are then released. The release of fifties selector SC, cooperating selector SE1 and terminal selector ST1 is placed under the control of selection stages located ahead and occurs when the call has ended.

It will now be assumed that all the terminal selectors ST, ST1 assigned to the called sub-group and connected to the banks of the fifties-selector sections controlled by marker M are busy. These terminal selectors cannot therefore be in calling position either on the banks of the fifties selectors SC of section 1 or on the banks of the cooperating selectors SE1 of section 2.

If there is in another chain of members, in the cone controlled by marker M′, for example, and in the called sub-group a free terminal selector ST′ connected to the banks of section 3, and if one of the selectors SE′ of this section is available, the outgoing connector CS of the calling section proceeds to hunt for a line *le*2 terminating at selector SE′. This hunting is made possible only because there is no other free terminal selector in the first chain, said terminal selectors or the cooperating selectors SE1 having access to said terminal selectors being chosen on a priority basis by connector CS. Since the cooperating selector SE′ chosen can also be reached by outgoing connectors CS′1 and CS1, arrangements are provided, as in the preceding case, to make sure that the cooperating selector SE′ involved will be chosen only by connector CS′.

When that hunting has ended, contact *crk*1 is operated, the first marker is released and the second marker (M′) is seized by receiver RC. The call number registered at receiver RC is sent to said marker M′; the latter, through the medium of a marking wire *fm*′, places the called subscriber's line in calling position on the banks of terminal selectors ST′. Selectors ST′ are in turn placed in calling position on the banks of cooperating selectors SE′.

The connector CS′ of the cooperating section then hunts for one of the terminal selectors ST′ in calling position. It thereupon signals the outgoing connector CS of the calling section that this hunting has ended; connector CS receives that signal and tells the marker that the selection has ended. These various end-of-selection signals are sent over circuits not shown, in order not to complicate the drawing. Marker M′, after having tested the called subscriber, causes the connection of the calling fifties selector SC to the cooperating selector SE′ selected; selector SC thereupon causes the connection of cooperating selector SE′ to the terminal selector ST′ selected; finally, cooperating selector SE′ causes the connection of terminal selector ST′ to the called subscriber.

That subscriber is then connected to the calling fifties selector SC over the following circuit: fifties selector SC, line *le*2, cooperating selector SE′, line *ln*′, terminal selector ST′, subscriber connector JA, line *la* and called subscriber A. The various operations involved in the release are the same as in the preceding case.

The case where the call would be routed across a cooperating selector of another section controlled by marker M′ would be treated the same way.

An example of one embodiment will now be given and a description made of the detailed operations involved in routing a call from a calling subscriber A to a feeder AL and a register EN, with reference to Figs. 3 to 18, arranged in accordance with Fig. 26.

The relays have been represented in the schematic by rectangles; the selection magnets by rectangles crossed by a diagonal line and the connecting magnets by boxes. The various relays and magnets are referenced by groups of two or three letters, the first letter or letters being common to all the relays or magnets of the same member and the last letter identifying the relay within that member. To make it easier to understand the schematics, arrangements have been adopted so that the same last letter will correspond to relays performing similar functions in the various members. Only small letters have been used to reference the relays and the selection magnets, capital letters being reserved for the connecting magnets. The same group of letters, followed by one of the digits 1 to 9, is used to designate relays or magnets performing similar functions. Further, the contacts associated with the relays or magnets are designated by the same reference as the corresponding relay or magnet, followed by one of the digits 1 to 9. Thus, for example, reference *ata*1 designates the first contact of relay *ata*; reference *atd*1/2 designates the second contact of relay *atd*1, relay *atd*1 forming part of a series of relays *atd*1, *atd* 2 . . . *atd n* performing similar functions.

The schematics show only such circuit elements as are required for an understanding of the invention. For example, certain assemblages of selection magnets are connected up in a "chain," that is, they are so arranged that they cannot be energized simultaneously; the details of these chain circuits are not shown.

In order to simplify the drawing, not all the similar members or circuits are shown but only a single member or circuit of each kind, their number being indicated in parentheses; for example, when there are 26 selection magnets, only one is shown.

In the detailed description that follows, it will be assumed, by way of example and in order to make it easier to understand the invention, that the multi-selectors used comprise 13 selecting bars, without counting the supplementary selecting bar, corresponding to 26 selection magnets and allowing a selection to be made in two 26-line series or a total of 52 lines. Each multi-selector comprises 17 individual switches, one or two of them being reserved to effect the connection between one of the others and a common control member.

Line-selecting means SL, designed for 500 subscribers, comprises two chains of members, each chain comprising two call-finder sections and two fities-selector sections. The 500 subscribers are divided up into 10 fifties, each served by 16 terminal selectors; each terminal selector ST gives access to all the subscribers of a fifties and to two lines that can be set aside for testing purposes or for any other appropriate use. Four out of these 16 terminal selectors assigned to a 50-subscribed group are connected to the banks of the first section of call finders and of fifties selectors; four are connected to the banks of the second section of call finders and of fifties selectors; the remaining 8 are arranged according to the same method but in the second chain. A section of call finders and of fifties selectors, giving access to 4 terminal selectors for each chain, therefore comprises 4×10=40 lines for the normal routing of calls; the other 12 lines are reserved for the cooperating stage. Each section comprises 14 call finders grouped into a first frame and 14 fifties selectors grouped into a second frame.

In the first chain, the 8 terminal selectors of one fifties and the 8 terminal selectors of the other fifties of the same hundreds are grouped into the same frame, these 16 terminal selectors being controlled by the same connector CST. Since there are 5 subscriber fifties, there are therefore 5 frames and hence 5 connectors CST in the first chain. Likewise, there are 5 connectors CST′ in the second chain.

The 12 cooperating lines are divided up into three 4-line groups, the four lines of the same group terminating respectively at the cooperating selectors of the same section. Each section thus comprises 4 cooperating selectors; two of them are placed on the fifties-selector frame, the others being carried over to the call-finder frame.

It will be assumed to begin with that the various members of the line-selecting means are all available. Under these conditions, all the relays and magnets shown in Figs. 3 to 18 are unoperated.

When calling subscriber A removes his receiver (Fig. 4), the following circuit is completed: battery, left-hand winding of relay *jla*, back *jlc*1, wire *a* of subscriber's line, subscriber A, wire *b*, back *jlc*2, ground. Relay *jla* energizes. Over its front *jla*2 it completes the following circuit: ground, front *jla*2, back *jlc*3, wire 10, relay *jlp* energized, battery. Relay *jlp* is multipled to the back contacts *jlc*3 of all the subscribers of the same fifties; there are therefore 10 *jlp* relays for the 500-subscriber group, the *jlp* relay operating characterizing the calling fifties. Over its front *jla*3 relay *jla* prepares the marking circuit of the calling subscriber on the banks of the terminal selectors ST of the first chain; over its front *jla*4 it prepares a similar circuit, but for the terminal selectors ST′ of the second chain.

Relay *jlp* prepares at *jlp*1 and *jlp*2 the two marking circuits mentioned above; at *jlp*3 it completes the following circuit: ground, back *tv*2 in terminal selector ST, wire 13, rectifier Q1, front *jlp*3, wire 37, back *ate*1, upper winding of relay *ata* energized, battery. Each 50-subscriber group comprises two wires 13 in connector CST; the first of these wires is multipled to the 4 back contacts *tv*2 of the terminal selectors serving that 50-subscriber group and connected to the banks of the first call-finder section; likewise, the second wire 13 is multipled to the 4 back contacts *tv*2 of the terminal selectors serving that 50-subscriber group and connected to the banks of the second call-finder section. Contacts *tv*3 are not used in the case under consideration. The two 13 wires belonging to one and the same 50-subscriber group are connected respectively, through rectifiers Q1, to front contacts *jlp*3 of the *jlp* relay characterizing that group. The 10 *jlp*3 contacts corresponding to the terminal selectors connected to the first call-finder section are all connected to relay *ata* of a first tester TE; likewise, the 10 *jlp*3 contacts corresponding to the terminal selectors connected to the second call-finder section are all connected to relay *ata* of a second tester TE. In the case under consideration it has been assumed that all the members of the line-selecting means are unoperated; the two 13 wires of the calling fifties are both grounded and relays *ata* of both testers TE energize.

Each *jlp* relay of a 50-subscriber group also has two contacts *jlp*4, which are arranged according to the same method but which correspond to the terminal selectors and the testers of the chain of members served by marker M′. The two testers of this second chain of members are also switched in, since it has been assumed that all the members of the line-selecting means were unoperated.

In the tester TE corresponding to the chain served by marker M and to the terminal selectors connected to the first call-finder section, relay *ata* completes the following two circuits at *ata*1:

(1) Ground, front *ata*1, lower winding of relay *ate* energized, battery;

(2) Ground, front *ata*1, back *atd*1/2 . . . *atd n*/2 respectively associated with relays *atd*1 . . . *atd n*, back *atb*2, relay *atc*, which energizes with a slight delay, battery.

The tester TE serving a frame of call finders CA comprises one relay *atd* per call finder. Provision is made of *n atd* relays, referenced *atd*1, *atd*2 . . . *atd n*; the number of 14 call finders per tester given at the beginning of this detailed description is not limitative, and the schematics are designed for any number of finders.

Relay *ata* completes a holding circuit for itself at *ata*2; at *ata*3 it prepares a second holding circuit for itself over its lower winding; at *ata*4 it causes the operation of relay *lda* of the distributer; at *ata*5 it prepares a holding circuit for the *atd* relay of the finder that will be chosen.

Relay *ate* short-circuits its upper winding at *ate*2, this making it slow to release.

It will be assumed that only connection *cn*5, to the exclusion of connections *cn*1 to *cn*4, is effected in distributer DI (Fig. 15). Relay *lda* prepares a holding circuit for itself at *lda*1; the left-hand winding of relay *ldb* is short-circuited by the ground that energized *lda* and by the ground of connection *cn*5.

In tester TE (Fig. 11) relay *atc* completes at *atc*2 the following circuit for the *atd* relay of the first call finder CA of the section: battery, front *atc*2, relay *atd*1 energized, wire 30, back *av*4, wire *m* and ground if the feeder AL associated with finder CA is available and has access to at least one free register. Similar circuits are completed for the *atd* relays corresponding to the other call finders.

Over its back *atd*1/2 relay *atd*1 opens the circuit of relay *atc*, which, being slow to release, does not release at the instant under consideration; over its front *atd*1/2 it prepares an energizing circuit for relay *atb*; over its front *atd*4 to *atd*8 it prepares the continuity of the connecting wires between tester TE and the first call finder CA.

When relay *atc* returns to normal, after the time lag imposed by its slowness in releasing, it prepares at *atc*1 an energizing circuit for relay *atb*; over its various back contacts *atc*2 it opens the energizing circuits of all the relays *atd*1 . . . *atd n*; relay *atd*1 holds over the following circuit: battery, resistance Re110, front *ata*5, wire 76, back *ldb*3, *ldd*3, *ldf*3, *ldh*3, wire 75, wire 1 of cable C*b*1, front *atd*1/1, relay *atd*1 and circuit already described; through the opening of its back *atd*1/1 it prevents the other *atd* relays from holding over similar circuits. These relays release.

The following circuit is then completed: ground, front *ata*1, *atd*1/2 . . . back *atd n*/3, back *atb*1 in the second tester TE1 associated with the same marker M, left-hand winding of relay *atb*, back *atc*1, battery. The second tester TE1 associated with said marker has also received the call and it operates like the first. It will be assumed that the *atb* relay of the tester involved energizes before having had its circuit broken at *atb*1 by the second tester;

only tester TE remains switched in; the various operations cannot develop in the second tester, relay *atb* having its circuit broken by contact *atb*1 of the first tester.

The right-hand winding of relay *atb* is closed across resistances (not shown) whose value varies cyclically, said relay having at each instant a quite definite time lag in energizing, so that the *atb* relays of the two testers are made to have different energization times at each instant, one of the testers thus having priority over the other. This arrangement is described in a patent application Serial No. 323,992, filed by me on December 4, 1952, for "Telephone Systems."

In the tester remaining in service, relay *atb* completes the following circuit at *atb*3: ground, front *atb*3, wire 81, back *lmf*3, *lmg*1, relay *lme* energized, resistance Re150, battery; over its various contacts *atb*4 to *atb*8 it establishes the continuity of the various connecting wires between tester TE and the call finder CA chosen; in particular, at *atb*4 it causes the application of a ground to wire 31 and from there to the *d* wire, in order to control various operations that will lead to the connection of feeder AL to an available register EN; at *atb*9 it prepares the seizure of the outgoing connector CS that is to control the operation of the call finder seized.

The energization of relay *lme* corresponds to the seizure of marker M. At *lme*2 relay *lme* prepares a short-circuit for relay *lmd*, in order to make this relay slow to release; at *lme*4 it causes the operation of relay *acj* and hence the seizure of outgoing connector CS, the following circuit being completed: ground, front *lme*4, wire 80, front *atb*9, wire 2, relay *acj*, battery; at *lme*5 it prepares a holding circuit for relay *atd* of tester TE; at *lme*6 it prepares the circuit of relay *lmk* of marker M; at *lme*7 it prepares the test circuit of the calling line and completes the circuit of the lower winding of relay *lmt* energized; at *lme*8 it completes the following circuit: ground, back *lmf*4, front *lme*8, wire 82, front *jlp*1 in equipment EC, wire 6, front *jla*3 in subscriber connector JA, back *jlc*4, wire 14, resistance Re81, relay *tca* energized, battery. Contact *lme*8 of marker M is multipled to 10 contacts *jlp*1 respectively associated with the 10 *jlp* relays characterizing the 10 subscriber fifties in the group; the contact *jlp*1 of each fifties is multipled to the *jla*3 contacts of all the subscribers in the 50-subscriber group. A total of 10×50=500 wires 14 are thus obtained, corresponding respectively to the 500 subscribers in the group, the grounding of any one of these wires indicating that the corresponding subscriber is in calling position and that a marker has been seized to serve said call. As stated, a terminal-selector connector CST serves a given 100-subscriber group. The one hundred 14 wires of the subscribers in the hundred served by connector CST are divided up into 25-wire groups, the wires of the same group being all multipled to a *tca* relay. The *tca* relay, energized, thus indicates the 25-subscriber group's position in the hundred served by terminal connector CST.

Terminal-selector connector CST is designed to hunt for the calling line and thereupon to connect said line to marker M. It comprises an individual switch *cty* controlled by selection magnets *tsx*, *tss* and connecting magnet TY, as well as a certain number of relays. In the embodiment described, individual switch *cty* is placed on the same frame as the 16 terminal selectors to which it has access; therefore, the same selection magnets *tsx* and *tss* are used for individual switch *cty* and for terminal selectors ST.

Relay *tca* causes at *tca*1 the operation of relay *tcf*. The two *tca*1 contacts, respectively associated with the two *tca* relays of the same 50-subscriber group, are multipled to a relay *tcf*; there are therefore two *tcf* relays in terminal-selector connector CST, the *tcf* relay energized characterizing the calling fifties. At *tca*2 relay *tca* prepares the operation of a relay *tcb* for the purpose of hunting for the calling line.

Relay *tcf* completes the following circuit at *tcf*1: ground, front *tcf*1, wire 15, back *tv*4, wire *m*, resistance Re91, relay *aca* energized, battery. Each *tcf*1 contact is multipled to the *tv*4 contacts of the 8 terminal selectors ST serving the calling 50-subscriber group. The *m* wires of all the terminal selectors available and serving the calling fifties are therefore grounded, said selectors being thereby placed in calling position on the banks of outgoing connectors CS. The outgoing connector CS, seized, that is, the one whose *acj* relay is energized, gives access to 40 terminal selectors ST; this connector therefore receives 40 *m* wires. These *m* wires are divided up into two 20-wire groups, the wires of the same group being multipled to the same *aca* relay; there are thus two *aca* relays in outgoing connector CS, the *aca* relay or relays energized indicating that the corresponding assemblages of 20 terminal selectors comprise selectors in calling position. It will be assumed that both *aca* relays operate.

In terminal-selector connector CST relay *tcf* upon energizing completes at *tcf*2 two circuits such as the following: ground, front *tcf*2, back *tsx*1, relay *tce* energized, back *tss*1, *tcd'*, lower winding of relay *tcd*, battery. Relay *tcd* remains unoperated owing to the high resistance of relay *tce*. As stated, each selecting bar is associated with two magnets and can take two operating positions, depending upon the magnet energized; throughout what follows, one of these magnets will be called the "high" magnet and the other the "low" magnet, these designations being warranted by the position of the magnets with respect to the corresponding selecting bar. In terminal-selector connector CST, a first circuit has been provided comprising a relay *tcd*, 13 back contacts *tss*1 respectively associated with the 13 "high" selection magnets *tss* of the frame involved, a relay *tce* and back contact *tsx*1 of the high magnet associated with the supplementary selecting bar, or "switching" magnet. A second circuit, like the first but containing the contacts of the "low" selection magnets, is connected to the preceding one over the same wire 111. Wire 111 is multipled to two contacts *tcf*2 respectively associated with the two *tcf* relays. Each of the above-mentioned circuits is broken by a back contact *tcd'*1 associated with the *tcd* relay of the other circuit. When both *tce* relays energize, they indicate that all the high and low selection magnets are unoperated.

Relay *tcf* completes the following circuit at *tcf*3: back *tv*2, wire 13, rectifier Q11, front *tcf*3, wire 47 over cable C*b*3, relay *ack*1 energized, battery. At stated, each 50-supscriber group comprises two wires 13 in terminal-selector connector CST; the first of these wires is grounded over the back contacts *tv*2 of the free terminal selectors ST connected to the first call-finder section and serving said fifties; the second 13 wire is grounded over the back contacts *tv*2 of the free terminal selectors connected to the second call-finder section and serving said fifties. The first 13 wire is connected, through a rectifier Q2 and a contact *tcf*3 of the *tcf* relay characterizing the corresponding fifties, to the *ack*1 relay of the outgoing connector CS serving the first call-finder section; the second 13 wire is connected, in the same manner, to wire 48 and from there to relay *ack*2 of the outgoing connector CS serving the first call-finder section. Relay *ack*1 upon energizing therefore tells the outgoing connector CS serving the first call-finder section that the banks of said finders contain one or more free terminal selectors giving access to the calling line. Relay *ack*2 cannot energize, its circuit being broken by back contact *ack*1/2.

Of course, in the outgoing connector CS serving the first-section call finders one and the same *ack*1 relay is used for the 10 subscriber fifties in the group. Consequently, said *ack*1 relay is multipled to the five terminal-selector connectors CST of the chain of members controlled by marker M; in each connector CST wire 47 is multipled to the two front contacts *tcf*3 corresponding to the two fifties of the hundred served by said connector.

Both *tce* relays have a contact, the contact of the first *tce* relay being designated by *tce*1 and the contact of the second *tce* relay by *tce'*1. These two contacts being closed, the following circuit is completed: battery, relay *tcc*, front *tce'*1 and *tce*1, back *ty*1, *tcd'*2 and *tcd*2, ground. Relay *tcc* energizes.

Relay *tcc* prepares a holding circuit for itself at *tcc*2; at *tcc*3 it prepares the switching in of the selection magnet *tss* corresponding to the calling line; at *tcc*4 it prepares the circuit of the switching magnet *tsx* corresponding to said calling line.

Outgoing connector CS is designed to hunt for a terminal selector among those in calling position on the banks of call finders CA. To do such hunting, use is made of magnets *asx* and *ass*, as also of a certain number of relays. In the embodiment described, this outgoing connector is placed on the same frame as the call finders it controls, the same selection magnets *asx* and *ass* being therefore used for hunting for a terminal selector and for positioning the call finder.

Outgoing connector CS will now proceed to hunt for a terminal selector ST among the various selectors in calling position. As stated, the relays energized in outgoing connector CS are the following: *acj*, *aca* and *ack*1.

Relays *aca* complete at *aca*1 two circuits such as the following: battery, lower winding of relay *acd*, back *acd'*1, back *ass*1, relay *ace*, back *asx*1, front *aca*1, ground. There are two *ace* relays, two chains of *ass*1 back contacts and two *acd* relays, which are arranged in the same manner as the *tce* relays, the *tss*1 back contacts and the *tcd* relays in terminal-selector connector CST. The two *ace* relays energize, thus indicating that all the selection magnets and switching magnets of the call-finder frame are in normal position. The *acd* relays cannot operate, owing to the high resistance of relay *ace*. The first of the two *aca* relays completes the following circuit at *aca*2: ground, front *acj*1 and *aca*2, back *acb'*1, upper winding of relay *acb*, resistance Re92, battery. Front contact *acj*1 is multipled to the two *aca*2 contacts respectively associated with the two *aca* relays; a second *acb* relay therefore energizes over the *aca*2 contact of the second *aca* relay.

Each of the two *acb* relays has its lower winding closed across a resistance (not shown) whose value varies cyclically with time; the arrangement is such that at a given moment the two *acb* relays are closed across resistances of different values. The two *aca* relays of outgoing connector CS being energized, the circuits of the two *acb* relays are fully completed simultaneously, but one of them, having its lower winding closed through a higher resistance than the other, is less slow in energizing and operates first, opening then at *acb*1 the circuit of the second *acb* relay, which can no longer energize. This arrangement allows giving priority to one of the two assemblages of terminal selectors connected to the banks of the call finder, in the case where these two assemblages comprise selectors in calling position. This arrangement was the subject of the above mentioned patent application.

Relay *acb* prepares at *acb*2 the operation of the selection magnets *ass* corresponding to the calling terminal selectors; at *acb*3 it prepares the circuit of the switching magnets *asx* corresponding to said terminal selectors; at *acb*4 it prepares a holding circuit for relay *acc*.

Both *ace* relays comprise a front contact, the contact of the first relay being designated by *ace*1 and the contact of the second by *ace'*1. These two contacts being closed, the following circuit is completed: battery, relay *acc*, front *ace'*1 and *ace*1, back *acd'*2 and *acd*2, ground. Relay *acc* energizes.

Relay *acc* completes a holding circuit for itself over *acc*2 and *acb*4. This holding circuit has been provided with two contacts *acb*4, placed in parallel and respectively associated with the two *acb* relays; said circuit is therefore completed regardless of the *acb* relay energized.

To select a terminal selector ST from among those that can be in calling position on the banks of outgoing connector CS, two switching magnets *asx* and 20 selection magnets *ass* are available. The *asx* magnets allow selecting an assemblage of 20 terminal selectors, the *ass* magnets selecting a particular selector within said assemblage. The two switching magnets *asx* are connected respectively to the *acb*3 contacts of the two *acb* relays; the *asx* magnet connected to the *acb*3 contact closed energizes over the following circuit: battery, magnet *asx*, front *acb*3 and *acc*4, ground. The *m* wires of the two terminal selectors reached by means of the same selection magnet *ass* are both connected to said magnet, one over the *acb*2 contact of the first *acb* relay and the other over the *acb*2 contact of the second *acb* relay. Each *acb* relay thus has 26 contacts such as *acb*2. Each selection magnet *ass* corresponding to one or two terminal selectors ST in calling position energizes over the following circuit: ground, front *tcf*1 in terminal-selector connector CST, wire 15, back *tv*4, wire *m*, front *acb*2, selection magnet *ass*, front *acc*3, back *acd'*1, lower winding of relay *acd*, battery.

As stated, there are two *acd* relays, corresponding respectively to the high magnet chain and to the low magnet chain. Relay *acd*, corresponding to one of these chains, has its upper winding short-circuited by back *ach*1; relay *acd'*, corresponding to the other chain, has its upper winding open. Owing to this relay *acd'* is faster; it is the first to energize and breaks at *acd'*1 the circuits of all the magnets of the other chain.

Relay *acd'* opens over its back *acd'*2 the circuit of relay *acc*, which, being slow to release, releases only a little later; over its front *accd'*2 it prepares the hunting for the calling line by the terminal-selector connector.

Each selection magnet *ass* opens over its back *ass*1 the circuit of relay *ace* of the corresponding chain, which releases. Switching magnet *asx* completes the following holding circuit for itself over its front *asx*1: battery, switching magnet *asx*, front *acb*3, *asx*1, *aca*1, ground.

When slow relay *acc* releases, it opens over its front contacts *acc*3 the energizing circuits of all the selection magnets *ass* that have operated; the one whose *ass*1 contact is the nearest to the relay *acd* holds over its front *ass*1 and over its back *ass*1 prevents the other relays from holding over similar circuits. Finally, the various operations previously described have led to the energization of a switching magnet *asx* and of a selection magnet *ass*. These two magnets together determine the terminal selector that must route the call and prepare the connection of call finder CA to said terminal selector.

Back *acc*1 is multipled by two contacts *asx*3 respectively associated with the two switching magnets *asx*; each *asx*3 contact is multipled in turn to 20 contacts respectively associated with selection magnets *ass*1 . . . *ass*20; these contacts have been referenced *ass*1/3 . . . *ass*20/3, *ass*1/4 . . . *ass*20/4. At the output of connector CS are thus obtained 40 wires 22, each corresponding to one of the terminal selectors connected to the banks of said connector. These 40 wires are divided up into groups of 4; the wires of the same group corresponding to terminal selectors having access to the same 50-subscriber group are multipled to the same *d* wire. Each of these *d* wires leads into the corresponding terminal-selector connector CST and is multipled to two *tca*2 contacts of the same 50-subscriber group. Since the selector CST (sic—Translator) under consideration serves two 50-subscriber groups, it receives all told two wires such as *d*. A total of 4 *tca*2 contacts are thus obtained, each connected to a *tcb* relay. Each *tca*2 contact associated with a *tca* relay corresponds to a 25-subscriber group; each *tcb* relay also corresponds to a 25-subscriber group.

The multiplying arrow bearing the index 2 and placed on the *d* wire is explained by the fact that connector CST serves terminal selectors connected to both fifties-selector sections.

Slow relay *acc* upon releasing completes the following circuit at *acc*1: ground, back *acd*2, front *acd'*2 back *acc*1, front *asx*3 and *ass*3 (or *ass*4), wire 22 corresponding to the terminal selector chosen, wire *d* corresponding to the calling fifties' position, front *tca*2, back *tcb'*1, left-hand winding of relay *tcb*, battery.

In the foregoing descriptions it has been assumed that only one subscriber was calling; consequently, only one out of the four *tca* relays is energized; also, only one *tcb* relay is energized. Relay *tcb* upon operating controls in terminal-selector connector CST the various operations involved in the hunting for the calling subscriber.

Two switching magnets *tsx* and 25 selection magnets *tss* are available to select a calling subscriber. Magnets *tsx* allow selecting a 25-subscriber group out of the fifties, magnets *tss* selecting a particular subscriber in said group. The first switching magnet *tsx* is connected to the *tcb*3 contact of the *tcb* relay corresponding to the first 25-subscriber group in the hundred and to the *tcb*3 contact of the *tcb* relay corresponding to the third 25-subscriber group in said hundred; likewise, the second switching magnet *tsx* is connected to the *tcb*3 contact of the *tcb* relay corresponding to the second 25-subscriber group in the hundred and to the *tcb*3 contact of the *tcb* relay corresponding to the fourth 25-subscriber group in said hundred. The *tcb* relay energized and characterizing the position of the 25-subscriber group comprising the calling subscriber completes the following circuit for switching magnet *tsx* at *tcb*3: battery, magnet *tsx*, front *tcb*3 and *tcc*4, ground.

The four marking wires 14 of subscribers reached by means of the same selection magnet *tss* are connected to said magnet over 4 contacts *tcb*2 respectively associated with the 4 *tcb* relays. Each *tcb* relay therefore has 25 contacts such as *tcb*2. The *tss* magnet corresponding to the calling subscriber energizes over the following circuit: battery, lower winding of relay *tcd*, back *tcd'*1, front *tcc*3, selection magnet *tss*, contact *tcb*2 of the *tcb* relay that has operated, wire 14, back *jlc*4, front *jla*3, wire 6, front *jlp*1, wire 82, front *lme*8, back *lmf*4, ground.

It will be noted that relay *tcc* comprises one contact such as *tcc*3 per selection magnet *tss*.

Relay *tcb* completes a holding circuit for relay *tcc* over *tcc*2 and *tcb*4. The 4 *tcb*4 contacts respectively associated with the 4 *tcb* relays are placed in parallel, the above holding circuit being completed regardless of the *tcb* relay that has operated. Relay *tcb* prepares at *tcb*5 and *tcb*6 the connection of the marker to the calling subscriber's connector.

Relay *tcd* opens over its back *tcd*2 the circuit of relay *tcc*, which, being slow to release, releases only with a certain delay; over its front *tcd*2 it prepares the circuit of the terminal-selector connector's connecting magnet TY.

Switching magnet *tsx* and selection magnet *tss* together select the calling subscriber; they prepare the connection of said subscriber first to marker M, then to terminal selector ST. Magnet *tsx* completes the following holding circuit for itself: battery, magnet *tsx*, front *tcb*3, *tsx*1, *tcf*2, ground. Magnet *tss* completes a holding circuit for itself over its front *tss*1. These magnets further prepare the circuit of connecting magnet TY at *tsx*2 and *tss*2.

Terminal-selector connector CST comprises a multiselector individual switch *cty* intended to make the connection between marker M and the calling subscriber. As stated, this individual switch is placed on the same frame as the 16 terminal selectors ST to which it gives access; it therefore uses the same switching magnets *tsx* and the same selection magnets *tss* as said terminal selectors ST. On the other hand, it has a connecting magnet TY that is individual to it. Since this individual switch gives access only to 52 different positions, it cannot by itself connect marker M to a given subscriber chosen from among 100; a first selection is made by the *tcb* relays, the final selection being made by individual switch *cty*. This switch comprises 4 contacts for each of the 50 positions used; the first contact, counting from the left, corresponds to the test wire of a subscriber in the first fifties of the hundred served by connector CST; it is connected, over contact *ty*3, to two contacts *tcb*1/5 placed in parallel and respectively associated with the two *tcb* relays of said fifties; the second contact, counting from the left, corresponds to the test wire of a subscriber in the second fifties of the same hundred; it is connected, over contact *ty*4, to two contacts *tcb*2/5 placed in parallel and respectively associated with the two *tcb* relays of that second fifties. The third and fourth contacts, counting from the left, are used for sending the register an indication relative to the class of the calling subscriber and they are arranged according to a similar method.

When slow relay *tcc* releases, it completes the following circuit at *tcc*1: battery, connecting magnet TY, front *tss*2, *tsx*2, back *tcc*1, front *tcd*2, ground. The two *tsx*2 contacts respectively associated with the two switching magnets *tsx* are placed in parallel; the same applies to the 26 *tss*2 contacts respectively associated with the 26 selection magnets *tss*. These contacts have been provided so that the energization of magnet TY will be impossible unless one *tsx* and one *tss* magnets have operated. Magnet TY energizes and causes the connection of wires 38 and 39 to the calling subscriber. The following circuit is completed as a result: ground, front *lme*7, resistance Re162, rectifier Q4, right-hand winding of relay *lmb*, wire 38, front *tcb*5 of the *tcb* relay energized, front *ty*3, first contact of individual switch *cty*, counting from the left, wire 11, right-hand windings of relays *jla* and *jlc* in series, battery.

As stated, the subscriber's call has also been received by the members of the chain controlled by marker M'; operations similar to those that have just been described therefore develop in said chain, said operations finally leading to the connection of marker M' to the calling subscriber. Throughout what follows it will be assumed to begin with that the marker M under consideration is connected the first to said calling subscriber; it will further be assumed that said subscriber has not been seized by another call between the removal of his receiver and the connection of the marker to his line. Under these conditions, relay *lmb* energizes in the above-described circuit; on the other hand, relay *jlc* remains unoperated, owing to the high resistance of the right-hand winding of relay *lmb*.

The calling subscriber's class indication is then sent to the register over the following circuit: wire 12 in subscriber connector JA, contact of individual switch *cty*, front *ty*5 and *tcb*6, wire 39, front *atb*5 and *atd*5, back *av*2, wire *c*, feeder AL and register EN.

Connecting magnet TY completes the following circuit at *ty*2: ground, front *ty*2, wire 42, relay *lmc*, resistance Re163, battery. Relay *lmc* energizes.

Relay *lmb* completes the following holding circuit for itself at *lmb*1: battery, left-hand winding of relay *lmb*, front *lmb*1 and *lmc*1, ground; over *lmb*2 and front *lmt*1 it short-circuits relay *lmc*, but this latter, being made slow to release by said short-circuiting, does not release at the instant under consideration; at *lmb*3 relay *lmb* places its high-resistance right-hand winding in parallel with the low-resistance upper winding of relay *lmt*, in order to lower the test potential on wire 38 and to mark the calling line busy; the fluxes produced by the two windings of *lmt* being equal and of opposite sense, this relay releases.

It will be noted that the resistance of the upper winding of relay *lmt* is sufficiently low to drop the test potential, but it does not however allow the operation of the subscriber's cut-off relay *jlc*.

Relay *lmt* removes the short-circuit of relay *lmc* through the opening of its front *lmt*1; through its back *lmt*1 it prepares the energization of relay *lmd* which must control the various operations involved in the connection in call finder CA and terminal selector ST.

As stated, the grounding of the *d* wire of feeder AL over front *atd*4 and *atb*4 has controlled the various operations involved in the connection of said feeder AL to a register EN. When these operations have ended and the register is ready to receive the digits dialed, it causes the grounding of the *t* wire coming from feeder AL. The following circuit it completed as a result: wire *t* grounded, wire 4, front *atd*6 and *atb*6, wire 77, front *lme*6, wire 16, relay *lmk*, battery. Relay *lmk* energizes and completes the following energizing circuit for relay *lmd* at *lmk*1: battery, left-hand winding of relay *lmd*, front *lmk*1, back *lmt*1, wire 42, front *ty*2, ground.

Relay *lmd* short-circuits its right-hand winding over contacts *lmd*3 and *lme*2, that making it slow to release; at *lmd*4 it completes a holding circuit for itself; at *lmd*5 it controls the energization of connecting magnet AV of call finder CA over the following circuit: ground, front *lme*4 and *lmd*5, wire 79, front *atb*8 and *atd*8, wire 34, left-hand winding of connecting magnet AV, battery; over its front *lmd*6 it completes the following holding circuit for relay *atd*1 of tester TE: ground, front *lmd*6 and *lme*5, wire 78, front *atb*7 and *atd*7, relay *atd*1, front *atd*1/1, wire 1 of cable *Cb*1, back *ldh*3, *ldf*3, *ldd*3, *ldb*3, wire 76, front *ata*5, resistance *Re*110, battery.

Magnet AV of call finder CA causes the connection of said finder to the terminal selector chosen by outgoing connector CS. Over its front *av*1 it prepares a holding circuit for itself; through the operation of its contact *av*2 it isolates the *c* wire coming from the feeder from the class-indication sending circuit and connects it to contact *cca* of call finder CA; over its front *av*3 it completes the following circuit: ground, front *av*3, contact *tca* of call finder CA, wire *t*, back *tv*5, left-hand winding of the terminal selector's connecting magnet TV, which energizes, battery; at *av*4 it makes a break in wire *m* in order to mark call finder CA busy.

Magnet TV causes the connection of terminal selector ST to the calling line's connector. Through the action of its contacts *tv*1 and *tv*5 it completes a holding circuit for itself over its two windings in series, the switching in of its right-hand winding being intended to reduce the current drain and to prevent useless overheating; at *tv*2 it completes the following circuit: ground, front *tv*2, contact *tst* of terminal selector ST, right-hand windings of relays *jla* and *jlc* in series, battery. Relay *jlc* energizes after a short delay and relay *jla* holds over the above circuit. Through the opening of its back *tv*4, magnet TV makes a break in wire *m*, in order to mark the terminal selector busy.

The calling subscriber then finds himself connected to register EN over the following circuit: subscriber A, line wire *a*, front *ast* of terminal selector ST, wire *a*, front *aca* of call finder CA, wire *a*, feeder AL, wire *b*, front *bca* of call finder CA, front *bst* of terminal selector ST, line wire *b*.

The various members used to route the call from the calling subscriber to the register, namely, tester TE, terminal-selector connector CST, outgoing connector CS and marker M, will now be released, so as to make them available for the routing of another call.

Relay *jlc* of subscriber connector JA removes through the opening of its back *jlc*1 and *jlc*2 any shunt on the calling subscriber's line wires *a* and *b*; at *jlc*3 it causes the release of relay *jlp*, assuming no other calls are waiting in the fifties under consideration; at *jlc*4 it causes the release of relay *tca* of terminal-selector connector CST and thus controls the various operations involved in the release of the common control members.

Relay *tca* opens at *tca*1 the circuit of relay *tcf*, which releases; at *tca*2 it opens the circuit of relay *tcb*, which releases in turn. Relay *tcb* opens at *tcb*2 and *tcb*3 the circuits of magnets *tss*, *tsx* and of relay *tcd*; at *tcb*5 it opens the circuit of the upper winding of relay *lmt* of the marker, said relay re-energizing for a short instant over its lower winding. Relay *tcf* opens at *tcf*1 the circuits of relay *aca*, of magnet *ass* and of relay *acd'* in outgoing connector CS; at *tcf*3 it opens the circuit of relay *ack*1. Relay *tcd* opens at *tcd*2 the circuit of connecting magnet TY. Terminal-selector connector CST is fully released.

In outgoing connector CS, relay *aca* upon releasing opens at *aca*2 the circuit of relay *acb*, which releases; at *aca*1 it opens the circuit of magnet *asx*.

In marker M, relay *lmc* and *lmd* release, having their circuits opened at *ty*2 in terminal-selector connector CST. Relay *lmb* releases, having its holding circuit opened at *lmc*1.

In tester TE, relay *atd*1 releases, having its holding circuit opened at *lmd*6 in marker M. Relay *ata* releases, having its two windings opened, one at *jlp*3 in common equipment EC and the other at *lmd*5 in marker M; at *ata*1 it opens the circuit of relay *atb* and the circuit of relay *ate*, which returns to normal only with a certain delay, owning to the short-circuiting of its upper winding. Owing to the opening of front *atd*8, the ground is removed from the lower terminal of the left-hand winding of magnet AV of call finder CA; this latter then holds over the following circuit: battery, windings of magnet AV in series, front *av*1, wire *t* and ground in feeder AL.

Relay *ata* of tester TE opens at *atb*9 the circuit of relay *acj* of outgoing connector CS and at *atb*3 the circuit of relay *lme* of marker M; at *atd*6 relay *atd* opens the circuit of relay *lmk* of marker M. Connector CS and marker M are fully released.

In distributer DI the left-hand winding of relay *ldb* is short-circuited owing to the opening of front *ata*4 in tester TE; relay *lda* holds and relay *ldb* energizes over the following circuit: battery, left-hand winding of relay *lda*, left-hand winding of relay *ldb*, front *lda*1, connection *cn*5, ground. Over its front *ldb*1 relay *ldb* prepares a holding circuit for itself over its left-hand winding as also the circuit of the opposite winding of relay *lda*, these two circuits to be used at the moment of routing a new call; over its front *ldb*2 it completes the following circuit: battery, left-hand winding of relay *ldc*, which energizes, back *ldd*1, front *ldb*2, ground.

As follows from the preceding explanations, distributer DI has received, at the end of the routing of the first call, a pulse given by the consecutive opening and closing of front *ata*4 of tester TE; the result of this arrangement has been to cause the operation of both relays *lda* and *ldb*. This arrangement has been provided so as to revise the order of priority given to the various call finders controlled by tester TE. In effect, when DI was in normal position, priority was given to the call finder corresponding to relay *atd*1; thus, relay *atd*1 holds over front *atd*1/1 and wire 1, while preventing over its back *atd*1/1 the other relays *atd*2 . . . *atd n* from holding over similar circuits.

When the distributer has received a pulse after the routing of the first call, relay *ldb* is energized; through the operation of contacts such as *ldb*3, the circuits of pyramid *Py*1 are so modified that wire 1 of cable *Cb*1 is switched out, a wire 2 (not shown) being then switched in. Under these conditions, priority is given to the call finder corresponding to relay *atd*2 according to a method identical with the one already described for the finder of relay *atd*1.

In tester TE relay *ate* releases after a time lag imposed by its slowness in energizing and prepares at *ate*1 the circuit of relay *ata* for the reception of a new call. So, even if a call is received at the instant under consideration, relay *ata* can operate only after a certain delay; accordingly, front *ata*4 is open for a sufficient time to allow the distributer to operate.

The various common control members used for the routing of the call, namely, terminal-selector connector CST, outgoing connector CS, tester TE and marker M, are fully released and ready to be used for the routing of a new call.

When the calling subscriber finds himself connected to register EN, he receives from said register a dialing tone telling him he may start dialing the called subscriber's number. The call is then routed through group-selection stages according to a method that will not be described, considering it is of no interest to the invention.

When the connection has been established between the calling and the called subscribers, the metering pulse or pulses are sent over the following circuit: wire *c* coming from feeder AL, front *av*2, contact *cca* of call finder CA, wire *c*, contact *cst* of terminal selector ST, meter *cp* of calling subscriber, battery.

The release of the members used for establishing the connection is placed under the control of feeder AL. When the call has ended, said feeder removes the ground from wire *t*, this causing the release of connecting magnet AV and hence the opening of the various contacts *aca, bca, cca* and *tca* of call finder CA. At *av*3 magnet AV opens the holding circuit of connecting magnet TV of terminal selector ST, the various contacts *ast, bst, cst, tst* of said selector being then opened. As a result, relays *jla* and *jlc* of subscriber connector JA release, assuming said subscriber has hung up. The various members used for putting through the call are fully released and ready to be used for a new call.

In case the calling subscriber had not hung up, relay *jlc*, according to a known method, would hold over its left-hand winding through the subscriber's loop through the medium of front *jlc*1, a fault relay *jlf*, placed in series with the holding winding of relay *jlc*, then causing the sending of a busy tone to the subscriber. When the latter hangs up, relays *jlc* and *jlf* release.

The various special cases capable of arising during the routing of a call from a calling subscriber to feeder AL will now be discussed and it will be assumed to begin with that, when said subscriber removes his handset, tester TE has already received a first call. In that case, relay *ata* is energized; the reception of the second call does not change in the slightest the various operations that follow one another in the tester. This latter selects a free call finder CA, the various operations thereupon developing as in the general case, with the sole difference that both subscribers are marked calling on the banks of terminal selectors ST, the two marking wires 14 respectively associated with said subscribers being both grounded. All the various terminal selectors ST capable of handling the calls of these subscribers are marked calling on the banks of call finders CA.

In the call-finder section belonging to tester TE, outgoing connector CS selects one of said terminal selectors. The connector CST controlling the terminal selector chosen then proceeds to hunt for a subscriber line comprised in the two calling lines. It can choose only one of these lines; in effect, if said lines are in different 25-line groups, two *tca* relays energize. The two *tcb* relays corresponding to said *tca* relays have their circuits completed simultaneously, but one of them is eliminated by the priority device already described for the *acb* relays of outgoing connector CS.

If the two calling subscribers form part of the same 25-line group, one of them can be served by one of the 13 "high" selection magnets associated with the first *tcd* relay, the other being served by one of the 12 "low" selection magnets associated with the second *tcd* relay. According to the same method as before, one of the *tcd* relays is eliminated, along with the associated selection magnet, limiting the choice to a 12- or a 13-subscriber group.

Finally, if both calling subscribers form part of the same 13- or 12-subscriber group served by the selection magnets *tss* associated with the same *tcd* relay, only the magnet *tss* whose contact *tss*1 is the nearest to the *tcd* relay can hold after the opening of contacts *tcc*3, preventing over its back *tss*1 the other magnets from holding over a similar circuit. In short, the call of one of the subscribers is put through, the call of the other subscriber being held waiting.

When the various common control members used to put through the first call are released, the second call is put through according to the same method as the first call.

If all the call finders CA controlled by tester TE are busy, none of the relays *atd*1 . . . *atd n* energizes and the sequence of operations cannot occur; in particular, relay *atb* remains unoperated, this allowing the operation of relay *atb* of the tester TE1 associated with the second call-finder section. The call can then be routed by means of said tester. If this tester had access only to busy call finders, the call could be handled by one of the two testers of the chain of members controlled by marker M'. The call would be lost only if all the call finders of the line-selecting means were busy.

If marker M is busied by an incoming call, that is, by a call intended for any one of the subscribers in the group, one or the other of the two back contacts *lmf*3 or *lmg*1 will be open, as will be explained subsequently. Relay *lme* will remain unoperated and the sequence of operations will be able to occur only after the release of marker M. In any case, the holding time of said marker is very short and the routing of the call is not delayed appreciably.

If the 4 terminal selectors connected to the banks of the first section of call finders CA and having access to the calling fifties are busy, the 4 *tv*2 contacts of these 4 selectors will all be open, and that will prevent the operation of relay *ata* of the tester TE controlling the first call-finder section. The call will then be routed by means of the tester controlling the second call-finder section. If said section gives access only to busy terminal selectors in the calling fifties, the call will be routed through the chain of members controlled by marker M'. From the foregoing explanations it follows that the call will be lost only if all the terminal selectors having access to the calling fifties are busy.

If the calling subscriber is tested simultaneously by both markers, the upper winding of relay *lmt* of marker M is shunted by the upper winding of relay *lmt* of marker M'; as a result, the flux produced in the upper winding of each of these relays is not sufficient to offset the flux of the lower winding, said relays then remaining energized. In both markers, relay *lmc* is held short-circuited over front *lmt*1 and *lmb*2; owing to their short-circuiting, these two relays are slow to release, but generally one of them will release before the other. It will be assumed that this happens in marker M. At *lmc*1 relay *lmc* opens the holding circuit of relay *lmb*, which releases; at *lmc*2 it switches out the low-resistance upper winding of relay *lmt*, modifying the test potential on wire 38, marker M' then testing the subscriber as if it were the only marker. Relay *lmb* of the marker M involved removes at *lmb*2 the short-circuit of relay *lmc*, which re-energizes.

Marker M' then routes the call according to the same method as in the general case. When the call has been handled, that is to say, when the subscriber has been connected to a feeder and a register, his connector JA is no longer in calling position; relay *tca* of the terminal-selector connector releases, entailing the release of the various members seized, according to a method similar to the one already described.

The subscriber may have been seized by an incoming call between the moment he removes his handset and the moment marker M makes the test. In that case, back *jlc*4 of his connector JA opens, preventing the energization of relay *tca* of terminal-selector connector CST or causing its release if it is in operating position. Having its circuit opened at *jlc*3, relay *jlp* releases, assuming no other calls are waiting. The various members seized release thereupon according to a method already described.

It will be noted that arrangements have been provided to block the operation of connector CST while the latter is not fully released. In effect, relays *tca* and *tcf* energize upon the seizure of connector CST, but the sequence of operations can occur only after the energization of relay *tce*, that is to say, only if all the selection magnets *tsx* and *tss* are in normal position. The simultaneous operation of two magnets *tss* and *tsx* is thus rendered impossible. Similar arrangements have been provided for outgoing connector CS.

Other calls may be waiting after the first call has been routed. If these calls originate from subscribers forming part of the same fifties, the *jlp* relay that has operated remains energized; if these calls originate from subscribers in other 50-subscriber groups, the *jlp* relays associated with said other groups are in operated position. In any case, the *ata* relay of the tester cannot release. The release of the tester is therefore not complete; however, the normal cycle of operations occurs again, a second call being handled according to the same method as the first.

If a number of subscribers in the group served by line-selecting means SL make calls simultaneously, these calls control, in the first chain, the normal cycle of operations, this cycle leading to the connection of a subscriber to a register. That operation over, the cycle occurs again, a second subscriber being then connected to the register. The various calls are thereupon handled according to the same method. The operations develop the same way in the second chain, this in practice allowing two calls to be handled at the same time.

How distributer DI successively gave priority to the first and to the second call finder CA of the second section has already been explained. It will be noted further that this distributer is multipled to the two testers; this change in priority would also have occurred if the call had been routed by the tester TE1 serving the second call-finder section. When the routing of the second call has ended, distributer DI has received a new pulse from tester TE through the medium of contact *ata*4.

Upon the closing of contact *ata*4 the following circuit has been completed: ground, front *ata*4, wire 73, front *ldb*1, right-hand winding of relay *ldb*, battery; the right-hand winding of relay *lda* is placed in parallel with the preceding circuit over front *lda*2. Relay *ldb* holds, but relay *lda* releases, its two windings producing equal fluxes of opposite sense.

Upon the opening of contact *ata*4 the right-hand winding of relay *ldb* is opened and said relay releases. Both relays *lda* and *ldb* home and will therefore operate the same way upon the reception of the next pulses at the distributer.

Relays *ldc* and *ldd* are arranged the same way as relays *lda* and *ldb*; however, instead of receiving pulses from tester TE, they receive pulses through the medium of front *ldb*2. Thus they receive a full pulse after the routing of two consecutive calls, so that their operating cycle is twice as long as that of relays *lda* and *ldb*. Also, relays *lde* and *ldf* are arranged according to the same method, but they receive pulses over front *ldd*2, their operating cycle thus being twice as long as that of relays *ldc* and *ldd*, that is to say, four times longer than that of relays *lda* and *ldb*. Finally, relays *ldg* and *ldh* are also arranged the same way, but they receive pulses over front *ldf*2, their operating cycle thus being twice as long as that of relays *lde* and *ldf*, that is to say, eight times longer than that of relays *lda* and *ldb*.

The operation of distributer DI can therefore be schematized in the following table. Shown only are the positions of relays *ldb*, *ldd*, *ldf* and *ldh*, which alone are important for the final result; the plus sign is placed alongside each relay in operating position.

| Number of Pulses Received by the Tester | Relay *ldb* | Relay *ldd* | Relay *ldf* | Relay *ldh* |
|---|---|---|---|---|
| 1 | + | | | |
| 2 | | + | | |
| 3 | + | + | | |
| 4 | | | + | |
| 5 | + | | + | |
| 6 | | + | + | |
| 7 | + | + | + | |
| 8 | | | | + |
| 9 | + | | | + |
| 10 | | + | | + |
| 11 | + | + | | + |
| 12 | | | + | + |
| 13 | + | | + | + |
| 14 | | + | + | + |
| 15 | + | + | + | + |
| 16 | | | | |

For the positions of relays *ldb*, *ldd*, *ldf* and *ldh* are thus obtained 16 different combinations, each corresponding to a given number of pulses received from the tester. By means of contacts such as *ldb*3, *ldd*3, *ldf*3 and *ldh*3, it thus becomes possible to set up according to a known method a pyramid Py1 comprising one incoming wire 76 and 16 outgoing wires 1 . . . 16 grouped into a cable *Cb*1. The battery of resistance *Re*110 will therefore be applied in succession to each of these wires after the routing of each call, which allows giving priority in succession to each one of call finders CA. This arrangement has been provided to prevent the tester from choosing systematically a call finder that might be out of order.

The above-described distributer allows obtaining 16 different combinations. In fact, this number may be too high in practice; for example, the arrangement described comprises only 14 finders. It is therefore of interest to provide arrangements that will allow changing at will the number of combinations given by the distributer. To that end, a certain number of removable connections *cn*1 . . . *cn*5 have been provided. If only connection *cn*5 is made, 16 combinations are obtained, as stated.

If only connection *cn*4 is made, the operation is the same up to the end of the reception of the seventh pulse; however, after the reception of the eighth pulse, relay *ldh* energizes, as indicated in the distributer's operating table, this removing the ground from wire 131 at *ldh*2. The distributer homes as a result; the cycle of operations recurs upon the reception of the ninth pulse. Eight different combinations are thus obtained by this means. It will also be seen that 4 combinations are obtained by making connection *cn*3, two by making connection *cn*2 and only one by making connection *cn*1.

Other numbers of combinations than the above can be obtained by making two or more connections *cn*1 . . . *cn*5 simultaneously. Thus, if it is desired to obtain 12 combinations, connection *cn*4 is made, which gives 8 combinations, and connection *cn*3, which gives 4. The operation is then as follows. The various operations develop as already described, up to the end of the reception of the seventh pulse. At the end of the eighth pulse, relay *ldh* is energized and contact *ldh*2 is open, but the ground remains held on wire 131 over back *ldf*2. The normal cycle of operations develops up to the end of the eleventh pulse; however, after the twelfth pulse, relay *ldf* is energized and contact *ldf*2 open. The ground is removed from wire 131 and the distributor returns to normal.

According to a similar method it is possible to obtain any desired number of combinations comprised between 1 and 16, this number being equal to the sum of the numbers corresponding to each connection made; for example, to obtain the 14 corresponding to the case defined in connection with the description of the general operation diagram of Fig. 1, connections *cn*4, *cn*3 and *cn*2 will be made, corresponding respectively to 8, 4 and 2 combinations.

The case of the routing of a call intended for a subscriber in the group will now be discussed, with reference to Figs. 3 to 18, arranged as indicated by the association plan of Fig. 26.

The incoming connector CE shown in Fig. 10 is designed to hunt for a calling fifties selector and thereupon to connect said selector to receiver RC. It comprises an individual switch *ccx* controlled by selection magnets *csx, css* and connecting magnet CX, as well as a certain number of relays. In the embodiment described, individual switch *ccx* is placed on the same frame as the 14 fifties selectors SC to which it has access; therefore, the same selection magnets *csx* and *css* are used for individual switch *ccx* and for fifties selectors SC. It is quite obvious that other arrangements could be adopted, part of the fifties selectors, for example, being placed on the same frame as the finders.

A wire *m* has been provided in fifties selector SC; if this selector is available, along with the corresponding incoming connector CE, this wire *m* is grounded over the following circuit: wire *m*, back *cv*4, wire 28, back *cxm* of individual switch *ccx*, ground. The *t* wire is connected to the battery over *cv*5 and resistance R*t*. These polarities applied to wires *m* and *t* mark the availability of fifties selector SC in the preceding selection stages SG.

Upon the seizure of fifties selector SC, wires *c* and *t* are grounded and the following circuit is completed: ground, wire *c* leading into the fifties selector, back *cv*2, wire 25, resistance R*e*101, relay *cca*, battery. Incoming connector CE, designed to effect the connection between a calling fifties selector SC and a receiver RC, serves 14 selectors SC used for the normal routing of calls and 4 cooperating selectors, as stated in the description of the general operation diagrams of Figs. 1 and 2. Each selector (normal selector or cooperating selector) corresponds to a wire 25; a total of eighteen 25 wires are thus obtained for connector CE. These 18 wires are divided up into two 9-wire groups, the wires of the same group being all multipled, through the medium of resistances R*e*101, to a relay *cca*. There are thus two *cca* relays in incoming connector CE, the *cca* relay operating indicating to which 9-wire group the selector seized belongs.

The *cca* relay operating completes at *cca*1 the following circuit: battery, lower winding of relay *ccb*, back *ccb'*1, front *cca*1, wire 63, *back crl*1, wire 62,, back *cch*2 and *ccg*2, ground. Two *ccb* relays have been provided, connected respectively to the *cca*1 contacts of the two *cca* relays; the *ccb* relay operating therefore characterizes, like relay *cca*, the 9-wire group to which the calling fifties selector belongs. The circuit of each of these two *ccb* relays passes through a back contact *ccb'*1 associated with the other relay.

At *cca*2 relay *cca* completes two circuits such as the following: battery, upper winding of relay *ccd*, back *ccd'*1, back *css*1, back *csx*1, relay *cce*, front *cca*2, back *cx*1, ground. Two circuits similar to the preceding one have been provided; the first of them comprises a relay *ccd*, back contacts *css*1 associated with the 13 "high" selection magnets *css*, a contact *csx*1 associated with the "high" switching magnet *csx* and a relay *cce*; the second circuit is made up the same way but comprises back contacts *css*1 associated with the 13 "low" selection magnets *css*. Each of these circuits passes through a back contact *ccd'*1 associated with the *ccd* relay of the other circuit. These two circuits are joined to one same wire 132, said wire being multipled to the two *cca*2 contacts respectively associated with the two *cca* relays. The two *cce* relays energize, thus indicating that all the high and low selection and switching magnets are in normal position. The *ccd* relays do not operate, owing to the high resistance of the *cce* relays.

Relay *ccb* prepares at *ccb*3 the circuit of the selection magnet *css* corresponding to the calling fifties selector.

The two *cce* relays each comprise two contacts, the contacts of the first relay being referenced *cce*1, *cce*2, and those of the second *cce'*1 and *cce'*2. These contacts being closed, relay *ccc* energizes over the following circuit: battery, relay *ccc*, front *cce'*1, and *cce*1, back *ccd'*2 and *ccd*2, ground.

Relay *ccc* completes a holding circuit for itself over contacts *ccc*2 and *ccb*4; at *ccc*3 it causes the operation of the selection magnet *css* corresponding to the calling fifties selector. To choose a calling selector from among the 18 controlled by incoming connector CE, 18 selection magnets *css*1 . . . *css*18 are available in said connector, each corresponding to one of said selectors. Each 25 wire is connected, through the medium of a contact *ccb*3, to the *css* magnet of the corresponding selector. Each *css* magnet is connected, through the medium of a contact *ccc*3, either to the first *ccd* relay, if it is a high magnet, or to the second *ccd* relay, if it is a low magnet. There are therefore a total of 18 *ccb*3 contacts and 18 *ccc*3 contacts. The *css* (sic—Translator) relay corresponding to the calling selector energizes over the following circuit: wire *c* leading into the fifties selector and grounded as already described, back *cv*2, wire 25, front *ccb*3, selection magnet *css*, front *ccc*3, back *ccd'*1, relay *ccd* energized, battery.

Selection magnet *css* upon operating prepares the connection of individual switch *ccx* to the calling fifties selector SC. Through the opening of its back *css*1, it opens the circuit of relay *cce*, which releases; over its front *css*1 it completes a holding circuit for itself; over its front *css*2 it prepares the circuit of the connecting magnet CX that is to cause the operation of individual switch *ccx*. The various *css*2 contacts respectively associated with the *css* selection magnets are all placed in parallel.

Relay *ccd* opens at *ccd*2 the circuit of relay *ccc*, which, being slow to release, releases only with a certain delay; at *ccd*3 it prepares the operation of the magnet CX associated with switch *ccx*. The *ccd*3 front contacts respectively associated with the two *ccd* relays are placed in parallel.

When relay *ccc* releases it completes at *ccc*1 the following energizing circuit for magnet CX: battery, connecting magnet CX, front *ccb*5, *ccd*3, back *ccc*1, front *css*2, ground. Magnet CX upon operating causes the connection of individual switch *ccx* to the fifties selector corresponding to the selection magnet *css* energized, that is, to the calling selector. The following circuit is completed as a result: wire *t* grounded as already indicated, back *cv*5, wire 24, front *cxt* of indivdual switch *ccx*, relay *cch* energized, battery. Wire 25, already grounded over the *c* wire leading into the fifties selector, is also grounded over front *cxc* of individual switch *ccx* and front *cx*1. In this way, incoming connector CE remains seized even if the ground disappears from the *c* wire. The closing of front *cxb* and *cxa* prepares the reception of the number dialed at the receiver.

Relay *cch* completes at *cch*1 a holding circuit for connecting magnet CX; at *cch*2 it opens the energizing circuit of relay *ccb*, which releases; at *cch*3 it causes the seizure of the receiver RC associated with connector CE, the following circuit being completed: ground, front *cch*3, wire 64, back *crz*2, relay *cro*, resistance R*e*141, battery; at the same time, it prepares the operation of the various relays of the receiver that are provided to register the number dialed. Relay *cch* prepares at *cch*4 the circuit for receiving the call number at receiver RC; at *cch*5 it completes the circuit of relay *crl* over wire 67.

Relay *ccb* upon releasing opens at *ccb*3 the circuit of selection magnet *css* and of relay *ccd*, which releases.

In receiver RC, relay *crl* prepares a holding circuit for itself over its left-hand winding at *crl*2; through the opening of its front *crl*1 it makes a break in wires 62 and 63, in order to mark receiver RC busy. Relay *cro* completes a holding circuit for itself at *cro*2.

Code-receiving relays *cra, crc* and *crd* are then connected to the two line wires *a* and *b* leading into the fifties selector over the following two circuits:

(1) Wire *a*, wire 27, front *cxa* of individual switch *ccx*, front *cx*2, wire 72, rectifier Q5, relay *cra*, ground;

(2) Wire *b*, wire 26, front *cxb* of individual switch *ccx*, front *cx*3 and *cch*4, wire 71, back *crz*4, rectifier Q7, relay *crc*, ground and, in parallel with the preceding circuit, rectifier Q8, relay *crd*, ground.

Register EN, finding a ground over relays *cra, crc, crd*, then sends receiver RC the various digits used to find the called subscriber within the group. As this group comprises 500 subscribers, three digits are used to make this selection. The first digit corresponds to the subscriber's hundreds and can be comprised between 1 and 5; the last two digits correspond respectively to the tens and to the units and can be comprised between 1 and 10. Each of these digits is sent, in the form of a polarity or of a combination of polarities, over the *a* and *b* wires leading into the fifties selector and the two circuits previously described. More specifically, the register can send over the *a* wire either a positive polarity or an alternating current. In the first case, relay *cra* alone energizes; in the second case, relay *cra* energizes first under the effect of the first positive alternation and then closes its contact *cra*2, thus allowing the energization of relay *crb* under the effect of the next alternation. The register can send over line wire *b* a positive polarity, a negative polarity or an alternating current. In the first case, relay *crc* alone energizes; in the second case, relay *crd* alone energizes; and in the third case, both relays *crc* and *crd* energize. Thus, by means of the four receiving relays *cra, crb, crc* and *crd*, $2^4=16$ possible combinations could be obtained. In fact, relay *crb* cannot energize without relay *cra*, this in itself already excluding 4 combinations; moreover, in the case of the reception of the first digit, relay *crd* is not used, this reducing to 6 the number of combinations. Only 5 out of these 6 combinations are used for the first digit, since only 500 subscribers are served by the line-selecting means under consideration.

Relays *cra . . . crd* operate momentarily when the register sends the first coded combination, but they release when the reception of said combination is over, so as to be used again for the reception of the next digits. Arrangements must therefore be provided to register the first digit. Three *cre* relays are provided to that end. The first *cre* relay is connected, through a back contact *crx*2, to the front contact *cra*1 associated with relay *cra*; the second *cre* relay is connected, through another *crx*2 contact, to the front contact *crb*1 associated with relay *crb*; finally, the third *cre* relay is connected, through a third *crx*2 front contact, to the *crc*1 contact associated with relay *crc*.

To fix the ideas, it will be assumed by way of example that relay *cra* alone has operated upon the reception of the first group. Over its front *cra*1 it completes the following circuit: battery, first *cre* relay energized, back *crx*2, front *cra*1, wire 64, front *cch*3, ground. The four contacts *cra*1 . . . *crd*1 are multipled to the same wire 64.

Relay *cre* prepares a holding circuit for itself at *cre*1, as also an energizing circuit for relay *crx*, said relay *crx* being short-circuited at the instant under consideration by the ground on wire 64 and the ground existing on the left-hand terminal of relay *cre*.

When the reception of the coded combination corresponding to the first digit is over, relay *cra* releases; as a result, relay *cre* holds and *crx* energizes over the following circuit: battery, *cre*, front *cre*1, upper winding of *crx*, wire 64, front *cch*3, ground. Relay *crx* completes at *crx*1 a holding circuit for itself over wire 64 grounded; through the action of its contacts *crx*2 it isolates first-digit registering relays *cre* and prepares the registering of the second digit by relays *crf*; at *crx*3 it short-circuits its upper winding, in order to prepare the circuit for sending the first digit to marker M.

The second digit is sent by the register; it is received in the same manner by relays *cra . . . crd* and registered by relays *crf*. It is to be noted only that this digit, corresponding to the called subscriber's tens, can be comprised between 1 and 10; therefore, the 4 *cra . . . crd* relays and the 4 *crf* relays are used. At the end of the reception of the second digit, receiving relays *cra . . . crd* release and relay *cry* energizes.

The third digit is received according to the same method by relays *cra . . . crd* and registered by relays *crg*. When the reception of this digit is over, receiving relays *cra . . . crd* release and relay *crz* energizes.

Relay *crz* prepares over its front *crz*2 the circuit of relay *lma*1 of marker M; over its front *crz*3 it causes the seizure of said marker M, the following circuit being completed: battery, relay *lmg* of marker M, back *lmq*1, *lmf*2, *lme*1, wire 91, back *crk*2, front *crz*3 and wire 64 grounded as already described; through the action of its contact *crz*4 it isolates line wire *b* from receiving relays *crc, crd* and prepares the use of this wire for another purpose; at *crz*5 it causes the energization of relay *crq* over its left-hand winding.

In marker M, relay *lmg* makes at *lmg*1 a break in the circuit of relay *lme*, in order to prevent the seizure of the marker by a call originating from a subscriber in the group; at *lmg*2 it prepares an energizing circuit for relay *lmf*; at *lmg*3 it completes the following circuit: battery, resistance Re180, front *lmg*3, back *lma*4/2, *lma*3/2, *lma*2/1, relay *lma*1 energized, wire 106, back *crk*1, front *crz*2, wire 64, front *cch*3, ground. Four relays *lma*1 . . . *lma*4 have been provided in marker M; relay *lma*1 operates when the marker is seized by the receiver serving the first-section fifties selectors; relay *lma*2 operates when the marker is seized by the receiver serving the second-section fifties selectors. It will be assumed in the case under consideration that the calling fifties selector is comprised in the first section and that relay *lma*1 energizes. Relays *lma*3 and *lma*4 are used in the case of cooperation discussed later.

Relay *lma*1 makes at *lma*1/1 a break in the circuit of relay *lma*2, in order to prevent the seizure of marker M by the receiver assigned to the second-section fifties selectors; at *lma*1/5 it prepares the hunting for a terminal selector by outgoing connector CS; at *lma*1/6 it prepares an energizing circuit for relay *lmk*; at *lma*1/8 it prepares the circuit of connecting magnet CV of fifties selector SC; at *lma*1/9 it prepares a holding circuit for relay *cch*.

Relay *lma* causes over its front *lma*1/11, *lma*1/12, *lma*1/13 the retransmission of the three digits registered from receiver RC to marker M. To receive the first digit at said marker, three relays *lmx* are available, respectively connected to the three *cre* relays over wires 88; likewise, to receive the second digit, four relays *lmy* are available, respectively connected to the four *crf* relays over wires 89; finally, to receive the third digit, four relays *lmz* are available, respectively connected to the four *crg* relays over wires 90. Of course, 3 contacts *lma*1/11 respectively connected to the three *lmx* relays, 4 contacts *lma*1/12 respectively connected to the four *lmy* relays and 4 contacts *lma*1/13 respectively connected to the four *lmz* relays have been provided. The first digit is sent from receiver RC to marker M over the first *lmx* relay, the following circuit being completed: wire 64 of receiver RC grounded as already indicated, front *crx*3 and *cre*1, wire 88, front *lma*1/11, first *lmx* relay, battery. The other two digits are sent from the receiver to the marker over relays *lmy* and *lmz* respectively over similar circuits.

Relay *lma* prepares at *lma*1/14 the circuit for marking the line of the called subscriber on the banks of the terminal selectors; it completes the following circuit at the same time: battery, relay *lmf* energized, front *lmg*2, *lma*1/14, wire 91, back *crk*2, front *crz*3 and wire 64 grounded; at *lma*1/15 relay *lma* completes a holding circuit for itself.

Relay *lmf* completes a holding circuit for itself at *lmf*1; at *lmf*2 it opens the circuit at *lmg*; at *lmf*3 it maintains the break in the circuit of *lme* after the re-closing of back *lmg*1 in order to prevent the seizure of the marker involved by a call from a subscriber in the group; over its front *lmf*4 it prepares the circuit for marking the called subscriber's line on the terminal-selector banks; at *lmf*5 it prepares the called subscriber's test circuit.

Relays *lmx*, provided to register the first digit in the marker, comprise a pyramid of contacts schematically represented by *lmx*1 . . . *lmx*3. Five wires go out from this pyramid, each characterizing a given hundreds and terminating at a relay *lmv*. There is therefore a total of 5 *lmv* relays. The *lmv* relay corresponding to the hundreds dialed therefore energizes over the following circuit: battery, relay *lmv*, pyramid of contacts *lmx*1 . . . 3, wire 121, front *lma*1/14, wire 91, back *crk*2, front *crz*3 and wire 64 grounded.

Relays *lmy*, provided to register the called subscriber's tens digit, comprise a pyramid of contacts schematically represented by *lmv*1 . . . 4. Ten wires go out from this pyramid, each multipled to 5 contacts *lmv*1 respectively associated with the 5 *lmv* relays. At the outlet of contacts *lmv*1 are thus obtained 50 relays *lmw*, each characterizing a given tens in the 500-subscriber group. The *lmw* relay characterizing the called subscriber's tens energizes over the following circuit: battery, relay *lmw*, front *lmv*1, pyramid of contacts *lmy*1 . . . 4, wire 121 and ground over a previously-described circuit.

Relays *lmz*, provided to register the units digit, comprise a pyramid of contacts schematically represented by *lmz*1. . . 4. Ten wires go out from this pyramid, each multipled to 50 contacts *lmw*1 respectively associated with the 50 *lmw* relays. At the outlet of contacts *lmw*1 are thus obtained 500 marking wires 83, each characterizing a subscriber within the group. The called subscriber's 83 wire is grounded over contact *lmw*1, pyramid *lmz*1 . . . 4, front *lmf*4 and ground.

The 500 marking wires 83 are respectively connected to the 500 incoming terminals *bn*1 of distributer RM. This distributer comprises 500 outgoing terminals *bn*2, each corresponding to a subscriber line.

The above-described arrangements make it possible to assign, within a 500-line group, a given call number to a subscriber capable of occupying any position with respect to the selectors. For this it suffices to connect the terminal *bn*2 of a line to the terminal *bn*1 corresponding to the call number it is desired to assign to that line. From the foregoing descriptions it follows that the reception of the called subscriber's last three digits at marker M is translated into the grounding of an incoming terminal *bn*1 corresponding to the call number received and of an outgoing terminal *bn*2 corresponding to the line to which that call number has been assigned.

Marker M comprises a relay *lmq* which is multipled to the 3 contacts *lmx*4 respectively associated with the three *lmx* relays, to the 4 contacts *lmy*5 respectively associated with the four *lmy* relays, to the 4 contacts *lmz*5 respectively associated with the four *lmz* relays, to the 5 contacts *lmv*2 respectively associated with the five *lmv* relays and finally to the 50 contacts *lmw*2 respectively associated with the fifty *lmw* relays. This relay *lmq* therefore energizes as soon as the digits are sent to the marker over relays *lmx, lmy, lmz*.

It will be assumed throughout what follows that the called subscriber is free. In that case, back *jlc*4 and *jla*3 of his connector JA are unoperated and his marking wire 14 is grounded over the following circuit: wire 14, back *jlc*4, *jla*3, wire 7, terminals *bn*2 and *bn*1 of marking distributer RM and wire 83 grounded as already indicated. Wire 14 being grounded, the subscriber dialed is brought to the calling position on the terminal-selector banks, causing in connector CST the same operations already described for the case of a calling subscriber, namely, the operation of a *tca* relay, of a *tcf* relay, of two *tce* relays and of the *tcc* relay. All the terminal selectors free and capable of handling the call are brought into the calling position on the banks of the two outgoing connectors CS respectively serving the two fifties-selector sections of the chain involved. Since it has been assumed that the calling fifties selector formed part of the first section, only the operations developing in connector CS of said first section will be involved.

It will be noted that the outgoing connector CS that controls the positioning of selector SC is the same that was used to position the call finder.

In this connector, relays *aca*, corresponding to calling terminal selectors, energize according to the same method as for the case of a calling subscriber; the same applies to the two *ace* relays.

It will be assumed throughout what follows that the first fifties-selector section gives access to one or more free terminal selectors capable of serving the called 50-subscriber group; under these conditions, relay *ack*1 energizes as in the case of a calling subscriber.

The *acb* relays corresponding to the *aca* relays energized energize over the following circuit: battery, resistance Re92, upper windings of relays *acb*, back *acb'*1, front *aca*2, back *acj*1, wire 58, front *lma*1/5, ground.

One of the *acb* relays operates owing to the existence of the priority device already mentioned and causes the hunting for a terminal selector in calling position according to the same method as in the case of a calling subscriber.

When a terminal selector ST has been seized to route the call, connector CST hunts for the called subscriber by means of wire 14 according to the same method as in the case of a calling subscriber.

Further, one of the selection magnets *ass*1 . . . *ass*20 corresponding to the lines used for the normal routing of calls is in operating position and the following circuit is completed: battery, relay *crm* energized in receiver RC, wire 54, fifth front contact of the *ass* magnet that has operated, resistance Re93, back *acc*1, front *acd*2, ground.

As stated, the fifties selectors of the section involved are placed on the same frame as incoming connector CE; therefore, in order to position the calling fifties selectors it is necessary to cause, in said incoming connector CE, the operation of the selection magnets *csx* and *css* occupying the same position as magnets *asx* and *ass* of outgoing connector CS. In other words, connector CS must send connector CE an indication relative to the seized terminal selector's position in order to route the call. This result is obtained as follows.

A relay *ccg* comprised in incoming connector CE is connected to all the positions of individual switch *ccx* that give access to the selectors placed on the same frame as said incoming connector. Since it has been assumed that the 14 fifties selectors were on this frame, relay *ccg* actually is connected to the position in which said individual switch *ccx* finds itself. The following circuit is then completed: ground, front *crm*3 in receiver RC, wire 68, contact *cxe* of individual switch *ccd*, relay *ccg* energized, back *ccb'*2 and *ccb*2 respectively associated with two *ccb* relays, resistance Re102, battery.

Relay *ccg* prepares over its front *ccg*2 an energizing circuit for relay *ccj*; over its front *ccg*3 it causes the operation of the two *cce* relays over circuits already described; over its front *ccg*4 it prepares the circuit of the switching magnet *csx* corresponding to the *asx* magnet energized in connector CS; at *ccg*5 it prepares the circuit of the selection magnet *css* corresponding to the *ass* magnet energized in connector CS; at *ccg*6 it prepares the circuit of the *lmk* relay comprised in marker M and designed to mark the end of the selection.

Each *cce* relay comprises two contacts, the contacts of the first *cce* relay being referenced *cce*1 and *cce*2 and those of the second *cce* relay *cce'*1 and *cce'*2. These contacts being closed, the following two circuits are completed:

(1) Battery, relay *ccc*, which energizes with a short delay, front *cce'*1 and *cce*1, back *ccd'*2 and *ccd*2, ground;

(2) Battery, relay *ccj* energized, front *cce'2*, *cce2*, *ccg2*, ground.

Relay *ccj* completes a holding circuit for itself at *ccj1*; at *ccj2* it completes the following holding circuit for relay *ccc*: battery, relay *ccc*, front *ccc2* and *ccj2*, back *ccd'2* and *ccd2*, ground; at *ccj3* it completes the following circuit: ground, front *ccj3* and *ccg4*, wire 124, front *asx2* associated with the *asx* magnet energized, wire 113, switching magnet *csx* energized, battery.

The *cce* relays release, having their circuits opened at *csx1*.

Relay *ccc* completes the following circuit at *ccc3*: ground, front *ccj3* and *ccg5*, wire 125, front *ass2* associated with selection magnet *ass* energized, wire 122, selection magnet *css*, front *ccc3*, back *ccd'1*, upper winding of relay *ccd* energized, battery.

In incoming connector CE, that is to say, on the fifties-selector frame, has thus been caused the energization of one switching magnet *csx* and of one selection magnet *css*, respectively corresponding to the switching magnet *asx* and to the selection magnet *ass* that have operated in outgoing connector CS.

In the case where the energization is caused of one of the selection magnets *css19* . . . *css26*, which are connected directly to the battery, the *ccd* relay does not operate, but this is of no interest for the rest of the operation.

Magnet *css* completes a holding circuit for itself over its front *css1*.

Magnets *css* and *csx* being both operated, the following circuit is completed: ground, front *css2*, *csx2*, *ccg6*, wire 61, front *crm1*, back *crj1*, wire 102, front *lma1/6*, relay *lmk*, battery. Relay *lmk* operates, thus indicating that the selection has ended.

Relay *ccd* opens at *ccd2* the circuit of relay *ccc*, which releases with a short delay.

In marker M, relay *lmk* prepares at *lmk1* the circuit of the *lmd* relay that must cause the connection.

When the hunting for the called subscriber by connector CST has ended, marker M is connected to said subscriber through individual switch *cty* according to the same method as in the case of a calling subscriber. The marker then tests the called subscriber and, if he is not tested by another marker at the same instant, relay *lmt* releases and *lmd* energizes, the details of all these operations being the same as in the case of a calling subscriber.

Relay *lmd* then controls the various operations involved in the connection in the fifties selector and in the terminal selector. It completes the following circuit at *lmd2*: ground, front *lmd2* and *lma1/8*, wire 69, front *cxv* of individual switch *ccx*, wire 23, right-hand winding of connecting magnet CV energized, battery. At *lmd1* it completes the following holding circuit for relay *cch*: battery, front *lmd1* and *lma1/9*, wire 70, relay *cch*, battery; at *lmd4* it completes a holding circuit for itself.

Magnet CV causes the conection of fifties selector SC to the terminal selector ST chosen to route the call. Over its front *cv1* it prepares the following holding circuit for itself: battery, windings of magnet CV in series, front *cv1*, wire *t* and ground in group-selection stages SG. The switching in is thus prepared of the high-resistance left-hand winding of magnet CV, in order to reduce the current drain in said magnet and to prevent needless overheating. This holding circuit will be completed only when the short-circuit of the left-hand winding of CV has been removed through the disappearance of the ground on wire 23, after the release of the common control members. Over its back *cv2* it opens one of the circuits of relay *cca*, which then holds over *cxc* and *cxl*; over its front *cv2* it applies a ground to the *c* wire, in order to cause feeder AL to send a metering pulse to the calling subscriber's meter; over its front *cv3* it completes the following circuit: ground, front *cv3*, contact *tsc* of fifties selector SC, wire *t*, back *tv5* in terminal selector ST, left-hand winding of magnet TV energized, battery.

Magnet TV causes the connection of terminal selector ST to the called subscriber. Through the action of its contacts *tv1* and *tv5*, it switches in its high-resistance right-hand winding, in order to reduce the current drain and prevent needless overheating; through the opening of its back *tv2* and *tv4* it makes breaks in wires 13 and 15 in order to mark terminal selector ST busy; over its front *tv2* it completes the following circuit: ground, front *tv2*, front *tst* of terminal selector ST, called subscriber's test wire *t*, right-hand windings in series of relays *jla* and *jlc* energized, battery; over its front *tv2* it also short-circuits the upper winding of relay *lmt* of marker M, which as a result re-energizes for a brief instant.

In subscriber connector JA, relay *jla* makes a break in marking wire 14 over its back *jla3*, this causing the release of relay *tca* in terminal-selector connector CST. Relay *jlc* eliminates any shunt on the called subscriber's line wires *a* and *b* through the opening of its back *jlc1* and *jlc2*; through the opening of its back *jlc4* it busies the subscriber with respect to marker M both for an incoming and for an outgoing call; through the opening of its back *jlc5* it performs similar functions with respect to marker M'.

The group-selection stages SG are then connected to the called subscriber over the following circuit: wire *a* leading into fifties selector SC, front *asc* of fifties selector SC, wire *a*, front *ast* of terminal selector ST, line wire *a* of called subscriber A, loop of said subscriber A, line wire *b*, contact *bst* of terminal selector ST, wire *b*, contact *bsc* of fifties selector SC, wire *b*.

The various common members used for routing the call, namely, incoming connector CE, terminal-selector connector CST, receiver RC and marker M, will now be released as follows. As stated, relay *tca* releases, its circuit being opened at *jla3* in connector JA. This release entails the release of connector CST according to the same method already described for a calling subscriber.

In outgoing connector CS, relay *aca* has its circuit opened in connector CST at *tcf1*. Connector CS thereupon releases according to the same method already described for a calling subscriber, with the sole difference that relay *acj* is already in home position and does not have to release.

In incoming connector CE, magnets *csx*, *css* and relay *ccd* release, having their circuits opened respectively at *asx2* and *ass2* in outgoing connector CS. Relay *crm* has released in receiver RC owing to the opening of contact *ass5* in connector CS; at *crm3* it opens the circuit of relay *ccg* in connector CE. Relay *ccj* releases, having its circuit opened at *ccg2*. Relays *cca*, *cch* and connecting magnet CX still hold alone in incoming connector CE.

In marker M, relays *lmc* and *lmd* release, having their circuits opened in terminal-selector connector CST at *ty2*. Relay *lmc* opens at *lmc1* the circuit of *lmb*. At *lmd1* relay *lmd* opens the circuit of relay *cch* in connector CE.

In incoming connector CE, relay *cch* opens at *cch1* the circuit of connecting magnet CX; the various contacts *cxe*, *cxv*, *cxt*, *cxc*, *cxd* and *cxa* of individual switch *ccx* are opened; relay *cca* releases, having its circuit opened over front *cxl*. The incoming connector is fully released.

Relay *cch* removes the ground on wire 64 at *cch3*; as a result, relays *cre*, *crx* *crf*, *cry*, *crg* and *crz* release. Relay *cro* also releases owing to the opening of contact *cch3* in incoming connector CE. Relay *crq* releases, having the circuit of its left-hand winding opened at *crz5*. As long as one of relays *cre*, *crx*, *crf*, *cry*, *crg*, *crz* or *cro* is energized, relay *crl* holds over its left-hand winding; thus, if relay *cre* is still operated, relay *crl* holds over the following circuit: ground, left-hand winding of relay *crl*, front *crl2*, resistance Re142, wire 64, upper winding of relay *crx*, front *cre1*, relay *cre*, battery. The value of resistance Re142 is chosen so that the current flowing in the preceding circuit will allow holding relay *crl* without preventing the release of the other relays placed in the same circuit. When all the relays of receiver RC have released, relay *crl*, which in addition has the circuit of its right-hand winding opened at *cch*5, releases in turn and restores at *crl*1 the continuity of wires 62, 63, in order to signal the availability of the receiver.

In marker M, relay *lmk* has had its circuit opened at *crm*1 in receiver RC. Relay *lma*1 releases, having its circuit opened at *cch*3 in incoming connector CE. Relays *lmf, lmv, lmw, lmx, lmy, lmz* release, having their circuits opened at *cch*3 in connector CE. Relay *lmq* releases in turn when the various contacts *lmx*4, *lmy*5, *lmz*5, *lmv*2 and *lmw*2 are opened. Marker M is fully released.

The various common control members used for the routing of the call are fully released.

When the call ends, the ground is removed from the *t* wire leading into the fifties selector by the member or members located ahead and connecting magnet CV releases. Over its front *cv*3 it opens the circuit of connecting magnet TV of the terminal selector, which releases in turn. Subscriber connector JA releases as explained for a calling subscriber. The various members used for the routing of the call are fully released.

The various special cases capable of occurring during the routing of a call intended for a subscriber in the group will now be discussed and it will be assumed to begin with that incoming connector CE is busy when the call is received at fifties selector SC. One of the *cca* relays will already be energized; the reception of the call involved, depending upon the position of the fifties selector, will cause the operation of a second *cca* relay or will complete a second energizing circuit for the *cca* relay already energized. In both cases, connector CE will choose one fifties selector out of the two, a call received over the other selector being held waiting until the first call has been handled. In effect, only one *ccb* relay can operate, owing to the cyclical priority device already mentioned in the case of a calling subscriber, which already selects a group of 7 selectors out of the 14. Likewise, only one *ccd* relay can energize, this eliminating at *ccd'*1 the selection magnets *css* associated with the other *ccd* relay and thus selecting a group of three or of four selectors out of the seven. Finally, after the opening of contacts *ccc*3, only the magnet *css* whose contact *css*1 is the nearest to the *ccd* relay can hold over its front *css*1, since over its back *css*1 it prevents the other magnets from holding over a similar holding circuit. Lastly, only one fifties connector SC is chosen by connector CE; a call received over the other fifties selector is handled only when all the common control members used for the first call have been released.

In any case, the various operations involved in the hunting for a calling fifties selector can occur only after the energization of the two *cce* relays that is to say, only if all the switching magnets and all the selection magnets are in normal position. The simultaneous connection of an incoming connector CE to two fifties selectors SC is thus rendered impossible.

There is only one receiver RC per incoming connector CE; said receiver could not therefore be busied by another call when the contacts of individual switch *ccx* are closed, but it may happen that the receiver is not fully released. In that case, relay *crl* is energized and back *crl*1 is open; relay *ccb* of incoming connector CE cannot operate and prevents connecting magnet CX from energizing; the normal cycle of operations is suspended and cannot be resumed until after the full release of receiver RC.

If marker M is busy with a call intended for a subscriber in the group, that is, if it is seized with the receiver serving the second fifties-selector section, one at least of contacts *lmf*2 or *lmq*1 is open, preventing the operation of relay *lmg*. Contact *lma*2/1 is opened, and relay *lma*1 cannot operate. The receiver RC involved will be unable to seize marker M until after full release. It will be noted further that the holding time of marker M is very short, the time during which the call is held waiting being almost nil.

If marker M is busy with a call originating from a subscriber in the group, relay *lme* is energized, back *lme*1 is open and relay *lmg* cannot energize. The call is held waiting until said marker M has routed the call in progress. However, if the second marker were also seized by a call originating from a subscriber in the group, the *lme'*3 contact included in said marker would be closed, and that would prevent the seizure of the first marker by receiver RC. A call originating from a subscriber in the group is thus routed by the second marker, a call intended for a subscriber being routed by the first marker. In this way, no call is lost.

If the called subscriber is busy, at least one of the two back contacts *jla*3 and *jlc*4 is open; the called subscriber's marking wire 14 is not grounded. In terminal-selector connector CST, relays *tca* and *tcf* remain in normal position; contact *tcf*3 is open and relay *ack*1 of outgoing connector CS does not operate. A ground is then applied to the right-hand terminal of relay *cro* of receiver RC over the following circuit: wire 107, front *lma*1/7, wire 46, back *ack*4/1, *ack*3/1, *ack*2/1, *ack*1/1, ground. As a result, relay *cro* is short-circuited and releases. A battery polarity is then sent to the register over the following circuit: battery, resistance R*e*143, back *cro*1, front *crz*4, wire 71, front *cch*4 and *cx*3, front *cxb* of individual switch *ccx*, wire 26, wire *b*. The register, receiving this polarity, releases the various members seized, with the exception of the connector JA associated with the calling subscriber's line; the busy tone is sent to said subscriber from this connector according to a method already described.

It will be noted that, in the case of a free subscriber, the *cro* relay had been short-circuited as previously described but not long enough to cause its release.

If the call has been routed up to marker M, it will always be possible to handle said call by means of a terminal-selector connector CST and an outgoing connector CS, since these two members can be seized only by marker M. In effect, in the case of a calling subscriber, as in the case of a called subscriber, outgoing connector CS is seized by terminal-connector selector CST, said connector CST being seized by marker M over marking wire 14.

As explained in the case of a calling subscriber, arrangements have been adopted to block the operation of connectors CST and CS if said connectors are not fully released. Similar arrangements have been adopted for connector CE.

If the calling fifties selector belongs to the second section, the call is handled by the incoming connector and the receiver that are assigned to said section. This receiver RC1 seizes marker M as has already been described, with the sole difference that relay *lma*2 operates instead of relay *lma*1. Said relay *lma*2 then controls over its front *lma*2/5 the switching in of the outgoing connector CS1 serving the second fifties-selector section.

In the foregoing descriptions it has been assumed that the calling fifties selector SC was on the same frame as incoming connector CE; it was therefore necessary to send, from outgoing connector CS to incoming connector CE, an indication concerning the position of the terminal selector chosen, in order to energize the magnets *csx* and *css* corresponding to the magnets *asx* and *ass* that had operated in the outgoing connector. Provision can also be made for the case where the calling fifties selector SC would be placed on the same frame as outgoing connector CS. The position of individual switch *ccx* corresponding to such a fifties selector is then connected, through the medium of a contact *cxe*, not to a *ccg* relay but to wire 61. Upon the closing of front *crm*3, relay *ccg* remains unoperated and magnets *css* and *csx* do not operate. In effect, these magnets do not come into play, since a fifties selector SC installed on the frame of outgoing connector CS is placed under the control of selection magnets *asx* and *ass*. On the contrary, the following circuit is completed: ground, front *crm*3, wire 68, front *cxe* of individual switch *ccx*, wire 61, front *crm*1, back *crj*1, wire 102, front *lma*1/6, relay *lmk*, battery. Relay *lmk* operates and, when the marker tests the called subscriber, it causes as already described the various operations involved in the connection.

The calling fifties selector SC gives access to 4 terminal selectors to serve the called subscriber. If these 4 selectors are all busy, the call is routed by means of a cooperating selector as indicated in the description of the general operation diagram of Fig. 2. The detailed operations relative to this case will now be described.

As stated, the routing of such a call brings in a fifties selector belonging to a calling section and a selector belonging to a cooperating section. In the description that follows, sections 1 and 2 will designate the first and second sections controlled by marker M, and sections 3 and 4 the first and second sections controlled by marker M'. Each of these sections comprises control members individual to it, namely, an incoming connector CE, an outgoing connector CS and a receiver RC. Each marker is common to two sections.

Various connections have been provided between the calling section and the cooperating section. These connections are used to send, from the calling section to the cooperating section, the signal that is to control in said cooperating section the hunting for a free terminal selector and to send, from the cooperating section to the calling section, the signal indicating that that hunting has ended. These connections are shown summarily in Figs. 13, 14, 17 and 18 but can be seen better in Figs. 20 and 21, assembled as indicated in Fig. 27. They are so arranged that wires II, III and IV of the calling section can be respectively connected to the *crj* relays of the other three sections. More specifically, wires II, III and IV of section 1 can be connected to the three *crj* relays of the other three sections over the following circuits:

(1) Wire II of section 1, front *lma*1/3 of the first marker, wire 100', and, in receiver RC1 of section 2, relay *crj;*

(2) Wire III of section 1, wire 148, and, in marker M', front *lma*3/4, wire 100, and, in receiver RC' of section 3, relay *crj;*

(3) Wire IV of section 1, wire 146, and, in marker M', front *lma*3/3, wire 100', and, in receiver RC' of section 4, relay *crj*.

Similar arrangements have been provided for the wires II, III and IV of the other three sections. Generally, it will be noted that wire II of one section is always connected to the *crj* relay of the section served by the same marker, or "conjugate" section, wires III and IV terminating respectively at the *crj* relays of the two sections served by the other marker.

Conversely, the *crj* relay of section 1 can be connected to one of wires II, III and IV of the other sections over the following circuits:

(1) Relay *crj* of section 1, wire 100, front *lma*2/4 of marker M, and, in the receiver of section 2, wire II;

(2) Relay *crj* of section 1, wire 100, front *lma*3/4 of marker M, wire 144, and, in receiver RC' of section 3, wire III;

(3) Relay *crj* of section 1, wire 100, front *lma*4/4 of marker M, wire 143, and, in receiver RC'1 of section 4, wire III.

Similar arrangements are provided for the *crj* relays of the other sections.

Four relays *ack*1 . . . *ack*4 have been provided in the outgoing connector CS serving the fifties selectors of section 1. Relay *ack*1 is provided to indicate that there is on the banks of section 1 at least one terminal selector having access to the called fifties; relay *ack*2 performs the same function for section 2; relays *ack*3 and *ack*4 perform similar functions for sections 3 and 4.

The energizing circuits of these relays are shown in greater detail in Fig. 19. Relay *ack*1 is multipled to the 5 terminal-selector connectors CST controlled by marker M; a wire 47 is thus obtained in each of these connectors. This wire 47 is connected to the two *tcf*3 contacts respectively corresponding to the two fifties served by connector CST. The *tcf*3 contact corresponding to the first fifties is multipled to the 4 *tv*2 contacts of the 4 section 1 terminal selectors serving that fifties; likewise, the *tcf*3 contact corresponding to the second fifties is multipled to the 4 *tv*2 contacts of the 4 section 1 terminal selectors serving said second fifties. If a call occurs in a fifties, the corresponding *tcf*3 contact is closed; and if there is at least one section 1 terminal selector free in that fifties, one at least of the *tv*2 contacts is closed and wire 47 is grounded. Relay *ack*1 is thus in operating position.

Likewise, if a call occurs in the second fifties served by connector CST, and if there is at least one section 1 terminal selector free in that fifties, relay *ack*1 is operated. The same method is used for the 50-subscriber groups served by the other terminal-selector connectors CST. In short, relay *ack*1 upon energizing indicates that a fifties is calling and that this fifties comprises, to handle the call, at least one terminal selector connected to the banks of the first-section fifties selectors.

Relay *ack*2 is likewise multipled to the 5 terminal-selector connectors CST controlled by marker M. A wire 48 is thus obtained in each of these connectors, arranged like wire 47 but connected to the *tv*2 contacts of the terminal selectors connected to the second fifties-selector section. Relay *ack*2 upon energizing therefore indicates that there is a calling fifties and that this fifties comprises, to handle the call, at least one terminal selector connected to the banks of the second-section fifties selectors.

Relays *ack*3 and *ack*4 are arranged according to a similar method but are connected to the contacts *tv'*2 of the terminal selectors ST' controlled by marker M'. These relays upon energizing therefore indicate that there is a calling fifties and that this fifties comprises, to handle the call, at least one free terminal selector connected to the banks of the fifties selectors of section 3 (relay *ack*3) or of section 4 (relay *ack*4).

Of course, if more than one fifties is calling, the *ack* relays operate the same way if any of them comprises at least one free terminal selector.

The outgoing connector CS1 serving the second-section fifties selectors controlled by marker M also comprises 4 relays *ack*1 . . . *ack*4 performing similar functions. The same wires 47 and 48 are used to energize these relays as in the case of connector CS.

The outgoing connectors CS' controlled by marker M' of the second chain each comprise 4 relays *ack*1 . . . *ack*4 (not shown) arranged according to the same method. The multipling arrow bearing the index 2 and placed on wire 13 indicates that this wire is used to cause the operation of the *ack* relays included in the connectors CS of the first chain and to cause the operation of the *ack* relays included in the connectors of the second chain. A rectifier Q11 and a similar rectifier (not shown) prevent any confusion between the circuits corresponding to the two chains.

It will be assumed that a call has been received by a fifties selector SC of section 1. The selective combination is first sent to receiver RC and then to marker M; the line corresponding to said combination is brought into the calling position on the banks of all the terminal selectors of the 50-subscriber group that are controlled by marker M. It will be assumed to begin with that those of these selectors that are connected to the banks of the first fifties-selector section are all busy but that there are one or more free terminal selectors accessible to the second-section fifties selectors. The *aca* relay or relays operate only in the second-section outgoing connector.

This connector, identical with the one of the first section, is represented schematically by a dotted-line rectangle CS1 (Fig. 14). The connections shown in Fig. 22 are provided between the calling-section connector CS and the cooperating-section connector CS1; wire 58 of connector CS is connected to wire 60' of connector CS1 and vice versa. In connector CS contact *ack*2/3 is closed, since it has been assumed that there were on the banks of the second-section fifties selectors one or more terminal selectors capable of routing the call. Relay *acb* of connector CS1 energizes over the following circuit: battery, relay *acb*, back *acb'*1, front *aca*2, back *acj*1, wire 58' and, in connector CS, wire 60, front *ack*2/3, wire 58, front *lma*1/5, ground. Front *lma*1/5 is closed, because marker M has been seized by the first-section receiver. Relay *acb* of connector CS1 controls, according to a method already described, the hunting for a terminal selector among those in calling position.

That hunting being over, relay *crm* of the second-section receiver energizes as already indicated over one of the contacts *ass*1/5 . . . *ass*20/5.

The outgoing connector CS1 of the second section controls, in addition to the 14 fifties selectors already mentioned, 4 cooperating selectors SE (Fig. 5) giving access to the same lines as the 14 fifties selectors of the second section. These cooperating selectors therefore give access, in particular, to the terminal selector ST chosen by outgoing connector CS1. These 4 cooperating selectors can be placed either on the call-finder frame or on the fifties-selector frame. In the embodiment described it has been assumed that the first of these frames comprised 14 call finders and 2 cooperating selectors, the second frame comprising 14 fifties selectors and 2 cooperating selectors.

The 4 cooperating selectors SE are respectively connected, over wires 18, to 4 contacts *ack*2/2 of first-section connector CS. A free cooperating selector has its *m* wire grounded over a back contact *cv'*4. Consequently, those free cause, in first-section connector CS, the operation of one or two *aca* relays over one or more of the following circuits: wire *m* grounded, wire 18, contacts *ack*2/2, resistance Re91, relay *aca*, battery. The free cooperating selectors SE of the second section are therefore brought into the calling position on the banks of the first-section outgoing connector CS.

The outgoing connector CS of the calling section hunts for a cooperating selector in calling position. That hunting is made possible only because connector CS has no direct access to a terminal selector. In fact, otherwise relay *ack*1 would be energized and would break at *ack*1/2 the circuit of relay *ack*2, contact *ack*2/2 being then open. That hunting being over, a switching magnet *asx* and a selection magnet *ass* are in operating position. The two selection magnets belonging to the 4 cooperating selectors are referenced *ass*21 and *ass*23. Relay *crm* cannot energize, because it is switched in only by magnets *ass*1 . . . *ass*20. On the other hand the following circuit is completed: ground, front *crz*6 in receiver RC, resistance Re131, rectifier Q9, front *crq*3, windings in series of relay *crt* energized, wire 55, back *acc*5, front *asx*4, front contact associated with one of magnets *ass*21 or *ass*23, wire 21 and, in cooperating selector SE, wire *c*, back *cv'*2, resistance Re51, battery. The circuit of *crm* is prepared by one of contacts *ass*21/5 or *ass*23/5.

Relay *crt* eliminates relay *crh* at *crt*1; at *crt*2 it prepares if need be the operation of relay *ccg* in incoming connector CE; at *crt*3 it prepares the energizing circuit of relay *crm*; at *crt*4 it places the low-resistance right-hand winding of relay *crq* in parallel with its own high-resistance right-hand winding in order to lower the test potential on the *t* wire of cooperating selector SE; if said selector is tested only by the outgoing connector CS under consideration, the fluxes produced in the two windings of relay *crq* are equal and of opposite sense and this relay releases.

Relay *crq* upon releasing completes at *crq*1 the following circuit: battery, magnet *crm* (sic Translator), back *crq*1, front *crt*3, wire 53, front *ass*21/5 or *ass*23/5, wireII over cable 57, relay *crj* of the cooperating section over a circuit already described, wire 59, back *acg*4, ground. The *crj* relay of said section energizes but the *crm* relay of the normal section remains unoperated, owing to the high resistance of the upper winding of relay *crj*. Relay *crj* completes at *crj*2 a holding circuit for relay *acb* of outgoing connector CS1; at *crj*3 it completes the following circuit: ground, front *crj*3, wire 17, relay *ccg* energized, back *ccb'*2 and *ccb*2, resistance Re102, battery. Relay *ccg* upon energizing causes, according to a method already described, the operation of the *csx* and *css* selection magnets corresponding to the *asx* and *ass* magnets in operated position in outgoing connector CS1. The positioning of the cooperating selector can thus be effected whether said selector is on the frame of incoming connector CE or on the frame of outgoing connector CS. It will be assumed throughout what follows that the calling selector and the cooperating selector are on the frames of the incoming connectors.

The hunting operations having ended in the cooperating section, a switching magnet *csx* and a selection magnet *css* are energized; a contact *css*2 and a contact *csx*2 are closed. When relay *crj* is energized by the battery polarity originating from the first section, a ground is applied to the upper right-hand terminal of said relay *crj* over the following circuit: ground, front *css*2, *csx*2, *ccg*6, wire 61, front *crm*1 and *crj*1. As a result, the high-resistance upper winding of relay *crj* is short-circuited, and this causes the energization of relay *crm* in the calling section This tells said calling section that the hunting operations have ended in the cooperating section.

In the calling section, relay *crm* causes the various operations indicated in the description of the general case, that is, the positioning of the selection magnets of the calling fifties selector and the operation of relay *lmk*.

The marker then tests the called subscriber's line; if this test is favorable, relay *lmd* energizes and causes as already described the connection of the calling fifties selector SC to the cooperating selector SE chosen. Magnet CV of the fifties selector thereupon causes the energization of the selection magnet of cooperating selector SE over the following circuit: ground, front *cv*3, contact *tsc* of fifties selector SC, *t* wire of cooperating selector SE, back *cv'*5, right-hand winding of magnet CV', battery.

Magnet CV' upon operating causes the connection of cooperating selector SE to the terminal selector ST chosen. Through the action of its contacts *cv'*1 and *cv'*5 it switches in its high-resistance left-hand winding to reduce the current drain and prevent needless overheating; at *cv'*4 it makes a break in the circuit of wire *m* in order to busy selector SE and cause the release of relay *aca* in the calling section; at *cv'*3 it completes the following energizing circuit for connecting-magnet TV of selector ST: ground, front *cv'*3, front *tse* of selector SE, wire *t* leading into selector ST, back *tv*5, left-hand winding of magnet TV, battery. Magnet TV energizes and causes as already described the connection of terminal selector ST to the called subscriber.

The called subscriber is then connected to group-selection stages SG over the following circuit: subscriber A, line wire *a*, contact *ast* of selector ST, wire *a*, wire *a* of cooperating selector SE, contact *ase* of SE, wire *a* of SE, wire *a* outgoing from fifties selector SC, contact *asc* of SC, wire *a*, wire *b*, contact *bsc* of SC, wire *b* of SC and of SE, contact *bse* of SE, wires *b* of selectors SE and ST, contact *bst* of selector ST and called subscriber's line wire *b*.

The calling section's common control members, connector CST and marker M release according to a method similar to that already described. The cooperating section's common control members release according to the same method after the release of relay *aca* resulting from the opening of contact *cv'*4.

When the call ends, the ground is removed from the *t* wire leading into the fifties selector; connecting magnet CV of said selector releases and opens over its front *cv*3 the circuit of magnet CV' of selector SE; magnet CV' opens in turn at *cv'*3 the circuit of connecting magnet TV of the terminal selector.

It will be noted that the energizing circuit of relay *acb* over *ack*2/3 (Fig. 22) in the cooperating section could have been eliminated. In that case, this relay would have operated only after the closing of contact *crj*2 (Fig. 13), that is, only after the hunting operations in the calling section; the hunting in the cooperating section, which is placed under the control of relay *acb*, would have occurred only at this moment. The circuit of contact *ack*2/3 has been provided to cause the hunting in the cooperating section immediately and thus speed up the routing of the call.

The case where all the terminal selectors capable of routing the call and connected to the two fifties-selector sections of the first chain are busy will now be described, assuming the called subscriber's fifties comprises at least one free terminal selector on the banks of section 3, that is, of the first section of fifties selectors controlled by marker M' of the second chain.

When marker M of the first chain has received the selective combination characterizing the called subscriber, it causes the grounding of wire 14 as already indicated, said subscriber's line being marked "calling" on the banks of all the free terminal selectors ST of the first chain. If all these selectors are busy, they cannot be brought into the calling position on the banks of the fifties selectors served by the first marker, in which case the marking of the called line has no effect.

Section 3 comprises 4 cooperating selectors SE accessible to the fifties selectors of the other three sections and in particular to the calling fifties selector. These cooperating selectors SE are connected to the outgoing connector CS of section 1 through wires 19 (Fig. 5). If at least one of these selectors is available, one of wires 19 is grounded over back *cv'*4. Since it has been assumed that one or more free terminal selectors were connected to the banks of section 3, relay *ack*3 is energized in the outgoing connector CS of the calling section and contact *ack*3/2 is closed. One or both *aca* relays energize; the free cooperating selector or selectors SE are brought into the calling position on the banks of the calling section's outgoing connector.

Outgoing connector CS then hunts for a cooperating selector SE. This hunting is made possible only because connector CS has neither direct access to a terminal selector ST nor access to a cooperating selector of section 2. In fact, in the first case, relay *ack*1 would be energized and would break at *ack*1/3 the circuit of relay *ack*3, contact *ack*3/2 being then open. In the second case, relay *ack*2 would be energized, relay *acl* being then energized over the following circuit: battery, relay *acl*, back *ach*3, resistance Re94, front *ack*2/2, wire 18, and, in a free cooperating selector of section 2, back *cv'*4, ground. Relay *acl* breaks at *acl*1 the circuit of *ack*3, contact *ack*3/2 being then open.

When a selector SE belonging to section 3 has been found, one *asx* and one *ass* magnet are energized in the calling section. The selection magnets belonging to the 4 selectors SE of section 3 are referenced *ass*22 and *ass*25.

Since the cooperating selector SE chosen is accessible to the selectors of the other three sections, it is necessary to make sure by means of a double-test operation that said selector will not be chosen at the same instant by another fifties selector. This is done, as in the preceding case, by the combination of relays *crt* and *crq*, the first energizing and the second releasing if the double test is successful. When relay *crq* releases, the following circuit is completed: battery, relay *crm*, back *crq*1, front *crt*3, wire 53, front *ass*22/5 or *ass*25/5 depending upon the cooperating selector chosen, back *acg*2, relay *acg*, back *acc*1, front *acd*2, ground. Relay *acg* energizes but relay *crm* cannot operate owing to the high resistance of relay *acg*.

Relay *acg* completes a holding circuit for itself at *acg*1; through the action of contact *acg*2, relay *crm* is isolated from relay *acg* and connected to wire III for a purpose that will be indicated later; over its front *acg*4 it completes a holding circuit for relay *acb*; over its front *acg*5 it causes the operation of relay *crk* over wire 51; at *acg*6 it completes the following holding circuit for relay *ack*3: battery, relay *ack*3, front *ack*3/3 and *acg*6, ground.

Relay *crk* upon opening its two back contacts *crk*1 and *crk*2 releases the marker seized; over its front *crk*1 and *crk*2 it causes the seizure of the second marker (M'). This marker, like the first, also has 4 relays *lma*1 . . . *lma*4 corresponding respectively to the 4 sections of line-selecting means SL; for symmetry, the relays corresponding to the two sections served by it are referenced *lma*1 and *lma*2 and the relays corresponding to the two sections served by the first marker are referenced *lma*3 and *lma*4. If this second marker is seized by the receiver serving the first section of the first chain, relay *lma*3 operates instead of relay *lma*1.

The multipling arrows bearing the index 2 and placed on wires 88, 89, 90, 102, 107, 69, 70 and 110 indicate that the same receiver can have access to two markers.

The selective combination registered at receiver RC is sent to the second marker; the latter then applies ground to the called subscriber's marking wire 14, said subscriber being then brought into the calling position on the banks of all the free terminal selectors controlled by said marker. It has been assumed that the called fifties comprised one or more free terminal selectors connected to the banks of section 3; said selectors are all brought into the calling position in the outgoing connector CS of this section.

The calling section's outgoing connector CS then sends the cooperating section's outgoing connector CS a signal to tell the latter outgoing connector it can proceed to hunt for a terminal selector among those in calling position. This signal is a battery polarity and it is sent over the following circuit: battery, relay *crm* in the calling section, back *crq*1, front *crt*3, wire 53, front *ass*22/5 or *ass*25/5, front *acg*2, wire III, cable 57, wire III, relay *crj* of the cooperating section over a circuit previously described, wire 59, back *acg*4, ground. Relay *crj* of the cooperating section energizes but relay *crm* of the calling section remains in normal position owing to the high resistance of the upper winding of relay *crj*.

Relay *crj* of the cooperating section completes the following circuit at *crj*2: ground, front *crj*2, wire 58, back *acj*1, front *aca*2, back *acb'*1, upper winding of relay *acb*, resistance Re92, battery. Relay *acb* energizes and controls, according to a method already described, the hunting for a terminal selector in calling position by outgoing connector CS.

When that hunting has ended, relay *crm* of the cooperating section is energized, as also the two selection magnets *csx* and *css* of the frame to which the cooperating selector belongs. A ground is then applied to the upper left-hand terminal of relay *crj* over the following circuit: ground, front *css*2, *csx*2, *ccg*6 in the cooperating section, wire 61, front *crm*1 and *crj*1. As a result, the high-resistance upper winding of relay *crj* is short-circuited, allowing the operation of relay *crm* in the calling section.

In the calling section, relay *crm* controls according to a method already described the positioning of the selection magnets *css* and *csx* of the frame to which the fifties selector belongs and the operation of *lmk* in the marker.

The marker then tests the called subscriber's line; if the test is successful, it causes the various operations involved in the connection as already explained in the case where the cooperating section was controlled by the same marker as the calling section.

It will be noted that when all the terminal selectors connected to the banks of sections 1 and 2 of fifties selectors controlled by marker M are busy, outgoing connector CS can choose a cooperating selector either in section 3 or in section 4 controlled by marker M'. The routing of a call through a cooperating selector of section 4 is effected according to the same method as in the case where a section 3 cooperating selector is used. It will be noted only that the selection magnets corresponding to the section 4 cooperating selectors are referenced *ass*23 and *ass*26.

As stated, a combination of two relays *crt* and *crq* has been provided to test the cooperating selector SE chosen. In case said selector is tested simultaneously by the *crt* and *crq* relays of another section, the right-hand windings of both *crq* relays are in parallel, the current flowing in each of said windings no longer being sufficient to cause the release. Both *crt* relays, one shunted by the other, can no longer hold over their right-hand winding and they release. The same operations recur in each of the two sections, the *crt* relays then vibrating according to a known method. The relays not being absolutely identical in both sections, finally one section makes the test ahead of the other. It will be assumed that the section under consideration is the one that has been unable to make the test. In that case, the *t* wire of the cooperating selector is brought to a potential approaching ground potential over the low-resistance right-hand windings of the *crt* and *crq* relays of the other section and the following circuit is then completed: *t* wire grounded, wire 21 of the section under consideration, one of the front contacts *ass*21/3 . . . *ass*26/3, *ass* 21/4 . . . *ass*26/4, one of the two contacts *asx*4, back *acc*5, wire 55, relay *crh*, back *crt*1, rectifier Q10, resistance R*e*130, battery. Relay *crh* energizes and completes at *crh*1 the circuit of relay *ach*, which energizes in turn. It will be noted that the resistance of the *crh* relay of one section is sufficiently high not to modify the test conditions in the other section.

Relay *ach* causes at *ach*2 the application of a ground to the upper terminal of the left-hand winding of relay *acb* over the following circuit: front *ach*2, wire 56, front *crh*1, ground; as a result, relay *acb* is short-circuited and releases. Over its back *ach*3 relay *ach* causes the release of relay *acl* if this latter was in operated position.

Relay *acb* upon releasing opens at *acb*3 and *acb*2 the circuit of the *asx* and *ass* selection magnets that had operated at the time of the selection of the cooperating selector, and at the same time causes the release of the *acd* relay that had held in series with magnet *ass*.

Selection magnets *asx* and *ass* cause at *asx*4 and *ass*3 (or *ass*4) the release of relay *crh*. Relay *crh* opens at *crh*1 the energizing circuit of relay *ach*, but the latter holds, and relay *acb* re-energizes over the following circuit: battery, relay *ach*, front *ach*2, upper winding of relay *acb* and the circuit already described for the energization of relay *acb*.

Outgoing connector CS again proceeds to hunt for a free cooperating selector SE. Contact *ach*3 being open, relay *acl* is in normal position and the two relays *ack*3 and *ack*4 can be in operating position as well as relay *ack*2. Under these conditions, the priority given to the cooperating selectors controlled by marker M is eliminated, outgoing connector CS then being able to choose either a cooperating selector controlled by the first marker or one of the cooperating selectors controlled by the second marker (M'). Relay *acd*, corresponding to the 13 high *ass* magnets, has the short-circuiting of its upper winding removed by the opening of back *ach*1; relay *acd'*, corresponding to the 13 low *ass* magnets, has its upper winding short-circuited by front *ach*1. As a result, priority is given to the high *ass* magnets; the cooperating lines are therefore chosen in a different order, this making it possible to lessen the risk of losing the call.

If all the terminal selectors capable of routing the call are busy, the 4 relays *ack*1 . . . *ack*4 are all in normal position; relay *cro* is short-circuited as already described and the calling subscriber receives the busy tone.

If the calling section's outgoing connector finds no free cooperating selector, a time device included in the register causes, according to a known method, the release of the various members seized.

In Fig. 23 is shown a selector SCE capable of being used either as a fifties selector or as a cooperating selector. This selector SCE is connected to the banks of group selectors SG and to the banks of identical selectors SCE' through distributer RP2.

In case a selector SCE is used as a fifties selector, it is connected to group-selection stage SG as indicated in the figure; its *a, b, c, t* and *m* wires are connected respectively to the *a, b, c, t* and *m* wires of selector SG; its *v* wire remains unused. It gives access, at its positions 1 to 40, to terminal selectors ST and, at its positions 41 to 52, to cooperating selectors SCE'' identical with selectors SCE. It operates the same way as the fifties selector SC shown in Fig. 6, with the sole difference that, when the connection is made, magnet CV causes, over its front *cv*3, the application of a ground to the *c* and *t* wires. The grounding of the *t* wire causes the operation of the connecting magnet in terminal selector ST, when no cooperation is involved; the grounding of the *c* wire is used in the case where fifties selector SCE is connected to a cooperating selector SCE'', as will be explained.

Where selector SCE is used as a cooperating selector, it is connected to the banks of a fifties selector SCE' as indicated in the figure; its *a, b, t* and *m* wires are connected respectively to the *a, b, t* and *m* wires of fifties selector SCE'; its *v* wire is connected to the *v* wire of SCE'. Fifties selector SCE' is identical with the cooperating selector SCE under consideration. This latter gives access, as indicated in the description of the preceding case, to terminal selectors ST in its positions 1 to 40, positions 41 to 52 not being used in the case under consideration. The operation is the same as for the cooperating selector SE of Fig. 5, with only the following differences:

(1) The *m* wire used to place cooperating selector SCE in calling position on the banks of the preceding selector is grounded over contact *cxm* of the incoming connector CE associated with SCE;

(2) The test of cooperating selector SCE by the calling section is made over the following circuit: wire 24, back *cv*5, resistance R*t*, battery;

(3) The energizing circuit of magnet CV is as follows: battery, right-hand winding of magnet CV, back *cv*6, wire *v*, wire *c* of fifties selector SCE' grounded over a front contact *cv*3 as explained in the description of the preceding case.

The above-described arrangements make it possible to use the assemblage of selectors SCE efficiently, for the fifties selection and for cooperation, and to obtain greater flexibility in the distribution of the traffic.

Line-selecting means SL allows routing calls intended for subscribers having several lines grouped under a single number (P. B. X group). Terminals *bn*2 of the grouped lines, in marking distributer RM, are connected to one and the same terminal *bn*1. When the marker receives a call number corresponding to a line group, marking wires 14 of all the free lines in the group are grounded, all these lines being then brought into calling position on the banks of terminal selectors ST; only one of them is chosen; any double selection is made impossible owing to the existence of the cyclical priority devices already mentioned.

The numbers of members indicated in the description of the general operation diagram have been given only as a nonlimitative example and they can be revised if the traffic so requires. Thus, for example, it is possible to assign to a given 50-subscriber group, in each chain, 6 instead of 8 terminal selectors and to provide, according to a known method, a grading between said terminal selectors and the fifties selectors and call finders. The first and the second terminal selectors are then connected to the banks of the first section of fifties selectors and of call finders; the third and the four terminal selectors are connected to the banks of the second section; the fifth and the sixth terminal selectors are connected to both sections. Since a terminal selector can be reached by two sections, each of said selectors must be provided with a contact *tv*2 to mark the availability of said selector on the banks of the first section and with a contact *tv*3 performing a similar function for the second section. Fig. 24 shows how these contacts are arranged in the case under consideration. The first two terminal selectors ST1 and ST2 have their *tv*2 contact connected to relay *ack*1; the next two terminal selectors ST3 and ST4 have their *tv*2 contact connected to relay *ack*2; finally, the last two terminal selectors ST5 and ST6 have one *tv*2 contact connected to relay *ack*1 and one *tv*3 contact connected to relay *ack*2. The *tv*3 contacts of the first four terminal selectors are not used.

Where a grading is provided between the terminal selectors and between the call finders and the fifties selectors and the call finders, it is necessary, according to a known method, to give priority to the selection of terminal selectors accessible to only one section. To obtain this result, the *acd* relay (Fig. 9) associated with the *ass* selection magnets corresponding to the common terminal selectors has its upper winding permanently short-circuited by back contact *ach*1; owing to this, priority is systematically given to the *ass* selection magnets associated with relay *acd'*, that is, to the selection magnets corresponding to the individual terminal selectors.

If the number of fifties selectors SC of one section exceeded the capacity of individual switch *ccx*, it would suffice to provide two similar individual switches; the first would be operated by a connecting magnet CX1 (Fig. 25) placed under the control of a contact *ccb*1/5 associated with the first *ccb* relay, while the second would be operated by a connecting magnet CX2 placed under the control of the *ccb*2/5 contact associated with the second *ccb* relay.

A back contact *cv*3 (Fig. 6) has been provided in fifties selector SC; this contact is used to keep line wire *a* grounded until the connection has been made, in order to give any needed indications to the members placed ahead.

The above-described line-selecting means is designed to route local calls as well as calls originating at or intended for distant offices.

In marking distributer RM, all the *bn*1 terminals assigned to special-service calls are connected to a relay *lms* through the medium of a terminal *bn*3. When marker M receives the number of a special service, relay *lms* energizes and causes the sending of a positive polarity to the register over the following circuit: front *lms*1 in marker M, front *lma*1/10, wire 110, front *cro*1 and *crz*4, wire 71, front *cch*4 and *cx*3, front *cxb* of individual switch *ccx*, wire 26, wire *b*. The register, receiving that polarity, causes the release of the various members seized and the routing of the call over a chain individual to the special services.

It is quite obvious that the foregoing descriptions have been given only as a nonlimitative example and that numerous modifications could be introduced without departing from the scope of the invention. Said descriptions concern the case of a system using crossbar switches, but some of the arrangements suggested could be applied to other telephone systems, such as those using rotary switches. It would also be possible to arrange the subscribers otherwise than in groups of 500 and of 50 and to provide crossbar switches comprising selection magnets differently arranged or of different capacity. In particular, all the numerical data, dependent primarily upon the traffic, have been given only as an example and to make it easier to understand the operation, and they could be revised without departing from the scope of the invention.

What is claimed is:

1. An automatic telephone system comprising a plurality of lines divided into groups, selecting means for connecting a calling one of said lines to a called one of said lines, said means comprising a plurality of multi-selectors having selection magnets and including a plurality of call finders adapted to select the group of a calling line, a plurality of sub-group selectors adapted to select the group of a called line, and a plurality of terminal selectors adapted to select the calling or called line in the group, a tester common to all said call finders having access to the same lines and adapted to determine which call finder is to route a call, an outgoing connector common to said call finders and sub-group selectors having access to the same lines adapted to control the hunting in the case of a calling line and a called line for a terminal selector capable of routing the call, a marker common to all said call finders, sub-group selectors, and terminal selectors having access to the same line, a terminal-selector connector common to said plurality of terminal selectors and adapted to control the hunting for the calling line and temporarily to connect said line to said marker, said marker adapted to mark said line on the banks of the terminal selectors, said outgoing connector and said terminal selector connector comprising particular individual switches of said multi-selectors, and means for causing the selection magnets of said multi-selectors to control the various hunting operations.

2. An automatic telephone system, according to claim 1, in which there are a plurality of selecting means each having access to all the lines of the group, means for bringing all said selecting means into operation when a call is made, whereby the routing of calls is speeded up and the risk of lost calls is lessened.

3. An automatic telephone system, according to claim 2, further comprising means responsive to a call originating on a line for causing all the testers in the selecting means capable of routing the call to respond thereto, means for causing one tester only to remain in service and the others to be rendered inoperative, means for causing the tester which remains in service to choose a call finder associated therewith capable of routing the call, means responsive to the selection of a call finder by said tester for causing the seizure of the marker associated therewith, means in the marker for marking the calling line on the banks of all the available terminal selectors, and means controlled by said last-mentioned means for marking all said available selectors in the banks of the call finders.

4. An automatic telephone system, according to claim 3, further comprising a feeder associated with each call finder, a plurality of registers, means in each tester for sending a signal to the feeder associated with a call finder selected by said tester, for causing said feeder to find and connect itself to a free register.

5. An automatic telephone system, according to claim 4, further comprising means responsive to the seizure of a marker by a tester for causing the seizure of the outgoing connector serving the call finder multi-switch including the selected call finder, means responsive to the seizure of said outgoing connector for causing said connector to hunt for a terminal selector marked by said marker and to connect thereto, and means for causing said thus selected terminal selector to hunt for the calling line marked by said marker.

6. An automatic telephone system, according to claim 5, further comprising means for preventing the seizure of a tester if the call finders capable of being reached by said tester have access only to busy terminal selectors in the multi-selector including the calling line on its banks.

7. An automatic telephone system, according to claim 1, further comprising a distributor connected to all the call finders which have access to a particular line adapted to determine the priority of seizure of said call finders by a tester, said distributor comprising a combination of a plurality of groups of counting relays, each group having a cycle of operation and being connected to the next succeeding group and adapted upon the completion of its cycle to start the cycle of said next succeeding group, the cycle of each group being twice as long as that of the preceding group, and said groups of relays having a normal initial condition, removable connections each connected to a relay contact of a given group of relays, so that if one and only one of said connections is made in each group, the contact associated with that connection is opened after a number of counting relays in the group corresponding to an exact power of 2 have operated, means for causing all said relays in a group to return to said initial condition when the relay is reached having the connection, whereby the connection determines the length of the cycle, and means for operating the relays in succession, whereby said distributors may be adapted to the number of call finders required by the traffic if this number is an exact power of 2.

8. An automatic telephone system, according to claim 1, in which the line connecting means includes sub-group selectors, further comprising a plurality of incoming connectors, a receiver common to the sub-group selectors of one multi-selector, means initiated by a call received by a sub-group selector for connecting the multi-selector containing said sub-group selector to said receiver through one of said incoming connectors, means in said receiver for receiving the call number of a called line over said connector, means responsive to said receiver for sending said call number to the marker associated with said receiver, means in said marker for marking the line corresponding to the call number dialed on the banks of all the free terminal selectors having access to said line, and means in said marker for marking all the free terminal selectors having access to said line on the banks of said sub-group selectors.

9. An automatic telephone system, according to claim 8, further comprising means in said marker responsive to the seizure thereof by the receiver for switching in the outgoing connector common to the sub-group selectors corresponding to said receiver, and means in said outgoing connector for hunting for a marked terminal selector when said outgoing selector is switched in and for connecting thereto when said terminal selector is formed and for thereafter causing said terminal selector to hunt for the marked line and for making the connections thereto when it has been found, whereby a simplified marker may be used which, as regards the selection, is limited to receiving a call number and marking the corresponding line on the banks of the terminal selectors.

10. An automatic telephone system, according to claim 9, further comprising means for marking each marker busy for an incoming call to a line in the group when it has been seized for an outgoing call from a line in the group, and means operative if all the markers have been seized by an outgoing call for automatically releasing one of them to handle the incoming call, whereby it is possible to handle the incoming call and the outgoing call simultaneously.

11. An automatic telephone system, according to claim 1, in which the line selecting means comprises sub-group selectors divided into a number of sections and a plurality of cooperating selectors, said system further comprising means for marking all free terminal selectors on the banks of all the sub-group selector sections, means for causing the outgoing connector assigned to the sub-group of lines including the calling line to hunt for and seize a cooperating selector of a section controlled by the seized marker if there is no direct access to a free terminal selector having access to the sub-group including the called line, means for thereupon sending a signal from the calling section to said seized cooperating selector, and means for causing said cooperating selector in response to said signal to hunt for a terminal selector capable of routing the call, whereby a second receiver and a second marker are prevented from being switched in and the speed of the routing of the call is increased.

12. An automatic telephone system, according to claim 11, further comprising means operative when a marker is seized by the receiver of the calling section and there is direct access to the terminal selectors in other sections controlled by the same marker for causing the outgoing connectors assigned to said sections to proceed immediately to hunt for a terminal selector without waiting for the hunting of a cooperating selector by the calling section, whereby the speed of routing the call is increased.

13. An automatic telephone system, according to claim 11, further comprising means operative when the hunting for a terminal selector by the cooperating section is over for causing said cooperating section to send a signal to the calling section, means in said calling section responsive to the receipt of said signal for causing said calling section to hunt for and find a free cooperating selector, and means for hereafter causing said calling section to send a signal to the marker for initiating in said marker the various operations involved in establishing the connection across the various selection stages.

14. An automatic telephone system, according to claim 11, further comprising means operative when the calling section has neither direct access to a terminal selector capable of routing the call nor access to a cooperating selector of a section controlled by the seized marker for causing the outgoing connector to select a cooperating selector in a section controlled by another marker, means responsive to the seizure of said cooperating selector for isolating the seized receiver from said first marker and connecting said receiver to said second marker, and for releasing said first marker, and means for thereafter sending the call number received by said receiver to said second marker.

15. An automatic telephone system, according to claim 11, further comprising a plurality of indicating devices in the calling section each adapted to reveal the presence of a calling line and to indicate whether there is at least one terminal selector in a given section to handle the call.

16. An automatic telephone system, according to claim 11, further comprising means in the calling section operative when the hunting for a cooperative selector has ended for testing the cooperative selector chosen, means operated by said testing means if the test indicates that the cooperative selector has been seized by another sub-group selector, or is out of order, for causing the outgoing connector to hunt for another cooperating selector in a different order which eliminates the priority of the cooperating selector served by the same marker over a cooperating selector served by another marker, whereby the risk of losing a call is lessened.

17. An automatic telephone system, according to claim 11, further comprising means operative when the hunting for a cooperating selector by the calling section has ended for completing a connecting circuit between the calling section and the selected cooperating selector including common control members of these two sections, said circuit comprising a first relay in the calling section and a second relay in the cooperating selector section, said second relay adapted to control the hunting in the cooperating section, if such hunting is necessary, a resistance in said circuit, means for removing said resistance subsequent to said hunting operation, mean for causing the operation of said first relay upon the removal of said resistance, and means operated by said first relay for preparing the various operations involved in the connection.

18. An automatic telephone system, according to claim 17, further comprising means for causing the relay in each section to perform different functions according to whether the section involved is used as a calling section or as a cooperating section, said means, in the case of a calling section, causing said relay to operate when the associated cooperating section ends out an end-of-hunting signal and to thus prepare the marker for initiating the various operations involved in establishing the connections, and, in the case of a cooperating section, causing said relay to operate when the hunting for a terminal selector has ended and to remove the resistance from the circuit, so as to cause the relay at the calling section to operate.

19. An automatic telephone system, according to claim 18, further comprising means operated when the calling section has free access to a terminal section for causing the relay to signal the end of the hunting for a terminal selector by the calling section and to prepare in the marker the various operations involved in establishing the connection across the subgroup and terminal selectors.

References Cited in the file of this patent

UNITED STATES PATENTS

| | | |
|---|---|---|
| 2,149,646 | Voss | Mar. 7, 1939 |
| 2,224,692 | Pearce | Dec. 10, 1940 |
| 2,654,807 | Shepherd | Oct. 6, 1953 |